US010474449B2

(12) United States Patent
Aw et al.

(10) Patent No.: US 10,474,449 B2
(45) Date of Patent: *Nov. 12, 2019

(54) UPGRADING A PHYSICAL SECURITY SYSTEM HAVING MULTIPLE SERVER NODES

(71) Applicant: Avigilon Corporation, Vancouver (CA)

(72) Inventors: Kevin Aw, Vancouver (CA); Kan Ru Chen, Vancouver (CA); Avery Chiang, Vancouver (CA); Tomer Goldenberg, Vancouver (CA); Jonathon Grieman, Vancouver (CA); Thanh Tam Ho, Vancouver (CA); Feng Pan, Vancouver (CA)

(73) Assignee: Avigilon Corporation, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,810

(22) Filed: Apr. 27, 2018

(65) Prior Publication Data
US 2018/0285095 A1 Oct. 4, 2018

Related U.S. Application Data

(63) Continuation of application No. 15/094,842, filed on Apr. 8, 2016, now Pat. No. 9,959,109.

(Continued)

(51) Int. Cl.
G06F 8/65 (2018.01)
H04L 29/08 (2006.01)
(Continued)

(52) U.S. Cl.
CPC .................. G06F 8/65 (2013.01); G06F 8/61 (2013.01); G06F 21/51 (2013.01); G06F 21/57 (2013.01);
(Continued)

(58) Field of Classification Search
CPC ..................................... G06F 8/65; G06F 8/61
(Continued)

(56) References Cited

U.S. PATENT DOCUMENTS 5,999,712 A 12/1999 Moiin et al.
6,691,154 B1 2/2004 Zhu et al.
(Continued)

FOREIGN PATENT DOCUMENTS

GB 2 368 683 A 5/2002
JP 2002-041488 2/2002
(Continued)

OTHER PUBLICATIONS

Almeida, et al., "Interval Tree Clocks: A Logical Clock for Dynamic Systems", Principles of Distributed Systems, Springer Berlin Heidelberg, pp. 259-274, 2008.
(Continued)

Primary Examiner — Phillip H Nguyen
(74) Attorney, Agent, or Firm — Daniel Hammond

(57) ABSTRACT

A physical security system that includes multiple server nodes may be upgraded by receiving an upgrade installation package from a client and propagating the installation package between at least two of the server nodes. One of the server nodes ("source server") receives the installation package from the client and another of the server nodes ("requesting server") requests and receives the installation package from the source server. To transfer the installation package from the source to the requesting server, the source server notifies the requesting server that the installation package is present at the source server, the requesting server then sends the source server a request for the installation package, and the source server then sends the installation
(Continued)

package to the requesting server in response to the request. The requesting server may then be upgraded by running the installation package.

12 Claims, 32 Drawing Sheets

Related U.S. Application Data

(60) Provisional application No. 62/146,150, filed on Apr. 10, 2015.

(51) Int. Cl.
*G06F 8/61* (2018.01)
*G06F 21/51* (2013.01)
*G06F 21/57* (2013.01)
*G07C 9/00* (2006.01)

(52) U.S. Cl.
CPC .......... *G07C 9/00571* (2013.01); *H04L 67/10* (2013.01); *H04L 67/34* (2013.01); *H05K 999/99* (2013.01)

(58) Field of Classification Search
USPC .................................................. 717/168, 174
See application file for complete search history.

(56) References Cited

U.S. PATENT DOCUMENTS

| | | | |
|---|---|---|---|
| 7,185,076 B1 | 2/2007 | Novaes et al. | |
| 8,121,148 B2 | 2/2012 | Olderdissen | |
| 8,321,540 B2 | 11/2012 | Webb-Johnson | |
| 8,601,112 B1 | 12/2013 | Nordstrom et al. | |
| 8,675,672 B1 | 3/2014 | Bao et al. | |
| 8,713,682 B2* | 4/2014 | Shulman | G06F 17/30306 726/25 |
| 9,710,251 B2* | 7/2017 | Hisamoto | G06F 8/65 |
| 9,778,640 B2 | 10/2017 | Salter | |
| 2001/0051515 A1 | 12/2001 | Rygaard | |
| 2004/0034798 A1* | 2/2004 | Yamada | H04L 12/2856 726/11 |
| 2004/0221149 A1 | 11/2004 | Rao et al. | |
| 2004/0261071 A1 | 12/2004 | Chuang et al. | |
| 2005/0144186 A1 | 6/2005 | Hesselink et al. | |
| 2006/0015599 A1 | 1/2006 | Li et al. | |
| 2006/0080656 A1 | 4/2006 | Cain et al. | |
| 2006/0271624 A1 | 11/2006 | Lyle et al. | |
| 2007/0005809 A1 | 1/2007 | Kobayashi et al. | |
| 2007/0112943 A1* | 5/2007 | Fisher | G06F 21/57 709/220 |
| 2007/0261102 A1 | 11/2007 | Spataro et al. | |
| 2007/0285501 A1 | 12/2007 | Yim | |
| 2008/0068290 A1 | 3/2008 | Muklashy et al. | |
| 2008/0084473 A1 | 4/2008 | Romanowich | |
| 2008/0168561 A1 | 7/2008 | Durie et al. | |
| 2008/0222412 A1* | 9/2008 | Hu | H04L 9/321 713/156 |
| 2008/0259161 A1* | 10/2008 | Hellman | G08B 13/19695 348/148 |
| 2008/0270569 A1 | 10/2008 | McBride et al. | |
| 2009/0019141 A1 | 1/2009 | Bush et al. | |
| 2009/0080443 A1 | 3/2009 | Dziadosz | |
| 2009/0106842 A1 | 4/2009 | Durie | |
| 2009/0182610 A1 | 7/2009 | Palanisamy et al. | |
| 2009/0228577 A1 | 9/2009 | Webb-Johnson | |
| 2010/0124271 A1 | 5/2010 | Martz et al. | |
| 2010/0161758 A1 | 6/2010 | Tofigh et al. | |
| 2010/0312879 A1 | 12/2010 | Taieb | |
| 2011/0026513 A1 | 2/2011 | Tien | |
| 2011/0231524 A1 | 9/2011 | Lin et al. | |
| 2012/0079092 A1 | 3/2012 | Woxblom et al. | |
| 2012/0084544 A1* | 4/2012 | Farina | G06F 21/575 713/2 |
| 2012/0092510 A1 | 4/2012 | Masters et al. | |
| 2012/0158894 A1 | 6/2012 | Desgagne | |
| 2012/0259912 A1 | 10/2012 | Kruse et al. | |
| 2012/0278422 A1 | 11/2012 | Oliver et al. | |
| 2012/0303737 A1 | 11/2012 | Kazar et al. | |
| 2012/0314127 A1 | 12/2012 | Syed et al. | |
| 2012/0317274 A1 | 12/2012 | Richter et al. | |
| 2013/0024901 A1 | 1/2013 | Sharif-Ahmadi | |
| 2013/0073717 A1 | 3/2013 | Collin et al. | |
| 2013/0113928 A1 | 5/2013 | Feldman | |
| 2013/0132848 A1 | 5/2013 | Bhatt | |
| 2013/0185408 A1 | 7/2013 | Ngo | |
| 2013/0276061 A1 | 10/2013 | Chebiyyam et al. | |
| 2013/0307971 A1 | 11/2013 | Ganesan et al. | |
| 2013/0307989 A1 | 11/2013 | Stone et al. | |
| 2013/0329050 A1 | 12/2013 | Pham et al. | |
| 2014/0025770 A1 | 1/2014 | Warfield et al. | |
| 2014/0074987 A1 | 3/2014 | Martz et al. | |
| 2014/0136701 A1 | 5/2014 | Billau et al. | |
| 2014/0201619 A1 | 7/2014 | Mo et al. | |
| 2014/0207844 A1 | 7/2014 | Mayo et al. | |
| 2014/0222892 A1 | 8/2014 | Lee et al. | |
| 2014/0282480 A1* | 9/2014 | Matthew | G06F 8/60 717/172 |

FOREIGN PATENT DOCUMENTS

| | | |
|---|---|---|
| WO | 99/021098 | 4/1999 |
| WO | 2014/036656 A1 | 3/2014 |

OTHER PUBLICATIONS

Amir, et al., "Efficient State Transfer in Partitionable Environments", Institute of Computer Science, The Hebrew University, 1997.

Amir, et al., "The Totem Single-Ring Ordering and Membership Protocol", ACM Transactions on Computer Systems, vol. 13, No. 4, pp. 311-342, 1995.

Berners-Lee, et al., "Uniform Resource Identifier (URI): Generic Syntax", The Internet Society (2005) as available at: http://tools.ietf.org/html/rfc3986, on Sep. 2, 2012.

Berners-Lee, et al., "Uniform Resource Identifier (URI): Generic Syntax", The Internet Society (2005) as available at: http://tools.ietf.org/html/rfc3986, on Dec. 16, 2013.

Birman, "Chapter 6: A History of the Virtual Synchrony Replication Model", Replication, Springer Berlin Heidelberg, pp. 91-120, 2010.

DeCandia, et al., "Dynamo: Amazon's Highly Available Key-Value Store", ACM SIGOPS Operating Systems Review, vol. 41, No. 6, ACM, 2007.

Google Developers, "Protocol Buffers", as available at: https://developers.google.com/protocol-buffers/docs/encoding, on Jun. 2, 2012.

Google Developers, "Protocol Buffers", as available at: https://developers.google.com/protocol-buffers/docs/encoding, on Dec. 16, 2013.

Leach, et al., "A Universally Unique Identifier (UUID) URN Namespace", The Internet Society (2005), as available at: http://tools.ietf.org/html/rfc4122, on Sep. 4, 2012.

Leach, et al., "A Universally Unique Identifier (UUID) URN Namespace", The Internet Society (2005), as available at: http://tools.ietf.org/html/rfc4122, on Dec. 16, 2013.

Moser, et al., "Extended Virtual Synchrony", Distributed Computing Systems, 1994, Proceedings of the 14th International Conference on IEEE, 1994.

OASIS Web Services Dynamic Discovery (WS-Discovery) Version 1.1, OASIS Standard, as available at: http://docs.oasis-open.org/ws-dd/discovery/1.1/os/wsdd-discovery-1.1-spec-os.pdf, on Jul. 1, 2009.

"Project Voldemort—A Distributed Database", as available at: http://www.project-voldemort.com/, on Dec. 16, 2013.

"Project Voldemort—A Distributed Database," as available at: http://www.project-voldemort.com/, on Sep. 2, 2012.

"Riak" as available at: http://www.basho.com/Riak.html, on Dec. 16, 2013.

(56) References Cited

OTHER PUBLICATIONS

Van Renesse, et al., "A Gossip-Style Failure Detection Service", IFIP International Conference on Distributed Systems Platforms and Open Distributed Processing, pp. 55-70, 1998.
Van Renesse, et al., "Efficient Reconciliation and Flow Control for Anti-Entropy Protocols", Proceedings of the 2nd Workshop on Large-Scale Distributed Systems and Middle-ware, ACM, 2008.
Wikipedia, "Galois/Counter Mode", as available at: http://en.wikipedia.org/wiki/Galois/Counter_Mode, on Aug. 17, 2012.
Wikipedia, "Galois/Counter Mode", as available at: http://en.wikipedia.org/wiki/Galois/Counter_Mode, on Dec. 16, 2013.
Wikipedia, "Gossip Protocol", as available at: http://en.wikipedia.org/wiki/Gossip_protocol, on Jul. 16, 2012.
Wikipedia, "Gossip Protocol", as available at: http://en.wikipedia.org/wiki/Gossip_protocol, on Dec. 16, 2013.
Wikipedia, "Maximum Transmission Unit", as available at: http://en.wikipedia.org/wiki/Maximum_transmission_unit, on Dec. 16, 2013.
Wikipedia, "Maximum Transmission Unit", as available at: http://en.wikipedia.org/wiki/Maximum_transmission_unit, on Aug. 27, 2012.
Wikipedia, "Virtual Synchrony", available as at: http://en.wikipedia.org/wiki/Virtual_synchrony, on accessed Dec. 16, 2013.
Wikipedia, "Virtual Synchrony", available as at: http://en.wikipedia.org/wiki/Virtual_synchrony, on accessed Jun. 15, 2012.
Wikipedia, "WS-Discovery", as available at: http://en.wikipedia.org/wiki/WS-Discovery, on Apr. 5, 2012.
Wikipedia, "WS-Discovery", as available at: http://en.wikipedia.org/wiki/WS-Discovery, on Dec. 16, 2013.
Zhou, et al., "An Efficient Topology-Adaptive Membership Protocol for Large-Scale Cluster-Based Services", Parallel and Distributed Processing Symposium, 2005, Proceedings, 19th IEEE International, IEEE, 2005.
The Apache Software Foundation, "Cassandra", (2009) as available at: http://cassandra.apache.org/, on Sep. 5, 2012.
The Apache Software Foundation, "Cassandra", (2009) as available at: http://cassandra.apache.org/, on Dec. 16, 2013.
International Search Report and Written Opinion for Application No. PCT/CA2013/050690, mailed by the Canadian Intellectual Property Office as ISA dated Dec. 12, 2013 (11 pages).
European Search Report for Application No. 13835467.5, mailed by the European Patent Office dated Jun. 28, 2016 (6 pages).
Examination Report dated Oct. 6, 2016, issued by the New Zealand Intellectual Property Office in New Zealand Patent Application No. 705517, 7 pages.
Patent Examination Report dated Nov. 18, 2016, issued by the Australian Intellectual Property Office in Australian Patent Application No. 2013312982, 4 pages.
Official Office action dated Oct. 23, 2017, issued by the Japanese Patent Office in Japanese Application Serial No. 2015-530252.
English translation of official Office action dated Oct. 23, 2017, issued by the Japanese Patent Office in Japanese Application Serial No. 2015-530252.
Office action dated Oct. 5, 2017, issued in Russian Patent Application No. 2015106840.
English translation of Office action dated Oct. 5, 2017, issued in Russian Patent Application No. 2015106840.

\* cited by examiner

UPGRADING A PHYSICAL SECURITY SYSTEM HAVING MULTIPLE SERVER NODES

CROSS-REFERENCE TO RELATED APPLICATIONS

This application is a continuation of allowed U.S. patent application Ser. No. 15/094,842, filed Apr. 8, 2016, which issued on May 1, 2018, as U.S. Pat. No. 9,959,109, and which claims the benefit of U.S. provisional patent application No. 62/146,150, filed Apr. 10, 2015, the entirety of which is hereby incorporated by reference.

TECHNICAL FIELD

The present disclosure is directed at a physical security system having multiple server nodes.

BACKGROUND

A physical security system is a system that implements measures to prevent unauthorized persons from gaining physical access to an asset, such as a building, a facility, or confidential information. Examples of physical security systems include surveillance systems, such as a system in which cameras are used to monitor the asset and those in proximity to it; access control systems, such as a system that uses RFID cards to control access to a building; intrusion detection systems, such as a home burglary alarm system; and combinations of the foregoing systems.

A physical security system often incorporates computers. As this type of physical security system grows, the computing power required to operate the system increases. For example, as the number of cameras in a surveillance system increases, the requisite amount of computing power also increases to allow additional video to be stored and to allow simultaneous use and management of a higher number of cameras. Research and development accordingly continue into overcoming problems encountered as a physical security system grows.

SUMMARY

According to a first aspect, there is provided a method for upgrading a physical security system comprising multiple server nodes. The method comprises receiving, at one of the server nodes ("source server"), an upgrade installation package from a client of the physical security system; sending, from the source server to another of the server nodes ("requesting server"), a notification indicating that the installation package is at the source server; after the requesting server receives the notification, sending a request from the requesting server to the source server for the installation package; sending the installation package to the requesting server from the source server in response to the request; and upgrading the requesting server by running the installation package at the requesting server.

The notification may comprise an identifier for the installation package to the requesting server.

The requesting server may use the identifier to determine whether the requesting server already has the installation package, and the requesting server may send the request when the requesting server determines it does not already have the installation package.

The physical security system may comprise at least three of the server nodes, and the source server may send the notification to at least two of the other server nodes of which one is the requesting server; for example, the source server may send the notification to all of the other server nodes. Additionally or alternatively, the requesting server may send the request to at least two of the other server nodes, of which one is the source server; for example, the requesting server may send the request to all of the other server nodes.

The installation package may comprise part of an installer blob that is received at the source server, and the installer blob may further comprise installer metadata associated with the installation package.

Sending the installation package from the client to the source server may comprise sending the installer metadata and then sending the installation package.

After receiving the installer metadata, the source server may generate a database entry comprising the installer metadata. The notification comprises the database entry.

Sending the installation package to the requesting server from the source server in response to the request may comprise receiving, at the requesting server, additional notifications from the source server and from at least one of the other servers that the source server and the at least one of the other servers each has the installation package. The requesting server may request and obtain the installation package from the source server in response to the additional notification from the source server.

The additional notification from the source server may be the first of the additional notifications that the requesting server receives.

After the requesting server receives the installation package, it may propagate the installation package to at least one of the other server nodes.

Validating the installation package may be performed at one or both of the source server, before sending the notification to the requesting server indicating that the installation package is at the source server; and the requesting server, after the requesting server has received the installation package from the source server. The validating may comprise verifying the source of the installation package using a digital certificate and verifying validity of a digital signature that confirms authenticity of the digital certificate.

The running of the installation package at the requesting server may be triggered automatically in response to an event, such as the arrival of a pre-determined upgrade time.

According to another aspect, there is provided a physical security system configured to perform any of the foregoing aspects of the method and suitable combinations thereof. For example, in one aspect, there is provided a physical security system comprising multiple server nodes comprising a source server and a requesting server. The source server is configured to receive an upgrade installation package from a client of the physical security system; send to the requesting server a notification indicating that the installation package is at the source server; and send the installation package to the requesting server in response to a request from the requesting server, while the requesting server is configured to after receiving the notification from the source server, send a request to the source server for the installation package; and after receiving the installation package from the source server, upgrade the requesting server by running the installation package.

According to another aspect, there is provided a non-transitory computer readable medium having stored thereon computer program code to cause a processor to perform any of the foregoing aspects of the method and suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
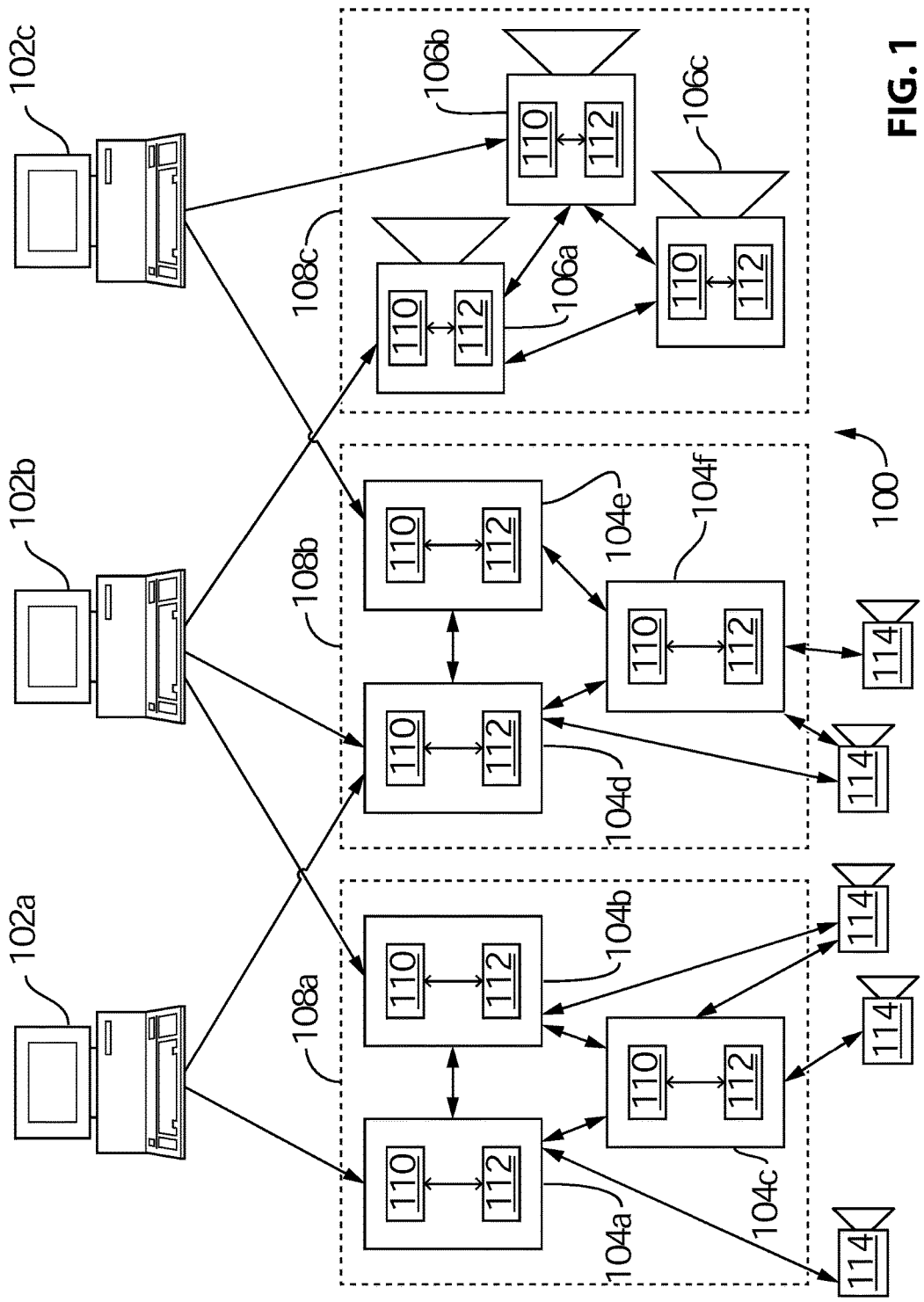
FIG. 1 is a block diagram of a distributed physical security system, according to one embodiment.

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections. Furthermore, the singular forms "a", "an", and "the" as used in this disclosure are intended to include the plural forms as well, unless the context clearly indicates otherwise.

Once a surveillance system grows to include a certain number of cameras, it becomes impractical or impossible to operate the surveillance system using a single server because of storage capacity and processing power limitations. Accordingly, to accommodate the increased number of cameras, additional servers are added to the system. This results in a number of problems.

For example, a user of the surveillance system may want to be able to see what another user is viewing (that user's "view") and stream video that is captured using a camera in the system or that is stored on a server in the system even if the user is not directly connected to that camera or that server, respectively. Similarly, the user may want to be able to access user states (e.g.: whether another user of the system is currently logged into the system) and system events (e.g.: whether an alarm has been triggered) that are occurring elsewhere in the system, even if they originate on a server to which the user is not directly connected. In a conventional surveillance system that has been scaled out by adding more servers, a typical way to provide this functionality is to add a centralized gateway server to the system. A centralized gateway server routes system events, user states, views, and video from one server in the system to another through itself, thereby allowing the user to access or view these events, states, views, and video regardless of the particular server to which the user is directly connected. However, using a centralized gateway server gives the surveillance system a single point of failure, since if the centralized gateway server fails then the events, states, views, and video can no longer be shared. Using a centralized gateway server also increases the surveillance system's cost, since a server is added to the system and is dedicated to providing the centralized gateway server's functionality.

The user may also want common settings (e.g.: user access information in the form of usernames, passwords, access rights, etc.) to be synchronized across multiple servers in the system. In a conventional surveillance system that has been scaled out by adding more servers, this functionality is provided either by manually exporting settings from one server to other servers, or by using a centralized management server that stores all of these settings that other servers communicate with as necessary to retrieve these settings. Manually exporting settings is problematic because of relatively large synchronization delays, difficulty of use and setup, and because large synchronization delays prejudice system redundancy. Using the centralized management server suffers from the same problems as using the centralized gateway server, as discussed above.

Some of the embodiments described herein are directed at a distributed physical security system, such as a surveillance system, that can automatically share data such as views, video, system events, user states, and user settings between two or more server nodes in the system without relying on a centralized server such as the gateway or management servers discussed above. These embodiments are directed at a peer-to-peer surveillance system in which users connect via clients to servers nodes, such as network video recorders, cameras, and servers. Server nodes are grouped together in clusters, with each server node in the cluster being able to share data with the other server nodes in the cluster. To share this data, each of the server nodes runs services that exchange data based on a protocol suite that shares data between the server nodes in different ways depending on whether the data represents views, video, system events, user states, or user settings. FIGS. 1 to 10 depict these embodiments.

Figure 10:
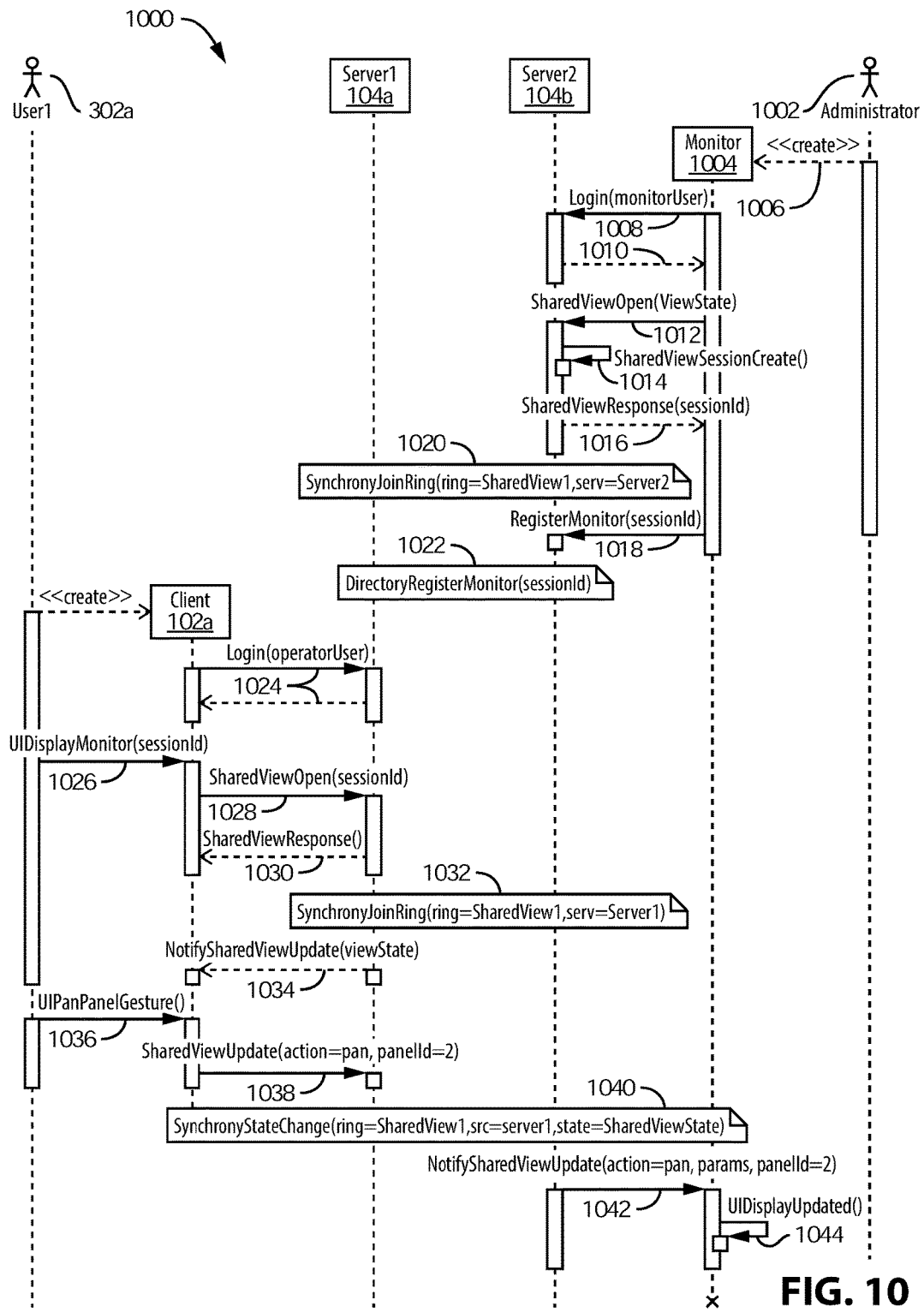
FIG. 10 is a UML sequence diagram showing how the system of FIG. 1 shares an unattended view with a system user.
Figure 11:
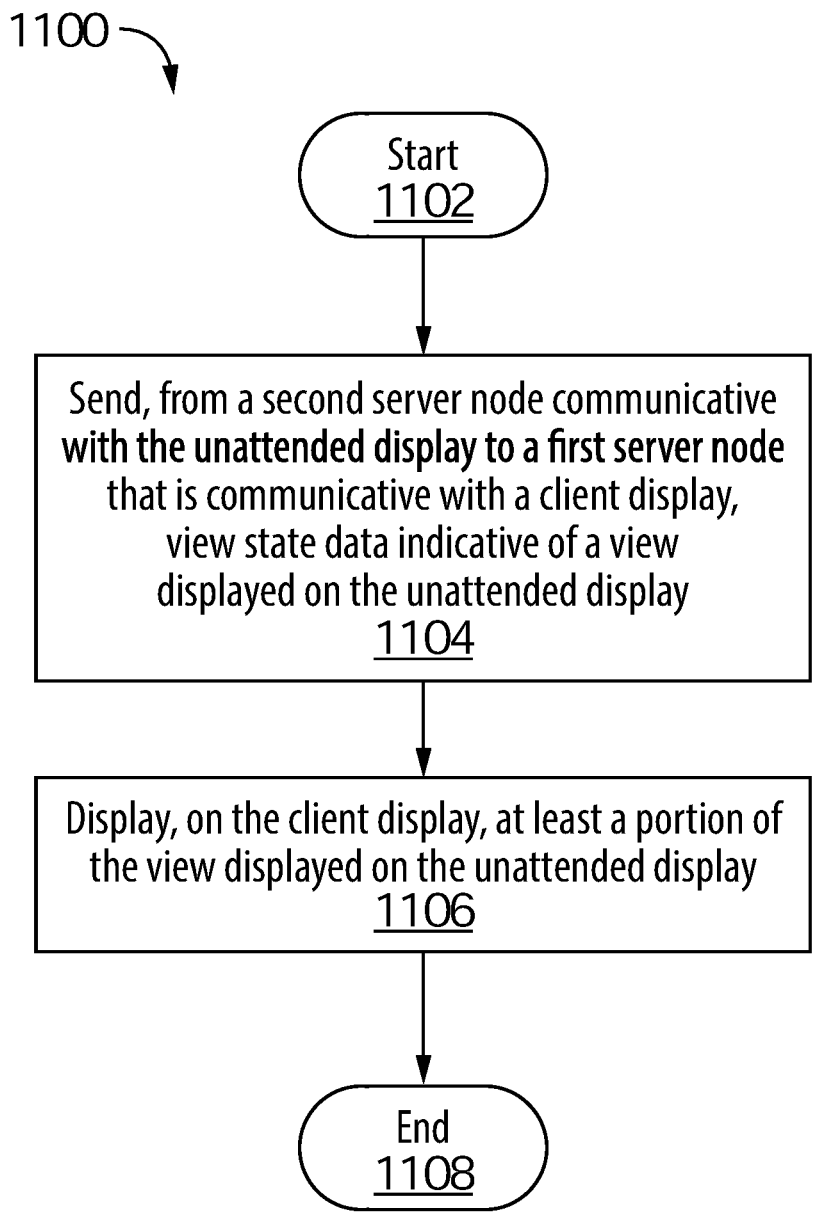
FIG. 11 is a method for interacting with an unattended display in a physical security system that comprises a plurality of server nodes, according to another embodiment.

In alternative embodiments, some of the technology used to share views between different server nodes is applicable to federated networks (i.e., networks that include a centralized server) and to peer-to-peer networks such as those shown in FIGS. 1 to 9. FIGS. 10 and 11 depict these embodiments.

Referring now to FIG. 1, there is shown a distributed physical security system in the form of a surveillance system 100, according to one embodiment. The system 100 includes three clients 102a-c (first client 102a to third client 102c and collectively "clients 102"), six servers 104a-f (first server 104a to sixth server 104f and collectively "servers 104"), three server node cameras 106a-c (first node camera 106a to third node camera 106c and collectively "node cameras 106"), and five non-node cameras 114.

Each of the node cameras 106 and servers 104 includes a processor 110 and a memory 112 that are communicatively coupled to each other, with the memory 112 having encoded thereon statements and instructions to cause the processor 110 to perform any embodiments of the methods described herein. The servers 104 and node cameras 106 are grouped into three clusters 108a-c (collectively "clusters 108"): the first through third servers 104a-c are communicatively coupled to each other to form a first cluster 108a; the fourth through sixth servers 104d-f are communicatively coupled to each other to form a second cluster 108b; and the three node cameras 106 are communicatively coupled to each other to form a third cluster 108c. The first through third servers 104a-c are referred to as "members" of the first cluster 108a; the fourth through sixth servers 104d-f are referred to as "members" of the second cluster 108b; and the first through third node cameras 106a-c are referred to as "members" of the third cluster 108c.

Each of the servers 104 and node cameras 106 is a "server node" in that each is aware of the presence of the other members of its cluster 108 and can send data to the other members of its cluster 108; in contrast, the non-node cameras 114 are not server nodes in that they are aware only of the servers 104a,b,c,d,f to which they are directly connected. In the depicted embodiment, the server nodes are aware of all of the other members of the cluster 108 by virtue of having access to cluster membership information, which lists all of the server nodes in the cluster 108. The cluster membership information is stored persistently and locally on each of the server nodes, which allows each of the server nodes to automatically rejoin its cluster 108 should it reboot during the system 100's operation. A reference hereinafter to a "node" is a reference to a "server node" unless otherwise indicated.

While in the depicted embodiment none of the clusters 108 participate in intercluster communication, in alternative embodiments (not shown) the members of various clusters 108 may share data with each other. In the depicted embodiment the servers 104 are commercial off-the-shelf servers and the cameras 106,114 are manufactured by Avigilon™ Corporation of Vancouver, Canada; however, in alternative embodiments, other suitable types of servers 108 and cameras 106,114 may be used.

The first client 102a is communicatively coupled to the first and second clusters 108a,b by virtue of being communicatively coupled to the first and fourth servers 104a,d, which are members of those clusters 108a,b; the second client 102b is communicatively coupled to all three clusters 108 by virtue of being communicatively coupled to the second and fourth servers 104b,d and the first node camera 106a, which are members of those clusters 108; and the third client 102c is communicatively coupled to the second and third clusters 108b,c by virtue of being communicatively coupled to the fifth server 104e and the second node camera 106b, which are members of those clusters 108b,c. As discussed in more detail below, in any given one of the clusters 108a-c each of the nodes runs services that allow the nodes to communicate with each other according to a protocol suite 200 (shown in FIG. 2), which allows any one node to share data, whether that data be views, video, system events, user states, user settings, or another kind of data, to any other node using distributed computing; i.e., without using a centralized server. Each of the nodes has access to cluster membership information that identifies all the nodes that form part of the same cluster 108; by accessing this cluster membership information, data can be shared and synchronized between all the nodes of a cluster 108.

Figure 2:
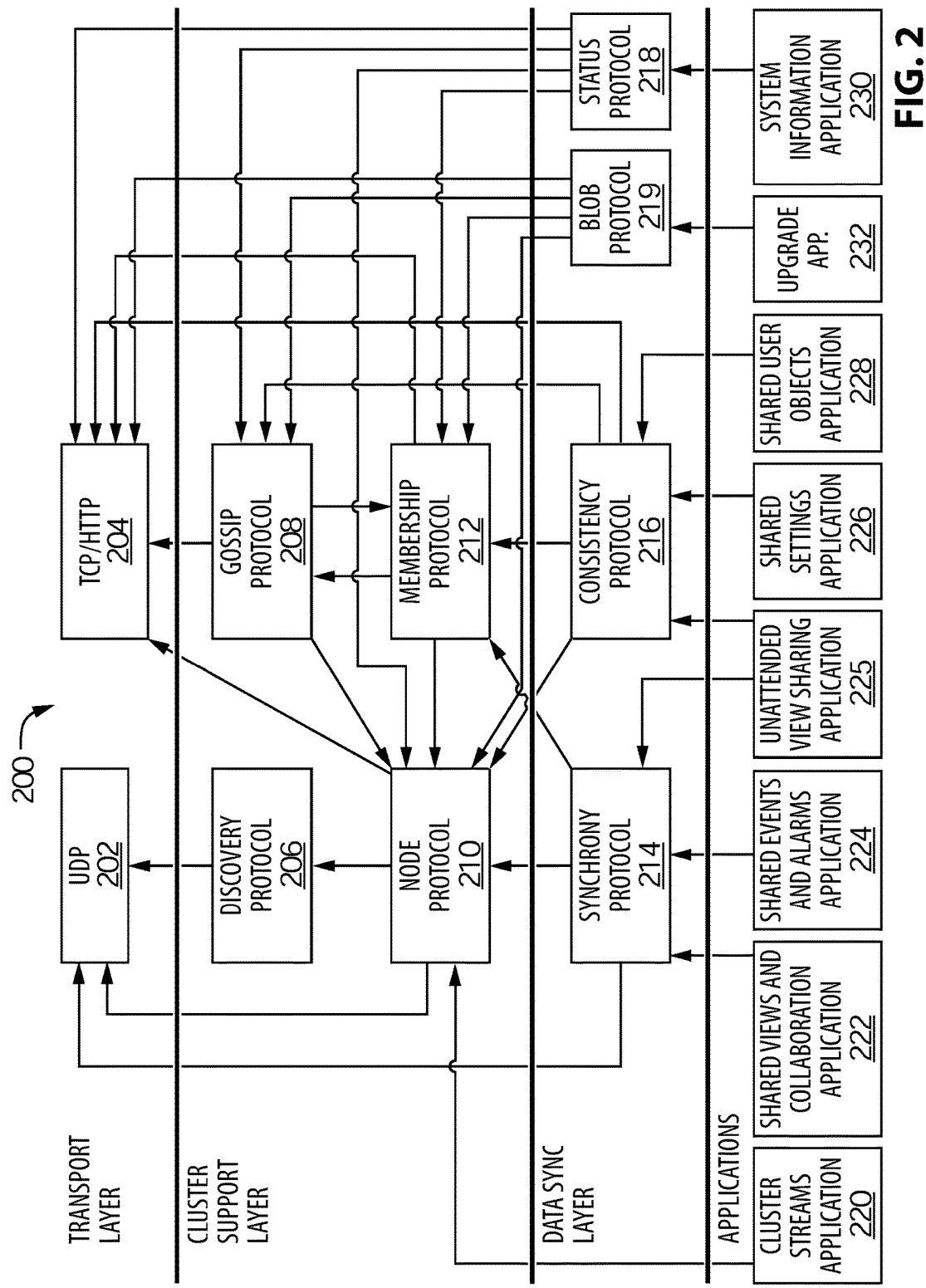
FIG. 2 is a block diagram of a protocol suit used by the system of FIG. 1.

FIG. 2 shows a block diagram of the protocol suite 200 employed by the nodes of the system 100. The protocol suite 200 is divided into three layers and includes the following protocols, as summarized in Table 1:

TABLE 1

Summary of the Protocol Suite 200

| Protocol Name | Protocol Layer | Receives Data from these Protocols and Applications | Sends Data to these Protocols |
|---|---|---|---|
| UDP 202 | Transport | Discovery Protocol 206, Node Protocol 210, Synchrony Protocol 214 | N/A |
| TCP/HTTP 204 | Transport | Node Protocol 210, Gossip Protocol 208, Membership Protocol 212, Consistency Protocol 216, Status Protocol 218 | N/A |
| Discovery Protocol 206 | Cluster Support | Node Protocol 210 | UDP 202 |
| Gossip Protocol 208 | Cluster Support | Membership Protocol 212, Consistency Protocol 216, Status Protocol 218 | TCP/HTTP 204, Node Protocol 210, Membership Protocol 212 |
| Node Protocol 210 | Cluster Support | Cluster Streams Application 220, Synchrony 214, Consistency Protocol 216, Membership Protocol 212, Status Protocol 218, Gossip Protocol 208 | UDP 202, TCP/HTTP 204, Discovery Protocol 206 |
| Membership Protocol 212 | Cluster Support | Synchrony Protocol 214, Gossip Protocol 208, Status Protocol 218, Consistency Protocol 216 | Gossip Protocol 208, Node Protocol 210, TCP/HTTP 204 |
| Synchrony Protocol 214 | Data Sync | Shared Views and Collaboration Application 222, Shared Events and Alarms Application | UDP 202, Node Protocol 210, Membership Protocol 212 |

TABLE 1-continued

Summary of the Protocol Suite 200

| Protocol Name | Protocol Layer | Receives Data from these Protocols and Applications | Sends Data to these Protocols |
|---|---|---|---|
| Consistency Protocol 216 | Data Sync | 224, Unattended View Sharing Application 225 Shared Settings Application 226, Shared User Objects Application 228, Unattended View Sharing Application 225 | Node Protocol 210, Membership Protocol 212, Gossip Protocol 208, TCP/HTTP 204 |
| Status Protocol 218 | Data Sync | System Information (device, server, etc.) Application 230 | Gossip Protocol 208, Membership Protocol 212, Node Protocol 210, TCP/HTTP 204 |
| Blob Protocol 219 | Data Sync | Upgrade Application 232 | Gossip Protocol 208, TCP/HTTP 204, Node Protocol 210, Membership Protocol 212 |

A description of the function and operation of each of the protocols in the protocol suite 200 follows.

Transport Layer

The Transport Layer corresponds to layer 4 of the Open Systems Interconnection (OSI) model, and is responsible for providing reliable data transfer services between nodes to the cluster support, data synchronization, and application layers. The Transport Layer in the system 100 includes the UDP 202 and TCP/HTTP 204 protocols.

Cluster Support Layer

The Cluster Support Layer includes the protocols used to discover nodes, verify node existence, check node liveliness, determine whether a node is a member of one of the clusters 108, and determine how to route data between nodes.

Discovery Protocol 206

The Discovery protocol 206 is based on version 1.1 of the WS-Discovery protocol published by the Organization for the Advancement of Structured Information Standards (OASIS), the entirety of which is hereby incorporated by reference herein. In the depicted embodiment, XML formatting used in the published standard is replaced with Google™ Protobuf encoding.

The Discovery protocol 206 allows any node in the system 100 to identify the other nodes in the system 100 by multicasting Probe messages to those other nodes and waiting for them to respond. A node may alternatively broadcast a Hello message when joining the system 100 to alert other nodes to its presence without requiring those other nodes to first multicast the Probe message. Both the Probe and Hello messages are modeled on the WS-Discovery protocol published by OASIS.

Gossip Protocol 208

The Gossip protocol 208 is an epidemic protocol that disseminates data from one of the nodes to all of the nodes of that cluster 108 by randomly performing data exchanges between pairs of nodes in the cluster 108. The Gossip protocol 208 communicates liveliness by exchanging "heartbeat state" data in the form of a heartbeat count for each node, which allows nodes to determine when one of the nodes in the cluster 108 has left unexpectedly (e.g.: due to a server crash). The Gossip protocol 208 also communicates "application state" data such as top-level hashes used by the Consistency protocol 216 and status entity identifiers and their version numbers used by the Status protocol 218 to determine when to synchronize data between the nodes, as discussed in more detail below. The data spread using the Gossip protocol 208 eventually spreads to all of the nodes in the cluster 108 via periodic node to node exchanges.

A data exchange between any two nodes of the cluster 108 using the Gossip protocol 208 involves performing two remote procedure calls (RPCs) from a first node ("Node A") to a second node ("Node B") in the same cluster 108, as follows:

1. Node A sends a GreetingReq message to Node B, which contains a list of digests for all the nodes in the cluster 108 of which Node A is aware. For each node, a digest includes a unique node identifier and version information that is incremented each time either the heartbeat state or application state for that node changes. The version information may be, for example, a one-dimensional version number or a multi-dimensional version vector. Using a version vector allows the digest to summarize the history of the state changes that the node has undergone.
2. Node B sends a GreetingRsp message to Node A, which contains:
    (a) a list of digests for nodes about which Node B wishes to receive more information from Node A, which Node B determines from the version information sent to it in the GreetingReq message;
    (b) a list of digests for nodes about which Node A does not know form part of the cluster 108;
    (c) a list of one or both of heartbeat and application states that will bring Node A up-to-date on nodes for which it has out-of-date information; and
    (d) a list of nodes that Node A believes form part of the cluster 108 but that Node B knows have been removed from the cluster 108.
3. Node A then sends a ClosureReq message to Node B, in which Node A sends:
    (a) a list of digests for nodes about which Node A wishes to receive more information from Node B (e.g. Node A may request information for nodes of which Node A was unaware until Node B sent Node A the GreetingRsp message);
    (b) a list of states that will bring Node B up-to-date on nodes for which it has out-of-date information; and
    (c) a list of nodes that Node B believes form part of the cluster 108 but that Node A knows have been removed from the cluster 108.
4. Node B then sends a ClosureRsp message to Node A, in which Node B sends:
    (a) a list of states that will bring Node A up-to-date on nodes it is out-of-date on, in response to Node A's request in ClosureReq; and
    (b) a list of nodes that have been removed from the cluster 108 since GreetingRsp.

After Nodes A and B exchange RPCs, they will have identical active node lists, which include the latest versions of the heartbeat state and application state for all the nodes in the cluster 108 that both knew about before the RPCs and that have not been removed from the cluster 108.

Node Protocol 210

The Node protocol 210 is responsible for generating a view of the system 100's network topology for each node, which provides each node with a network map permitting it to communicate with any other node in the system 100. In some embodiments, the network map is a routing table. The network map references communication endpoints, which are an address (IP/FQDN), port number, and protocol by which a node can be reached over the IP network that connects the nodes.

The Node protocol 210 does this in three ways:
1. via a "Poke exchange", as described in further detail below;
2. via the Discovery protocol 206, which notifies the Node protocol 210 when a node joins or leaves the system 100. When a node joins the system 100 a "Poke exchange" is performed with that node; and
3. manually, in response to user input.

A Poke exchange involves periodically performing the following RPCs for the purpose of generating network maps for the nodes:
1. a Poke request, in which Node A sends to Node B a Node A self view and a list of other nodes known to Node A, as viewed by Node A, following which Node B updates its network map in view of this information; and
2. a Poke response, in which Node B sends to Node A a Node B self view and a list of other nodes known to Node B, as viewed by Node B, following which Node A updates its network map in view of this information.

The RPCs are performed over the TCP/HTTP protocol 204.

To reduce bandwidth usage, node information is only exchanged between Nodes A and B if the node information has changed since the last time it has been exchanged.

A Poke exchange is performed after the Discovery protocol 206 notifies the Node protocol 210 that a node has joined the system 100 because the Discovery protocol 206 advertises a node's communication endpoints, but does not guarantee that the node is reachable using those communication endpoints. For example, the endpoints may not be usable because of a firewall. Performing a Poke exchange on a node identified using the Discovery protocol 206 confirms whether the communication endpoints are, in fact, usable.

The Node protocol 210 can also confirm whether an advertised UDP communication endpoint is reachable; however, the Node protocol 210 in the depicted embodiment does not perform a Poke exchange over the UDP protocol 202.

For any given node in a cluster 108, a network map relates node identifiers to communication endpoints for each of the nodes in the same cluster 108. Accordingly, the other protocols in the protocol stack 200 that communicate with the Node protocol 210 can deliver messages to any other node in the cluster 108 just by using that node's node identifier.

Membership Protocol 212

The Membership protocol 212 is responsible for ensuring that each node of a cluster 108 maintains cluster membership information for all the nodes of the cluster 108, and to allow nodes to join and leave the cluster 108 via RPCs. Cluster membership information is shared between nodes of the cluster 108 using the Status protocol 218. Each node in the cluster 108 maintains its own version of the cluster membership information and learns from the Status protocol 218 the cluster membership information held by the other nodes in the cluster 108. As discussed in further detail below, the versions of cluster membership information held by two different nodes may not match because the version of cluster membership information stored on one node and that has been recently updated may not yet have been synchronized with the other members of the cluster 108.

For each node, the cluster membership information includes:
1. A membership list of all the nodes of the cluster 108, in which each of the nodes is represented by:
    (a) the node identifier, which is unique among all the nodes in the system 100;
    (b) the node's state, which is any one of:
        (i) Discover: the node is a member of the cluster 108 but has not been synchronized with the other members of the cluster 108 since having booted;
        (ii) Joining: the node is in the process of joining a cluster 108;
        (iii) Syncing: the node is in the process of synchronizing data using the Synchrony, Consistency, and Status protocols 214,216,218 with the cluster 108 it has just joined;
        (iv) Valid: the node has completed synchronizing the cluster membership information and is a valid node of the cluster 108; and
        (v) TimedOut: the node has become unresponsive and is no longer an active member of the cluster 108 (the node remains a member of the cluster 108 until removed by a user);
    (c) a session token;
    (d) the version number of the cluster membership information when the node joined the cluster 108; and
    (e) the version number of the cluster membership information the last time it was changed.
2. A gravestone list listing all the nodes that have been removed from the cluster 108, in which each removed node is represented by:
    (a) that node's node identifier; and
    (b) the version of that node's cluster membership information when the node was removed.

In the depicted embodiment, a node is always a member of a cluster 108 that comprises at least itself; a cluster 108 of one node is referred to as a "singleton cluster". Furthermore, while in the depicted embodiment the membership information includes the membership list and gravestone list as described above, in alternative embodiments (not depicted) the membership information may be comprised differently; for example, in one such alternative embodiment the membership information lacks a gravestone list, while in another such embodiment the node's state may be described differently than described above.

When Node A wants to act as a new server node and wants to join a cluster 108 that includes Node B, it communicates with Node B and the following occurs:
1. Node A sends a cluster secret to Node B, which in the depicted embodiment is a key that Node B requires before letting another node join its cluster 108. One of the clients 102 provides the cluster secret to Node A. As Node B controls Node A's access to the cluster 108, Node B acts as a "membership control node".

In this example embodiment, the cluster secret is a high-entropy token unique to the cluster 108 that is used as a seed to derive (using cryptographically secure methods) all other authentication tokens used in all other server-to-server protocol authentications. The cluster secret is not exchanged over the wire between the servers 104 and is instead forwarded to the joining server 104 (e.g., Node A) during the join process via a client through secure SSL/TLS connections that are established to both the server 104 that will act as the admission node (e.g., Node B) and the server 104 to be joined (e.g., Node A). Establishing the secure connections to both these servers 104 comprises a client administrator authenticating with 'Join' level privilege to both of the servers 104 independently. In this example embodiment, this applies to all server-to-server communications with the exception of the Discovery protocol 206, which does not require authentication; however, in alternative embodiments, alternative or additional protocols of the protocol suite 200 may be exempted from using the cluster secret in this manner (e.g., an alternative, suitable authentication scheme may be used).
2. Nodes A and B exchange their membership information. The versions of the membership information on Nodes A and B are updated to include the node identifiers of Node A and of all the nodes of the cluster 108 that Node A is joining.
3. Node A's state is changed to "Joining" as Node A joins the cluster.
4. Once joined, Node A's state is changed to "Syncing" as data is exchanged between Node A and the cluster 108 it has just joined. Node B also updates the version of the membership information stored on the all the other nodes of the cluster 108 using the Status protocol 218. The process of updating the versions of the membership information stored on Node A and all the members of the cluster 108 that Node A is joining is referred to as "synchronizing" the versions of the membership information stored on all of these nodes.
5. After synchronization is complete, Node A's state changes to Valid.

Data Synchronization Layer

The Data Synchronization Layer includes the protocols that enable data to be sent between the nodes in a cluster with different ordering guarantees and performance tradeoffs. The protocols in the Data Synchronization Layer directly use protocols in the Transport and Cluster Support Layers.

Synchrony Protocol 214

The Synchrony protocol 214 is used to send data in the form of messages from Node A to Node B in the system 100 such that the messages arrive at Node B in an order that Node A can control, such as the order in which Node A sends the messages. Services that transfer data using the Synchrony protocol 214 run on dedicated high priority I/O service threads.

In the depicted embodiment, the Synchrony protocol 214 is based on an implementation of virtual synchrony known as the Totem protocol, as described in Agarwal D A, Moser L E, Melliar-Smith P M, Budhia R K, "The Totem Multiple-Ring Ordering and Topology Maintenance Protocol", ACM Transactions on Computer Systems, 1998, pp. 93-132, the entirety of which is hereby incorporated by reference herein. In the Synchrony protocol 214, nodes are grouped together into groups referred to hereinafter in this description as "Synchrony rings", and a node on any Synchrony ring can send totally ordered messages to the other nodes on the same ring. The Synchrony protocol 214 modifies the Totem protocol as follows:
1. The Synchrony protocol 214 uses both a service identifier and a ring identifier to identify a Synchrony ring. The service identifier identifies all instances of a given Synchrony ring. The service identifier identifies all instances of a given Synchrony ring, whereas the ring identifier identifies a particular instance of a given Synchrony ring. For example, each time a node joins or leaves a Synchrony ring that ring's ring identifier will change, but not its service identifier. The service identifier allows a node to multicast totally ordered messages to the group of nodes that share the same service identifier (i.e. the group of nodes that belong to the same Synchrony ring).
2. In the Totem protocol, in some cases when the nodes are not sending messages the Synchrony ring seen by nodes does not reflect the final ring configuration that converges when the nodes begin messaging. The Synchrony protocol 214 allows nodes to send probe messages to each other to cause Synchrony rings to converge prior to the sending of non-probe messages.
3. The Totem protocol only allows ordered messages to be sent to all nodes that form part of a Synchrony ring. In contrast, the Synchrony protocol 214 uses a Dispatch module that abstracts the network layer from the Synchrony protocol 214 by providing an interface to broadcast to all reachable nodes in the system 100; unicast to each of multiple nodes in the system 100 using a list of destination node identifiers; and to unicast to a single node in the system 100 using its node identifier. The Dispatch module also supports multiplexing of services on the same IP port using message filtering and routing by service identifier. Outgoing messages from a node are sent to the subset of nodes having the same service identifier unless multicast.
4. The Synchrony protocol 214 uses fragmented messages and user payload chunking and coalescing to address problems arising from the maximum transmission unit size of approximately 1,500 bytes.
5. The Synchrony protocol 214 modifies the way nodes use Join messages, which are messages nodes use in the Totem protocol to join a Synchrony ring:
    (a) Join messages are sent by nodes only if they have the lowest node identifier in the current set of operational nodes in the Synchrony ring.
    (b) Nodes that do not have the lowest node identifier in their operational set unicast Join messages to the nodes with the lowest node identifier in their operational set.
    (c) Join messages include the service identifier, and nodes that are not part of the corresponding Synchrony ring do not respond.
    Relative to the Totem protocol, these modifications help reduce aggregate bandwidth used by nodes to join Synchrony rings.
6. The Synchrony protocol 214 detects and blacklists nodes that are unable to join a Synchrony ring due to some types of network misconfigurations. For example, a node that is able to send to, but not receive messages from, the other nodes will appear to the other nodes to only ever send probe messages since all other messages in the present embodiment are solicited, and accordingly will be blacklisted.
7. The Synchrony protocol 214 performs payload encryption and authenticity verification of messages.
8. The Synchrony protocol 214 limits the time each node can hold the token used in the Totem protocol; in the depicted embodiment, each node can hold the token for 15 ms.
9. The Synchrony protocol 214 implements a TCP friendly congestion avoidance algorithm.

As discussed in more detail below, the system 100 uses the Synchrony protocol for the Shared Views and Collaboration application 222 and the Shared Events and Alarms application 224; the data shared between members of a cluster 108 in these applications 222 is non-persistent and is beneficially shared quickly and in a known order.

Consistency Protocol 216

The Consistency protocol 216 is used to automatically and periodically share data across all the nodes of a cluster 108 so that the data that is shared using the Consistency protocol 216 is eventually synchronized on all the nodes in the cluster 108. The types of data that are shared using the Consistency protocol 216 are discussed in more detail below in the sections discussing the Shared Settings application 226 and the Shared User Objects application 228. Data shared by the Consistency protocol 216 is stored in a database on each of the nodes, and each entry in the database includes a key-value pair in which the key uniquely identifies the value and the keys are independent from each other. The Consistency protocol 216 synchronizes data across the nodes while resolving parallel modifications that different nodes may perform on different databases. As discussed in further detail below, the Consistency protocol 216 accomplishes this by first being notified that the databases are not synchronized; second, finding out which particular database entries are not synchronized; and third, finding out what version of the entry is most recent, synchronized, and kept.

In order to resolve parallel modifications that determine when changes are made to databases, each node that joins a cluster 108 is assigned a causality versioning mechanism used to record when that node makes changes to data and to determine whether changes were made before or after changes to the same data made by other nodes in the cluster 108. In the present embodiment, each of the nodes uses an interval tree clock (ITC) as a causality versioning mechanism. However, in alternative embodiments other versioning mechanisms such as vector clocks and version vectors can be used. The system 100 also implements a universal time clock (UTC), which is synchronized between different nodes using Network Time Protocol, to determine the order in which changes are made when the ITCs for two or more nodes are identical. ITCs are described in more detail in P. Almeida, C. Baquero, and V. Fonte, "Interval tree clocks: a logical clock for dynamic systems", *Princi. Distri. Sys., Lecture Notes in Comp. Sci.*, vol. 5401, pp. 259-274, 2008, the entirety of which is hereby incorporated by reference herein.

The directory that the Consistency protocol 216 synchronizes between nodes is divided into branches, each of which is referred to as an Eventual Consistency Domain (ECD). The Consistency protocol 216 synchronizes each of the ECDs independently from the other ECDs. Each database entry within an ECD is referred to as an Eventual Consistency Entry (ECE). Each ECE includes a key; a timestamp from an ITC and from the UTC, which are both updated whenever the ECE is modified; a hash value of the ECE generating using, for example, a Murmurhash function; the data itself; and a gravestone that is added if and when the ECE is deleted.

The hash value is used to compare corresponding ECDs and ECEs on two different nodes to determine if they are identical. When two corresponding ECDs are compared, "top-level" hashes for those ECDs are compared. A top-level hash for an ECD on a given node is generated by hashing all of the ECEs within that ECD. If the top-level hashes match, then the ECDs are identical; otherwise, the Consistency protocol 216 determines that the ECDs differ. To determine which particular ECEs in the ECDs differ, hashes are taken of successively decreasing ranges of the ECEs on both of the nodes. The intervals over which the hashes are taken eventually shrinks enough that the ECEs that differ between the two nodes are isolated and identified. A bi-directional skip-list can be used, for example, to determine and compare the hash values of ECD intervals.

Two nodes that communicate using the Consistency protocol 216 may use the following RPCs:
1. SetEntries: SetEntries transmits new or updated ECEs to a node, which inserts them into the appropriate ECDs.
2. GetEntries: GetEntries transmits a key or a range of keys to a node, which returns the ECEs corresponding to those one or more keys.
3. SynEntries: SynEntries transmits a key or a range of keys to a node, and the two nodes then compare hashes of successively decreasing ranges of ECEs to determine which ECEs differ between the two nodes, as described above. If the ECEs differ, the nodes merge their ECEs so that the same ECEs are stored on the nodes by comparing the ITC timestamps; if the ITC timestamps match, the nodes compare the UTC timestamps associated with the ECEs. These timestamps act as version information that allows the two nodes to adopt the ECEs that have been most recently modified, as indicated by those ECEs' version information.

When a node changes ECEs, that node typically calls SynEntries to inform the other nodes in the cluster 108 that the ECEs have been changed. If some of the nodes in the cluster 108 are unavailable (e.g.: they are offline), then the Gossip protocol 208 instead of SynEntries is used to communicate top-level hashes to the unavailable nodes once they return online. As alluded to in the section discussing the Gossip protocol 208 in the cluster 108 above, each of the nodes holds its top-level hash, which is spread to the other nodes along with a node identifier, version information, and heartbeat state using the Gossip protocol 208. When another node receives this hash, it compares the received top-level hash with its own top-level hash. If the top-level hashes are identical, the ECEs on both nodes match; otherwise, the ECEs differ.

If the ECEs differ, regardless of whether this is determined using SynEntries or the Gossip protocol 208, the node that runs SynEntries or that receives the top-level hash synchronizes the ECEs.

Status Protocol 218

As discussed above, the Gossip protocol 208 shares throughout the cluster 108 status entity identifiers and their version numbers ("status entity pair") for nodes in the cluster 108. Example status entity identifiers may, for example, represent different types of status data in the form of status entries such as how much storage the node has available; which devices (such as the non-node cameras 114) are connected to that node; which clients 102 are connected to that node; and cluster membership information. When one of the nodes receives this data via the Gossip protocol 208, it compares the version number of the status entity pair to the version number of the corresponding status entry it is storing locally. If the version numbers differ, the Status protocol 218 commences an RPC ("Sync RPC") with the node from which the status entity pair originates to update the corresponding status entry.

A status entry synchronized using the Status protocol 218 is uniquely identified by both a path and a node identifier. Unlike the data synchronized using the Consistency protocol 216, the node that the status entry describes is the only node that is allowed to modify the status entry or the status entity pair. Accordingly, and unlike the ECDs and ECEs synchronized using the Consistency protocol 216, the version of the status entry for Node A stored locally on Node A is always the most recent version of that status entry.

If Node A modifies multiple status entries simultaneously, the Status protocol 218 synchronizes all of the modified status entries together to Node B when Node B calls the Sync RPC. Accordingly, the simultaneously changed entries may be dependent on each other because they will be sent together to Node B for analysis. In contrast, each of the ECEs synchronized using the Consistency protocol 216 is synchronized independently from the other ECEs, so ECEs cannot be dependent on each other as Node B cannot rely on receiving entries in any particular order.

Blob Protocol 219

The blob protocol 219 is used to send and receive binary large objects (interchangeably referred to herein as "blobs") between i) any two of the servers 104 that comprise part of the same cluster 108 and ii) any one of the clients 102 and any one of the servers 104 directly connected to that client 102. Blobs are identified by an identifier such as a uniform resource identifier ("URI"), which uniquely identifies the blob within one of the clusters 108. In alternative embodiments (not depicted), the blobs may be identified by a different type of identifier, such as a combination of a path and filename that identifies the blobs within the file system of an operating system; additionally or alternatively, the identification of the blobs in alternative embodiments may or may not be unique. The blob protocol 219 comprises the following RPCs:

1. Expect: Expect is run prior to posting the blob to the server 104 that is to receive the blob from the client 102. For example, in one embodiment the server's 104 database controller runs Expect after receiving a notification that it is to receive the blob from the client 102 but prior to actually receiving the blob. Absent an Expect call, the server 104 rejects any attempt to send the blob to the server 104 from the client 102. After Expect is called, the client 102 may send the blob to the server 102 such as via an HTTP Post request. In the depicted example embodiments, Expect is called when pushing the blob from the client 102 to the server 104 but not when the blob is shared between the servers 104, which is performed by having one of the servers 104 ("requesting server 104") pull the blob from another of the servers 104 ("source server 104"). However, in alternative embodiments (not depicted), Expect may be used for blob transfers between the client 102 and any of the servers 104 and between the source and requesting servers 104, or alternatively may not be used for any blob transfers, including those between the client 102 and any of the servers 104 (e.g., the blob may be pulled from the client 102 by the source server 104).

Once Expect is called, the client 102 may immediately send the expected blob to the source server 104. Alternatively, the client 102 may call Expect one or more additional times before sending that expected blob to the source server 104. In order to track the blobs that it may receive, the source server 104 generates a map of blobs it expects as a result of Expect being called, which the source server 104 modifies in response to Forget calls (discussed below) and in response to having received any expected blobs. In order to distinguish between the blobs associated with different Expect calls, each Expect call comprises metadata (such as installer metadata discussed in more detail below in respect of FIGS. 15A and 15B) and the URI of the associated blob A.

2. Fetch: Fetch is called as a precursor to the actual transfer of the blob to the requesting server 104 from the source server 104. When Fetch is called, the server 104 checks to see if it already has the blob that is identified by the URI associated with the blob to be fetched. If the requesting server 104 does not have the blob, it adds the blob's URI and the service to notify on completion of fetching the blob to a fetch map and updates its application state via the Gossip protocol 208 to include the blob's URI. All the other servers 104 (including the source server 104) comprising part of the same cluster 108 as the requesting server 104 receive the application state update, and the requesting server 104 subsequently attempts to retrieve the blob from one of those other servers 104 using an HTTP Get request. The application state update includes the unique node identifier of the requesting server 104.

3. Notify: Notify is called on the requesting server 104 by the source server 104 after the source server 104 receives the application state update propagated using the Gossip protocol 208 as part of Fetch. Once Notify is called, HTTP Get requests can be used to transfer the blob from the source server 104 to the requesting server 104.

4. Forget: A call to Forget a particular blob results in removing the blob's URI from any queue to Get the blob via HTTP, from a map of expected blobs generated as a result of calling Expect, and a map of blobs to be fetched as a result of calling Fetch. The requesting server 104 subsequently attempts to delete the blob from its file system and updates it application state, which is propagated to the other servers 104 in the same cluster 108 via the Gossip protocol 208, to no longer contain the URI of the forgotten blob.

An example of using the blob protocol 219 RPCs to transfer a blob from the client 102 to the source server 104 and then from the source server 104 to the requesting server 104 is provided below in respect of FIGS. 14A and 14B.

Applications

Each of the nodes in the system 100 runs services that implement the protocol suite 200 described above. While in the depicted embodiment one service is used for each of the protocols 202-218, in alternative embodiments (not depicted) greater or fewer services may be used to implement the protocol suite 200. Each of the nodes implements the protocol suite 200 itself; consequently, the system 100 is distributed and is less vulnerable to a failure of any single node, which is in contrast to conventional physical security systems that use a centralized server. For example, if one of the nodes fails in the system 100 ("failed node"), on each of the remaining nodes the service running the Status protocol 218 ("Status service") will determine that the failed node is offline by monitoring the failed node's heartbeat state and will communicate this failure to the service running the Node and Membership protocols 210,212 on each of the other nodes ("Node service" and "Membership service", respectively). The services on each node implementing the Synchrony and Consistency protocols 214,216 ("Synchrony service" and "Consistency service", respectively) will subsequently cease sharing data with the failed node until the failed node returns online and rejoins its cluster 108.

The following describes the various applications 220-232 that the system 100 can implement. The applications 220-232 can be implemented as various embodiments of the example method for sharing data 800 depicted in FIG. 8. The method 800 begins at block 802 and proceeds to block 804 where a first node in the system 100 accesses a node identifier identifying another node in the system 100. Both the first and second nodes are members of the same server cluster 108. The node identifier that the first node accesses is part of the cluster membership information that identifies all the members of the cluster 108. The cluster membership information is accessible by all the members of the cluster 108. In the depicted embodiments each of the members of the cluster 108 stores its own version of the cluster membership information persistently and locally; however, in alternative embodiments (not depicted), the cluster membership information may be stored one or both of remotely from the nodes and in a central location. After accessing the node identifier for the second node, the first node sends the data to the second node at block 806, following which the method 800 ends at block 808. For example, when using the Node service described above, the Synchrony and Consistency services running on the first node are able to send the data to the second node by using the second node's node identifier, and by delegating to the Node service responsibility for associating the second node's communication endpoint to its node identifier. Sending the data from the first node to the second node at block 806 can comprise part of a bi-directional data exchange, such as when data is exchanged in accordance with the Gossip protocol 208.

Shared Settings Application 226 and Shared User Objects Application 228

During the system 100's operation, persistently stored information is transferred between the nodes of a cluster 108. Examples of this real-time information that the shared settings and shared user objects applications 226,228 share between nodes are shared settings such as rules to implement in response to system events such as an alarm trigger and user objects such as user names, passwords, and themes. This type of data ("Consistency data") is shared between nodes using the Consistency protocol 216; generally, Consistency data is data that does not have to be shared in real-time or in total ordering, and that is persistently stored by each of the nodes. However, in alternative embodiments (not depicted), Consistency data may be non-persistently stored.

Figure 3:
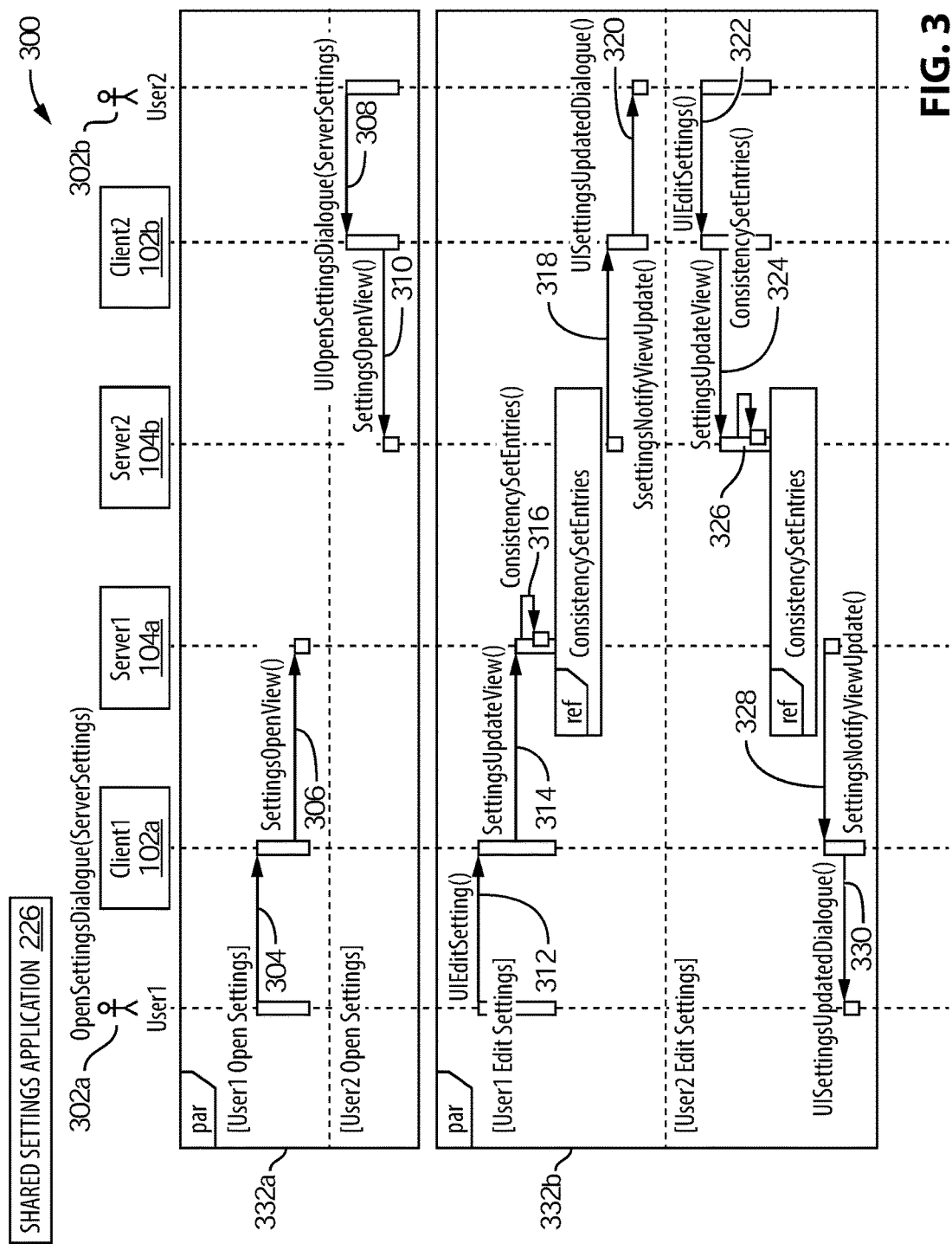
FIG. 3 is a UML sequence diagram showing how the system of FIG. 1 shares settings between different system users.

FIG. 3 shows a UML sequence diagram 300 in which Consistency data in the form of a user settings are shared between first and second users 302a,b (collectively, "users 302"). The users 302, the first and second clients 102a,b, and the first and second servers 104a,b, which are the first and second nodes in this example, are objects in the diagram 300. The servers 104a,b form part of the same cluster 108a. As the servers 104a,b with which the clients 102a,b communicate are not directly connected to each other, the Consistency protocol 216 is used to transfer data between the two servers 104a,b, and thus between the two users 302. Although the depicted embodiment describes sharing settings, in an alternative embodiment (not depicted) the users 302 may analogously share user objects.

The diagram 300 has two frames 332a,b. In the first frame 332a, the first user 302a instructs the first client 102a to open a settings panel (message 304), and the client 102a subsequently performs the SettingsOpenView( ) procedure (message 306), which transfers the settings to the first server 104a. Simultaneously, the second user 302b instructs the second client 102b analogously (messages 308 and 310). In the second frame 332b, the users 302 simultaneously edit their settings. The first user 302a edits his settings by having the first client 102a run UIEditSetting( ) (message 312), following which the first client 102a updates the settings stored on the first server 104a by having the first server 104a run SettingsUpdateView( ) (message 314). The first server 104a then runs Consistency SetEntries( ) (message 316), which performs the SetEntries procedure and which transfers the settings entered by the first user 302a to the second server 104b. The second server 104b then sends the transferred settings to the second client 102b by calling SettingsNotifyViewUpdate( ) (message 318), following which the second client 102b updates the second user 302b (message 320). Simultaneously, the second user 302b analogously modifies settings and sends those settings to the first server 104a using the Consistency protocol 216 (messages 322, 324, 326, 328, and 330). Each of the servers 104a,b persistently stores the user settings so that they do not have to be resynchronized between the servers 104a,b should either of the servers 104a,b reboot.

Shared Events and Alarms Application 224

During the system 100's operation, real-time information generated during runtime is transferred between the nodes of a cluster 108. Examples of this real-time information that the shared events and alarms application 224 shares between nodes are alarm state (i.e. whether an alarm has been triggered anywhere in the system 100); system events such as motion having been detected, whether a device (such as one of the node cameras 106) is sending digital data to the rest of the system 100, whether a device (such as a motion detector) is connected to the system 100, whether a device is currently recording, whether an alarm has occurred or has been acknowledged by the users 302, whether one of the users 302 is performing an audit on the system 100, whether one of the servers 104 has suffered an error, whether a device connected to the system has suffered an error, whether a point-of-sale text transaction has occurred; and server node to client notifications such as whether settings/data having changed, current recording state, whether a timeline is being updated, and database query results. In the present embodiment, the data transferred between nodes using the Synchrony protocol 214 is referred to as "Synchrony data", is generated at run-time, and is not persistently saved by the nodes.

Figure 4:
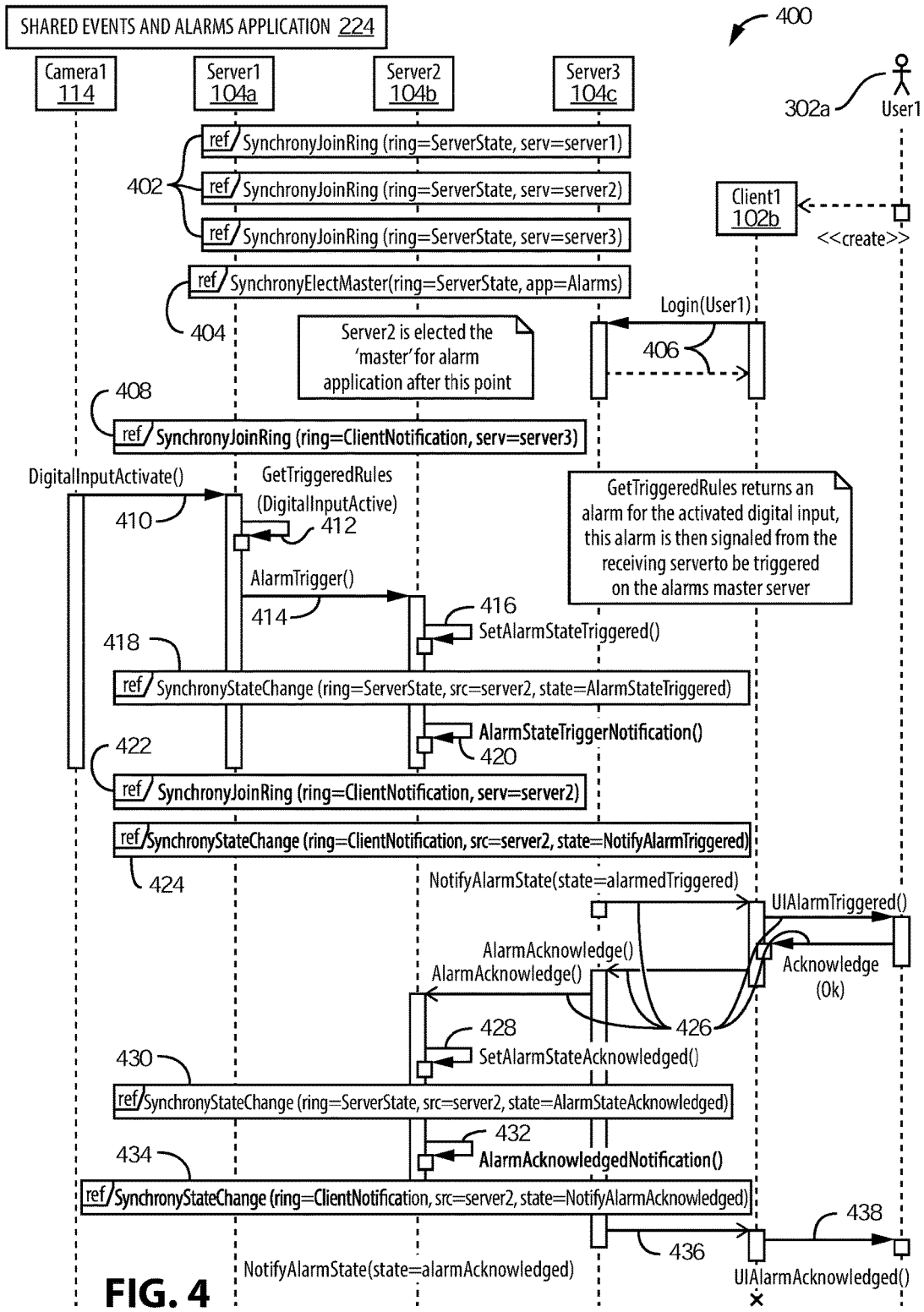
FIG. 4 is a UML sequence diagram showing how the system of FIG. 1 shares a state between different system users.

FIG. 4 shows a UML sequence diagram 400 in which an alarm notification is shared between the servers 104 using the Synchrony protocol 214. The objects in the diagram 400 are one of the non-node cameras 114, the three servers 104 in the first cluster 108a, and the second client 102b, which is connected to one of the servers 104c in the first cluster 108a.

At the first three frames 402 of the diagram 400, each of the servers 104 joins a Synchrony ring named "ServerState" so that the state of any one of the servers 104 can be communicated to any of the other servers 104; in the depicted embodiment, the state that will be communicated is "AlarmStateTriggered", which means that an alarm on one of the servers 108 has been triggered by virtue of an event that the non-node camera 114 has detected. At frame 404, the second server 104b is elected the "master" for the Alarms application; this means that it is the second server 104b that determines whether the input from the non-node camera 114 satisfies the criteria to transition to the AlarmStateTriggered state, and that sends to the other servers 104a,c in the Synchrony ring a message to transition them to the AlarmStateTriggered state as well.

The second user 302b logs into the third server 104c after the servers 104 join the ServerState Synchrony ring (message 406). Subsequent to the user 302b logging in, the third server 104c joins another Synchrony ring named "ClientNotification" (message 408); as discussed in further detail below, this ring is used to communicate system states to the user 302b, whereas the ServerState Synchrony ring is used to communicate only between the servers 104. The non-node camera 114 sends a digital input, such as a indication that a door or window has been opened, to the first server 104a (message 410), following which the first server 104a checks to see whether this digital input satisfies a set of rules used to determine whether to trigger an alarm in the system 100 (message 412). In the depicted embodiment, the first server 104a determines that an alarm should be triggered, and accordingly calls AlarmTrigger( ) (message 414), which alerts the second server 104b to change states. The second server 104 then transitions states to AlarmStateTriggered (message 416) and sends a message to the ServerState Synchrony ring that instructs the other two servers 104a,c to also change states to AlarmStateTriggered (frame 418).

After instructing the other servers 104a,c, the second server 104b runs AlarmTriggerNotification( ) (message 420), which causes the second server 104b to also join the ClientNotification Synchrony ring (frame 422) and pass a message to the ClientState Synchrony ring that causes the third server 104c, which is the other server on the Client-State Synchrony ring, to transition to a "NotifyAlarmTriggered" state (frame 424). Once the third server 104c changes to this state it directly informs the second client 102b that the alarm has been triggered, which relays this message to the second user 302b and waits for the user second 302b to acknowledge the alarm (messages 426). Once the second user 302b acknowledges the alarm, the second server 104b accordingly changes states to "AlarmStateAcknowledged" (message 428), and then sends a message to the ServerState Synchrony ring so that the other two servers 104a,c correspondingly change state as well (frame 430). The second server 104b subsequently changes state again to "NotifyAlarmAcknowledged" (message 432) and sends a message to the third server 104c via the ClientNotification Synchrony ring to cause it to correspondingly change state (frame 434). The third server 104c then notifies the client 102c that the system 100 has acknowledged the alarm (message 436), which relays this message to the second user 302b (message 438).

In an alternative embodiment (not depicted) in which the second server 104b fails and can no longer act as the master for the Synchrony ring, the system 100 automatically elects another of the servers 104 to act as the master for the ring. The master of the Synchrony ring is the only server 104 that is allowed to cause all of the other nodes on the ring to change state when the Synchrony ring is used to share alarm notifications among nodes.

Figure 7:
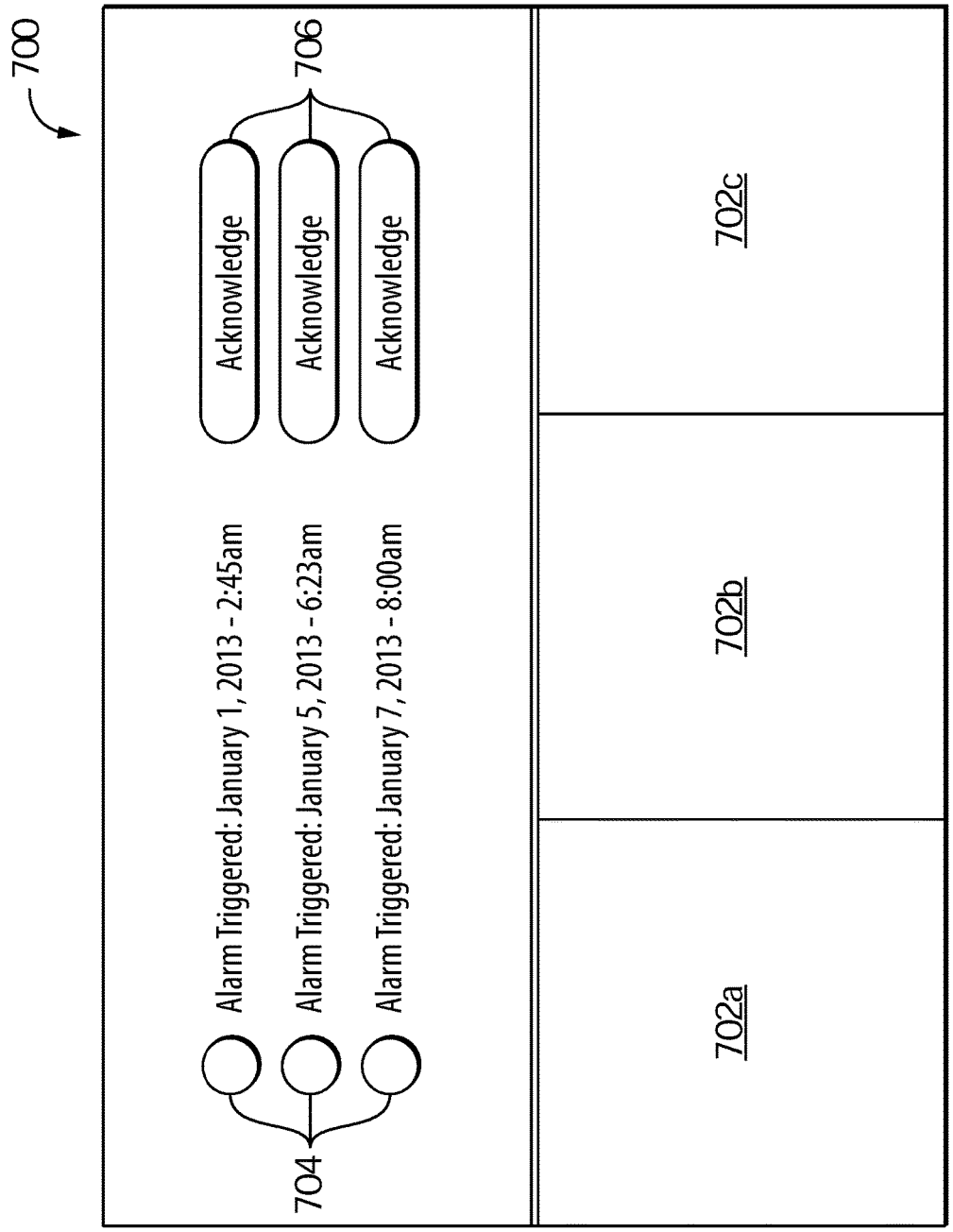
FIG. 7 is a view seen by a user of the system of FIG. 1.
Figure 8:
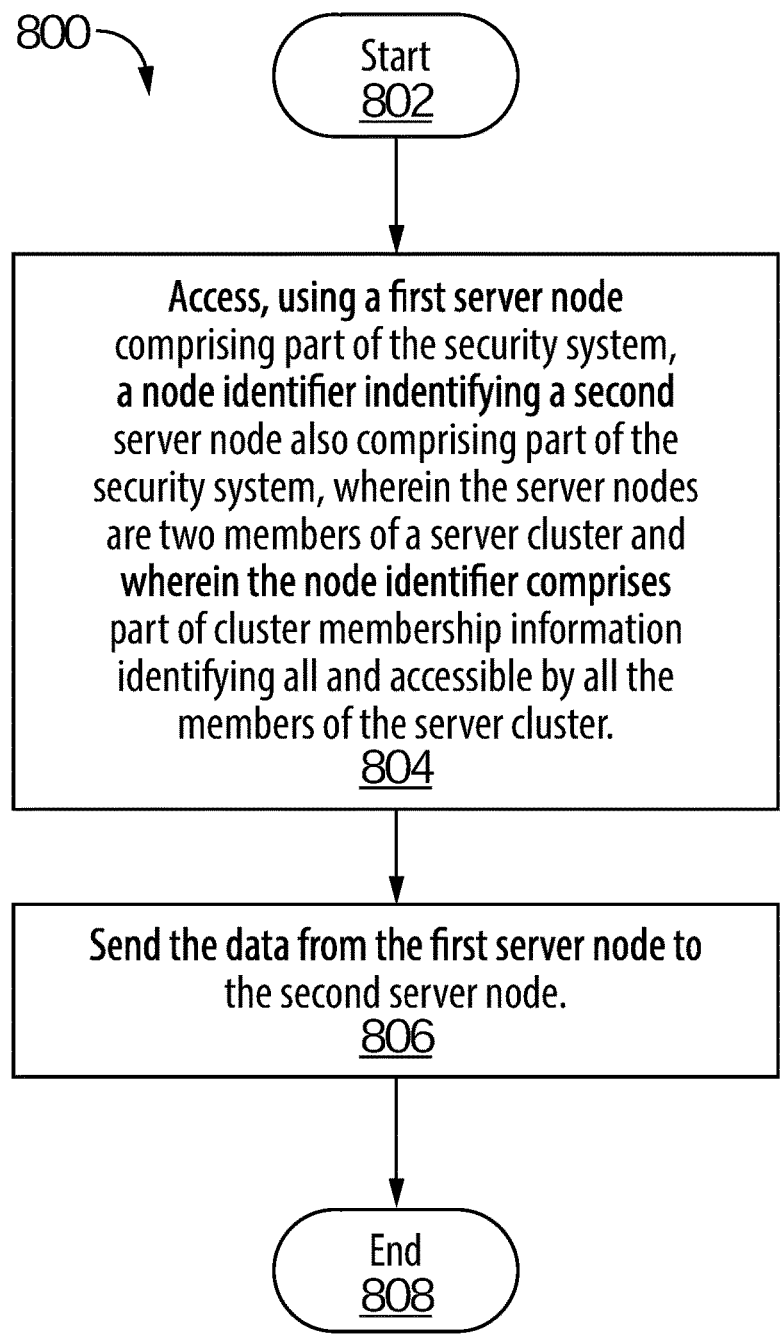
FIG. 8 is a method for sharing data in a physical security system, according to another embodiment.
Figure 9:
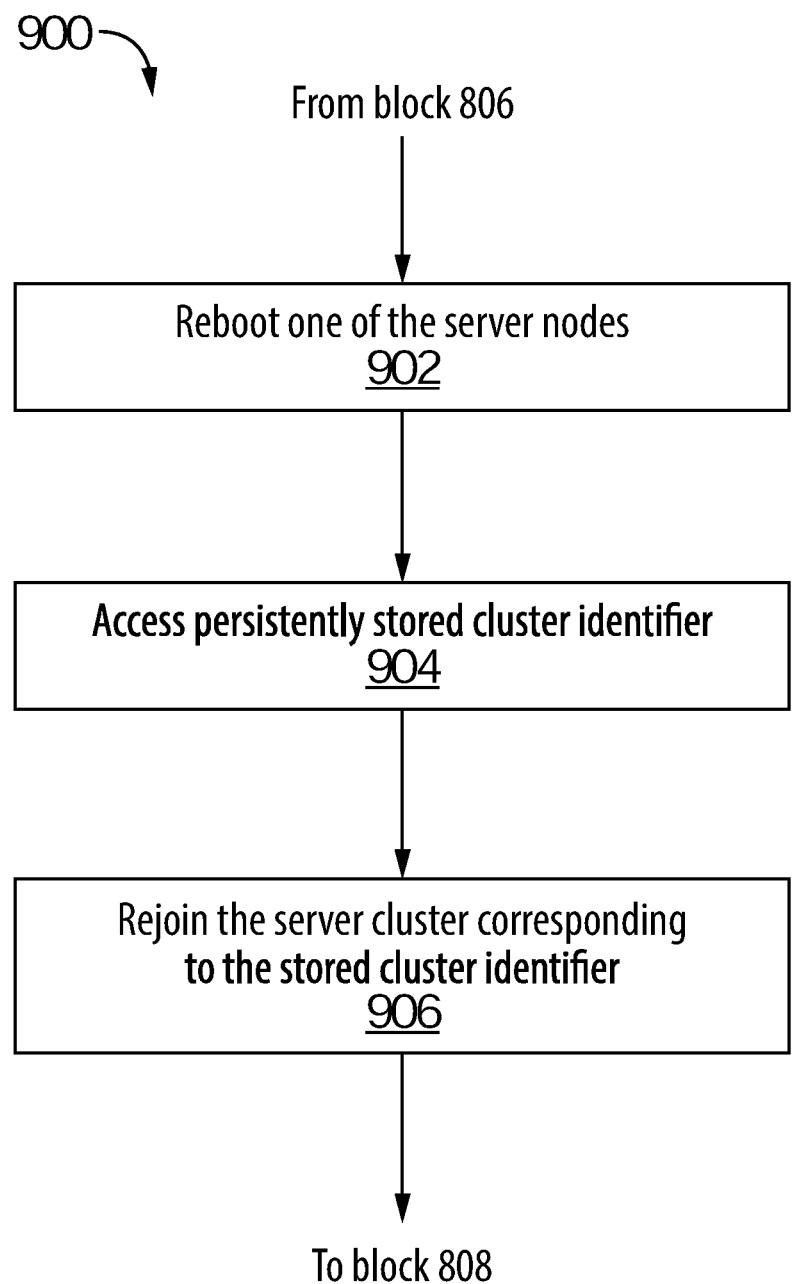
FIG. 9 is a method for automatically rejoining a cluster, according to another embodiment.

FIG. 7 shows an example view 700 presented to the users 302 when acknowledging an alarm state in accordance with the diagram 400 of FIG. 4. The view 700 includes video panels 702a-c (collectively "panels 702") showing real time streaming video from the non-node camera 114; alerts 704 indicating that an alarm has been triggered as a result of what the non-node camera 114 is recording; and an acknowledge button 706 that the second user 302b clicks in order to acknowledge the alarm having been triggered.

Shared Views and Collaboration Application 222

The users 302 of the system 100 may also want to share each others' views 700 and collaborate, such as by sending each other messages and talking to each other over the system 100, while sharing views 700. This shared views and collaboration application 222 accordingly allows the users 302 to share data such as view state and server to client notifications such as user messages and share requests. This type of data is Synchrony data that is shared in real-time.

Figure 5:
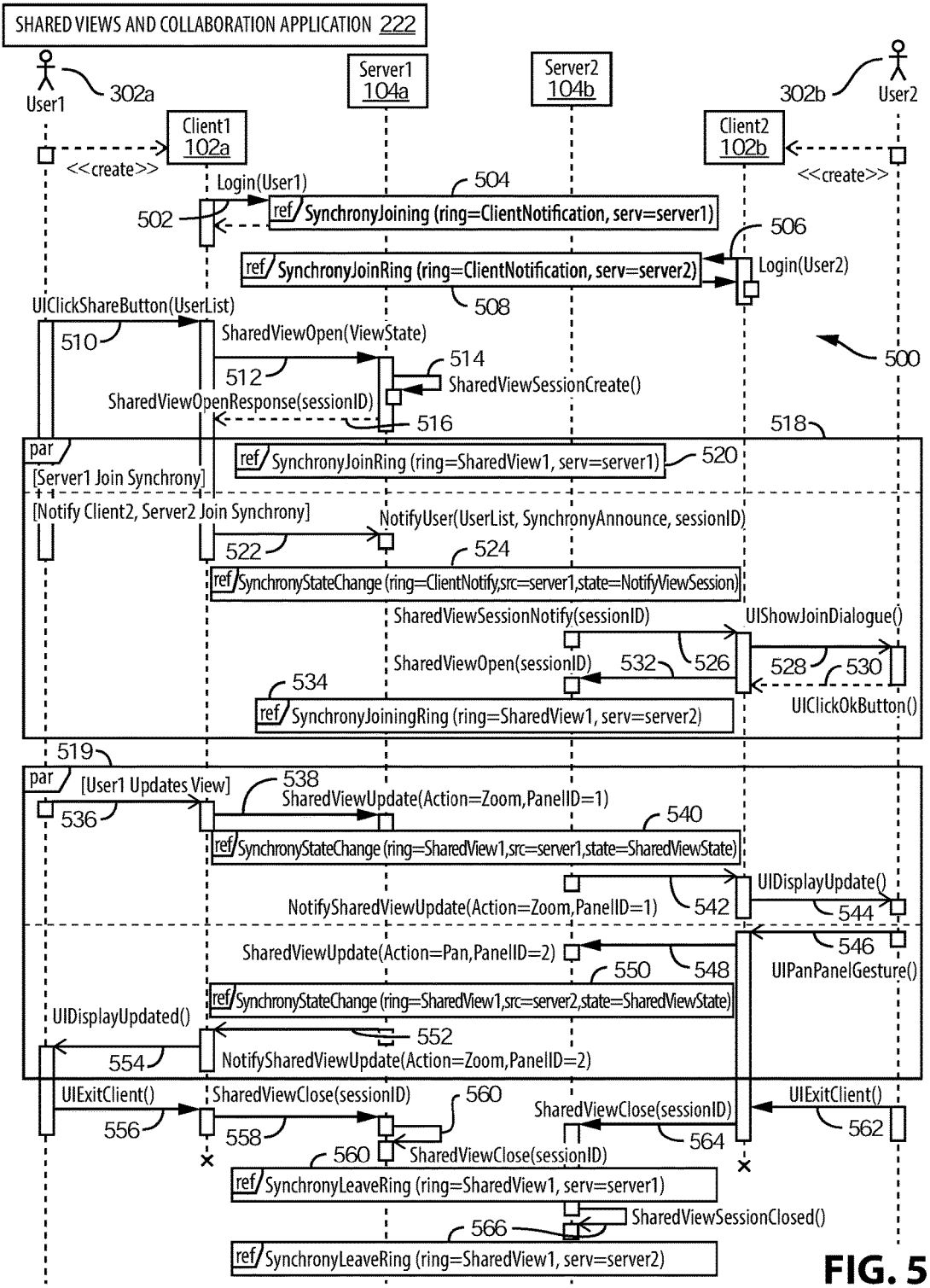
FIG. 5 is a UML sequence diagram showing how the system of FIG. 1 shares a view between different system users.

FIG. 5 shows a UML sequence diagram 500 in which views 700 are shared between the users 302 using the Synchrony protocol 214. The diagram 500 includes six objects: the first and second users 302a,b, the first and second clients 102a,b to which the first and second users 302a,b are respectively connected, and the first and second servers 104a,b to which the first and second clients 102a,b are respectively connected.

The first user 302a logs into the first server 104a via the first client 102a (message 502), following which the first server 104a joins the ClientNotification Synchrony ring (frame 504). Similarly, the second user 302b logs into the second server 104b via the second client 102b (message 506), following which the second server 104b also joins the ClientNotification Synchrony ring (frame 508).

The first user 302a then instructs the first client 102a that he wishes to share his view 700. The first user 302a does this by clicking a share button (message 510), which causes the first client 102a to open the view 700 to be shared ("shared view 700") on the first server 104a (message 512). The first server 104a creates a shared view session (message 514), and then sends the session identifier to the first client 102a (message 516).

At one frame 518 each of the clients 102 joins a Synchrony ring that allows them to share the shared view 700. The first server 104a joins the SharedView1 Synchrony ring at frame 520. Simultaneously, the first client 106a instructs the first server 104a to announce to the other server 104b via the Synchrony protocol 214 that the first user 302a's view 700 can be shared by passing to the first server 104a a user list and the session identifier (message 522). The first server 104a does this by sending a message to the second server 104b via the ClientNotify Synchrony ring that causes the second server 104 to change to a NotifyViewSession state (frame 524). In the NotifyViewSession state, the second server 104b causes the second client 106b to prompt the second user 302b to share the first user 302a's view 700 (messages 526 and 528), and the second user 302b's affirmative response is relayed back to the second server 104b (messages 530 and 532). The second server 104b subsequently joins the SharedView1 Synchrony ring (frame 534), which is used to share the first user 302a's view 700.

At a second frame 519 the users 106 each update the shared view 700, and the updates are shared automatically with each other. The first user 302a zooms into a first panel 702a in the shared view 700 (message 536), and the first client 102a relays to the first server 104a how the first user 302a zoomed into the first panel 702a (message 538). The first server 104a shares the zooming particulars with the second server 104b by passing them along the SharedView1 Synchrony ring (frame 540). The second server 104b accordingly updates the shared view 700 as displayed on the second client 106b (message 542), and the updated shared view 700 is then displayed to the second user 302b (message 544). Simultaneously, the second user 302b pans a second panel 702b in the shared view 700 (message 546), and the second client 102b relays to the second server 104b how the second user 302b panned this panel 702b (message 548). The second server 104b then shares the panning particulars with the first server 104a by passing them using the SharedView1 Synchrony ring (frame 550). The first server 104a accordingly updates the shared view 700 as displayed on the first client 106b (message 552), and the updated shared view 700 is then displayed to the first user 302a (message 556).

After the second frame 519, the first user 302a closes his view 700 (message 556), which is relayed to the first server 104a (message 558). The first server 104a consequently leaves the SharedView1 Synchrony ring (message and frame 560). The second user 302b similarly closes his view 700, which causes the second server 104b to leave the SharedView1 Synchrony ring (messages 562 and 564, and message and frame 566).

In the example of FIG. 5, the users 302 pan and zoom the shared view 700. In alternative embodiments (not depicted) the users 302 may modify the shared view 700 in other ways. For example, the users 302 may each change the layout of the panels 702; choose whether video is to be displayed live or in playback mode, in which case the users 302 are also able to pause, play, or step through the video; and display user objects such as maps or web pages along with information about the user object such as revision history. In these alternative embodiments, examples of additional state information that is synchronized using a Synchrony ring include whether a video is being played, paused, or stepped through and the revision history of the user object.

Figure 12:
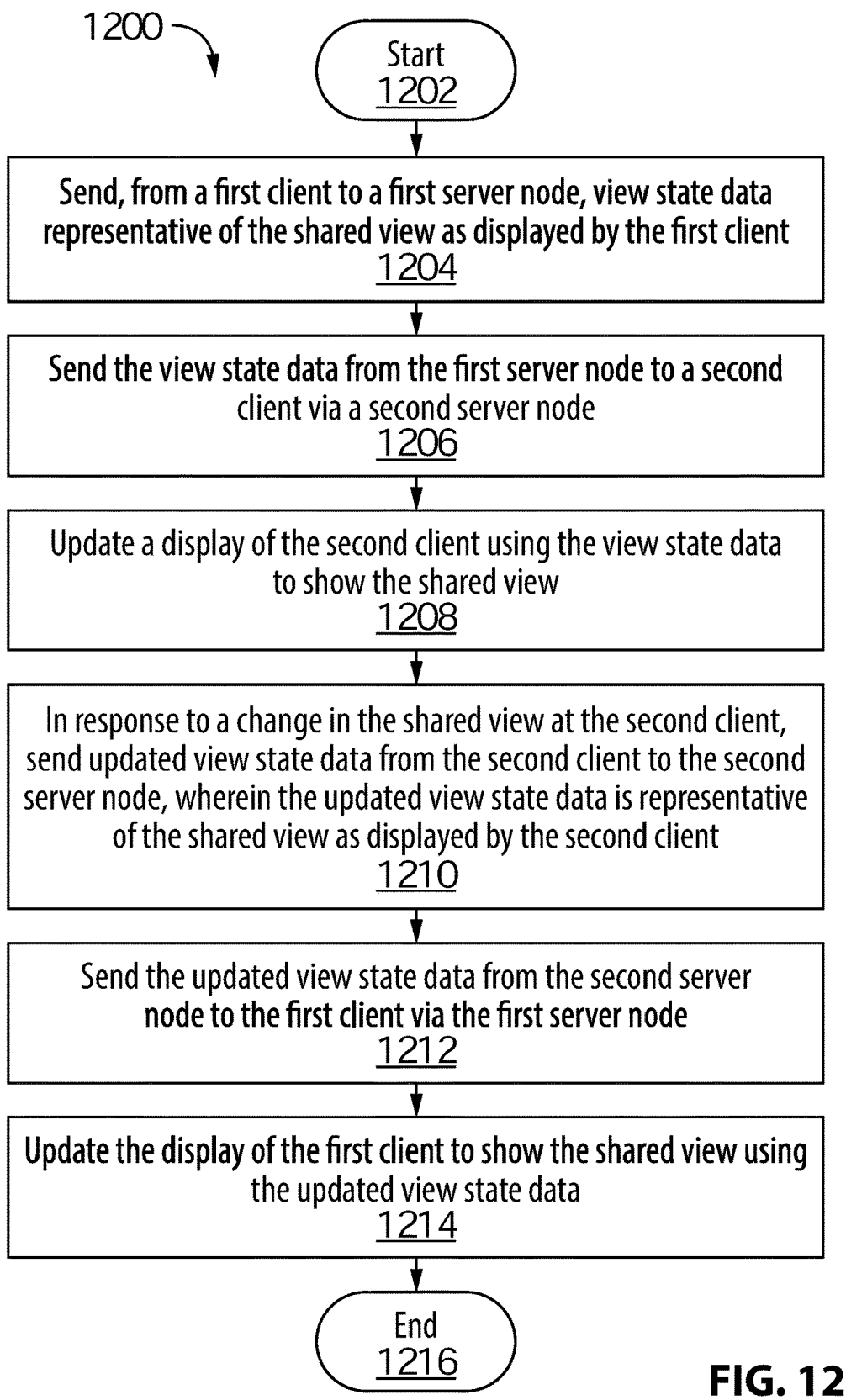
FIG. 12 is a method for sharing a view using a physical security system that comprises a plurality of server nodes, according to another embodiment.

While the discussion above focuses on the implementation of the shared views and collaboration application 222 in the peer-to-peer physical security system 100 of FIG. 1, more generally this application 222 may be implemented in a physical security system that has multiple servers 104, such as a federated system that includes a centralized gateway server. An example of this more general embodiment is shown in FIG. 12, which depicts an example method 1200 for sharing a view using a physical security system that comprises a plurality of server nodes. The method 1200 begins at block 1202 and proceeds to block 1204, where view state data representative of the view displayed by the first client (such as the first client 102a), which is the view to be shared, is sent from the first client to a first server node (such as the first server 104a and the view state data sent via message 538). At block 1206 the view state data is relayed from the first server node to a second client (such as the second client 102b) via a second server node (such as the second server 104b and the view state data sent via frame 540 and message 542). At block 1208 the second client then updates a display using the view state data to show the shared view (such as via message 544). In response to a change in the shared view at the second client, such as a change resulting from interaction with a user at the second client (such as via message 546), at block 1210 updated view state data is sent from the second client to the second server node (such as via message 548). The updated view state data is representative of the shared view as displayed by the second client. The updated view state data is sent from the second server node to the first client via the first server node at block 1212 (such as via frame 550 and message 552), and at block 1214 the first client's display is then updated to show the shared view as it was modified at the second client using the updated view state data (such as via message 554). The method 1200 ends at block 1216. In an alternative embodiment such as when dealing with a federated system that uses a centralized gateway server, all the view state data may be routed through that centralized server.

Unattended View Sharing Application 225

The users 302 of the system 100 may also want to be able to see and control a view on a display that is directly or indirectly connected to one of the servers 104 that the users 302 do not directly control (i.e., that the users 302 control via other servers 104) (this display is an "unattended display", and the view on the unattended display is the "unattended view"). For example, the unattended display may be mounted on a wall in front of the users 302 and be connected to the server cluster 108 via one of the servers 104 in the cluster 108, while the users 302 may be connected to the server cluster 108 via other servers 104 in the cluster 108. As discussed below with respect to FIG. 10, the unattended view sharing application 225 permits the users 302 to view and control the unattended view notwithstanding that none of the users 302 is directly connected to the server 104 controlling the unattended view. The view data exchanged between the servers 104 to enable this functionality is Synchrony data that is shared in real-time.

FIG. 10 shows a UML sequence diagram 1000 in which the unattended view is shared with the first user 302a using the Synchrony protocol 214. The diagram 1000 includes six objects: the first user 302a, the first client 102a to which the first user 302a is connected and that includes a display ("client display") with which the first user 302a interacts, the first and second servers 104a,b, a monitor instance 1004 running on hardware such as an unattended one of the clients 102 connected to both the second server 104b and the unattended display, and an administrator 1002 who sets up the monitor instance 1004. In an alternative embodiment (not depicted), the unattended display may be directly connected to the second server 104b and the monitor instance 1004 may run on the second server 104b.

In FIG. 10, the administrator 1002 creates the monitor instance 1004 (message 1006) and the monitor instance 1004 then automatically logs into the second server 104b (messages 1008 and 1010). The monitor instance 1004 makes the unattended view available to the second server 104b by calling SharedViewOpen(viewState) on the second server 104, where viewState is view state data indicative of the unattended view (message 1012). Following this the second server 104b creates a shared view session (message 1014) by running SharedViewSessionCreate( ) and then sends the corresponding session identifier to the monitor instance (message 1016). After receiving the session identifier the monitor instance 1004 joins the SharedView1 Synchrony ring (frame 1018), which is used to transmit view state data to and from the other servers 104 in the cluster 108 that are also members of the SharedView1 Synchrony ring.

After joining the SharedView1 Synchrony ring, the monitor instance 1020 publishes a notification to the other servers 104 in the cluster 108 that the unattended view is available to be seen and controlled. The monitor instance 1020 does this by calling RegisterMonitor(sessionId) on the second server 104b (message 1018), which causes the session identifier related to the unattended view to be registered in a view directory (frame 1022). The view directory is shared with the other servers 104 in the cluster 108 using the Consistency protocol 216.

Once the view directory is disseminated to the other servers 104 in the cluster 108, those other servers 104 can access the view directory to determine which unattended views are available to view and control. After the first server 104a receives the view directory, the first user 302a via the first client 102a logs into the first server 104a, thereby gaining access to the cluster 108 (messages 1024) and the view directory. The first user 102a instructs the first client 102a to display the unattended view by calling UIDisplayMonitor(sessionId) (message 1026), which causes the first client 102a to send the unattended view's session identifier to the first server 104a with instructions to open the unattended view (message 1028). The first server 104a acknowledges the instructions of the first client 102a (message 1030) and then joins the SharedView1 Synchrony ring (frame 1032) in order to automatically receive view state data describing the current view of the unattended display (message 1034) and to automatically stay apprised of any subsequent changes to the unattended view.

The first user 302a subsequently pans one of the panels of the unattended view as it is displayed on the client display (message 1036), and the first client 102a relays the panning action and the identity of the particular panel that is panned to the first server 104a by calling SharedViewUpdate (action=pan, panelId=2) (message 1038). The first server 104a sends updated view state data to all the servers 104 that are members of the SharedView1 Synchrony ring (frame 1040), which allows all of those servers 104 to reproduce the updated version of the unattended view. The second server 104b receives this updated view state data and relays it to the monitor instance 1004 by calling NotifySharedViewUpdate (action=pan, params, panelId=2) (message 1042). The monitor instance 1004 then updates the unattended display to show the unattended view as modified by the first user 302a (message 1044).

In the example of FIG. 10, the first user 302a pans one of the panels of the unattended view. In alternative embodiments (not depicted) the first user 302a may modify the unattended view in other ways. For example, the first user 302a may change the layout of any one or more of the unattended view's panels; choose whether video is to be displayed live or in playback mode, in which case the first user 302a is also able to pause, play, or step through the video; and display user objects such as maps or web pages along with information about the user object such as revision history. In these alternative embodiments, examples of additional state information that is synchronized using a Synchrony ring include whether a video is being played, paused, or stepped through and the revision history of the user object.

In another alternative embodiment (not depicted), the unattended view sharing application 225 may be used to create an aggregate display comprising a matrix of n×m unattended displays. For example, where n=m=2 and there are consequently four unattended displays, the first user 302a may control all four of the unattended displays simultaneously to create one, large virtual display. A single video can then be enlarged such that each of the unattended views is of one quadrant of the video, thereby allowing the video to be enlarged and shown over the four unattended displays. In this embodiment, the monitor instances 1004 for the unattended displays may be communicative with the server cluster 108 via any of one to four of the servers 104.

While FIG. 10 shows only the first user 302a, in alternative embodiments (not depicted) more than one of the users 302 can see and control the unattended view by also joining the SharedView1 Synchrony ring. In the above example of the aggregated display comprising the n×m matrix of unattended displays, the aggregated display can be mounted in the room for simultaneous viewing several of the users 302 with each of the users 302 having the ability to control each of the unattended views.

While the discussion above focuses on the implementation of the unattended view sharing application 225 in the peer-to-peer physical security system 100 of FIG. 1, more generally this application 225 may be implemented in a physical security system that has multiple servers 104, such as a federated system that includes a centralized gateway server. An example of this more general embodiment is shown in FIG. 11, which depicts an example method 1100 for interacting with the unattended display in a physical security system comprising multiple server nodes. The method begins at block 1102 and proceeds to block 1104 where a second server node (such as the second server 104b) that is communicative with the unattended display sends to a first server node (such as the first server 104a) view state data indicative of the unattended view (such as via the Synchrony ring at frames 1020 and 1032 of FIG. 10). The method 1100 then proceeds to block 1106 where at least a portion of the unattended view is displayed on the client display (such as the update of the client display that results from message 1034 of FIG. 10) following which the method 1100 ends at block 1108. In an alternative embodiment such as when dealing with a federated system that uses a centralized gateway server, all the view state data may be routed through that centralized server.

Cluster Streams Application 220

Figure 6:
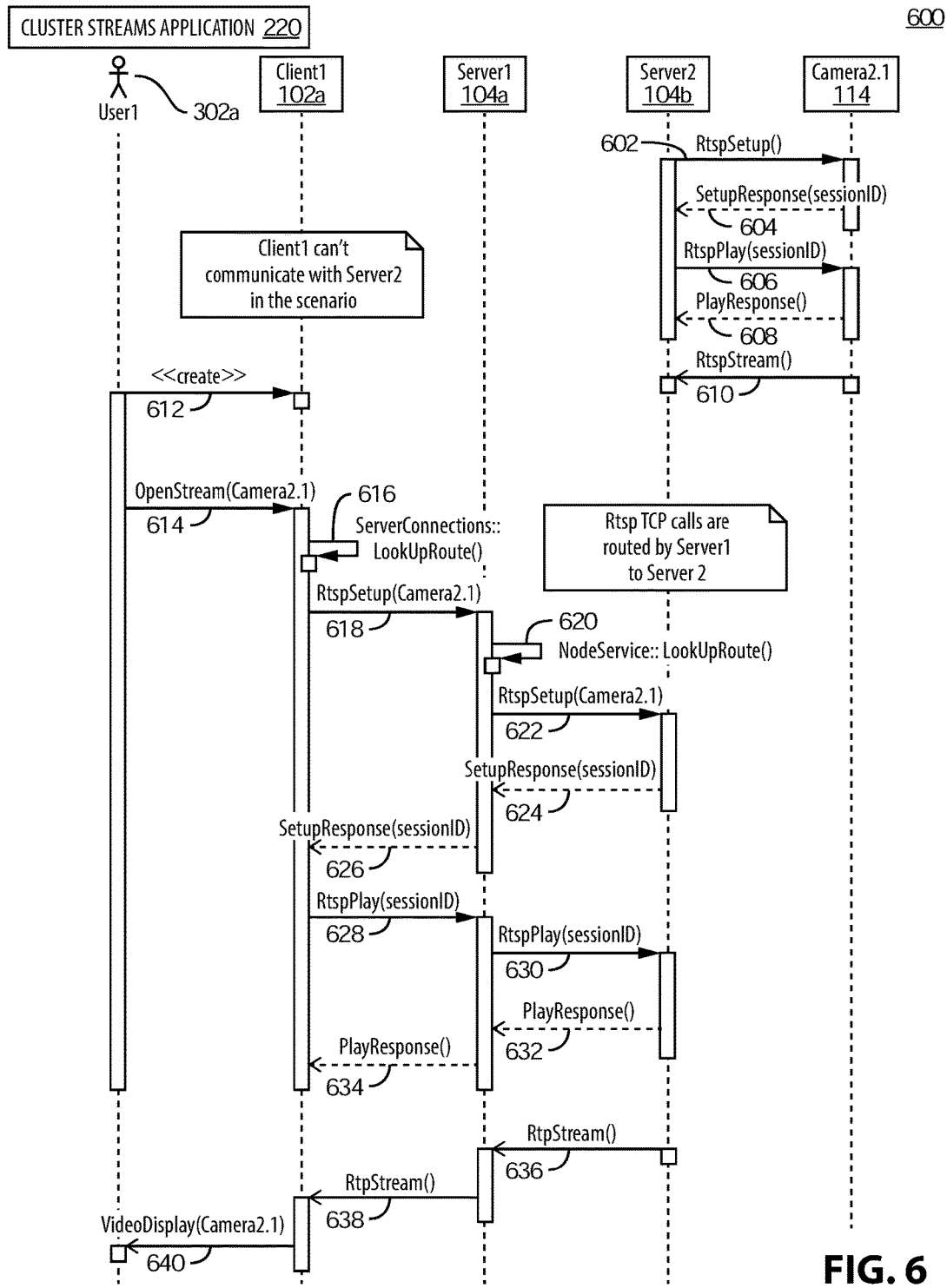
FIG. 6 is a UML sequence diagram showing how the system of FIG. 1 shares streams between different system users.

One of the users 302 may also want to stream video from one of the cameras 106,114 if a point-to-point connection between that user 302 and that camera 106,114 is unavailable; the cluster streams application 220 enables this functionality. FIG. 6 shows a UML sequence diagram 600 in which video is streamed from the non-node camera 114 to the first user 302a through the first and second servers 104a,b and the first client 102a. The UML diagram has five objects: the first user 302a, the first client 102a, the first and second servers 104a,b, and the non-node camera 114. The first client 102a can directly communicate with the first server 104a, but cannot directly communicate with the second server 104b. However, the first and second servers 104a,b can communicate directly with each other. Additionally, while the second server 104b and the non-node camera 114 can communicate directly with each other, the first server 104a and the non-node camera 114 cannot directly communicate.

The second server 104b first establishes a session with the non-node camera 114 so that video is streamed from the non-node camera 114 to the second server 104b. The second server 104b first sets up a Real Time Streaming Protocol (RTSP) session with the non-node camera 114 (messages 602 and 604), and instructs the non-node camera 114 to send it video (messages 606 and 608). The non-node camera 114 subsequently commences streaming (message 610).

The first user 302a establishes a connection with the first client 102a (message 612) and then instructs the first client 102a to open a window showing the streaming video (message 614). The first client 102a then calls LookupRoute( ) to determine to which server 104 to connect (message 616); because the first client 102a cannot connect directly to the second server 104b, it sets up an RTSP connection with the first server 104a (message 618). The first server 104b then calls LookupRoute( ) to determine to which node to connect to access the real-time video, and determines that it should connect with the second server 104b (message 620). The first server 104a subsequently sets up an RTSP connection with the second server 104b (message 622), and the second server 104b returns a session identifier to the first server 104a (message 624). The first server 104a relays the session identifier to the first client 102a (message 626). Using this session identifier, the first client 102a instructs the second server 104b to begin playing RTSP video (messages 628 to 634), and the second server 104b subsequently streams video to the first user 302a via the second server 104b, then the first server 104a, and then the first client 102a (messages 636 to 640).

While FIG. 6 routes video from one of the non-node cameras 114 connected to one of the servers 104 in a cluster 108 to other servers 104 in the same cluster 108, in alternative embodiments (not depicted) video may also be routed from one of the node cameras 106 in a cluster 108 through the other node cameras 106 in the same cluster 108.

Upgrade Application 232

It may be desirable to upgrade the system 100 from time to time. As the system 100 comprises a plurality of the servers 104, upgrading the system 100 comprises upgrading one or more of those servers 104. The upgrade application 232 permits the user 302 of the system 100 to upload an installer blob to any one of the servers 104, which may then be propagated using the protocol suite 200 to another of the servers 104 (and, in some example embodiments, to more than one or to all of the other servers 104) in the system 100. The installer blob comprises an installation package and installer metadata, with the installation package being the executable that the servers 104 may run in order to perform an upgrade and the installer metadata comprising metadata related to the installation package, as described in further detail below. In certain embodiments, this permits the user 302 to upload a single installation package to the system 100 and to leverage the protocol suite 200 to use that package to upgrade all of the servers 104. In embodiments in which the cluster 108 is a singleton cluster, the installation package can be uploaded to and executed on the one server 104 that comprises the singleton cluster without leveraging the protocol suite 200 to propagate the package to all of the servers 104.

In some embodiments, upgrading the system 100 in this manner may be independent of the operating systems the servers 104 may run. In these embodiments, if some of the servers 104 run incompatible operating systems (e.g., some of the servers 104 run the Microsoft Windows™ operating system while others run a Unix™ based operating system), the system 100 may leverage the protocol suite 200 to propagate the installation package to the servers 104 notwithstanding that different servers 104 may run different operating systems. Additionally or alternatively, some of the servers 104 may comprise computer appliances that may not run a general purpose operating system; the protocol suite 200 may nonetheless again be leveraged to distribute the installation package throughout the system 100.

Figure 14A:
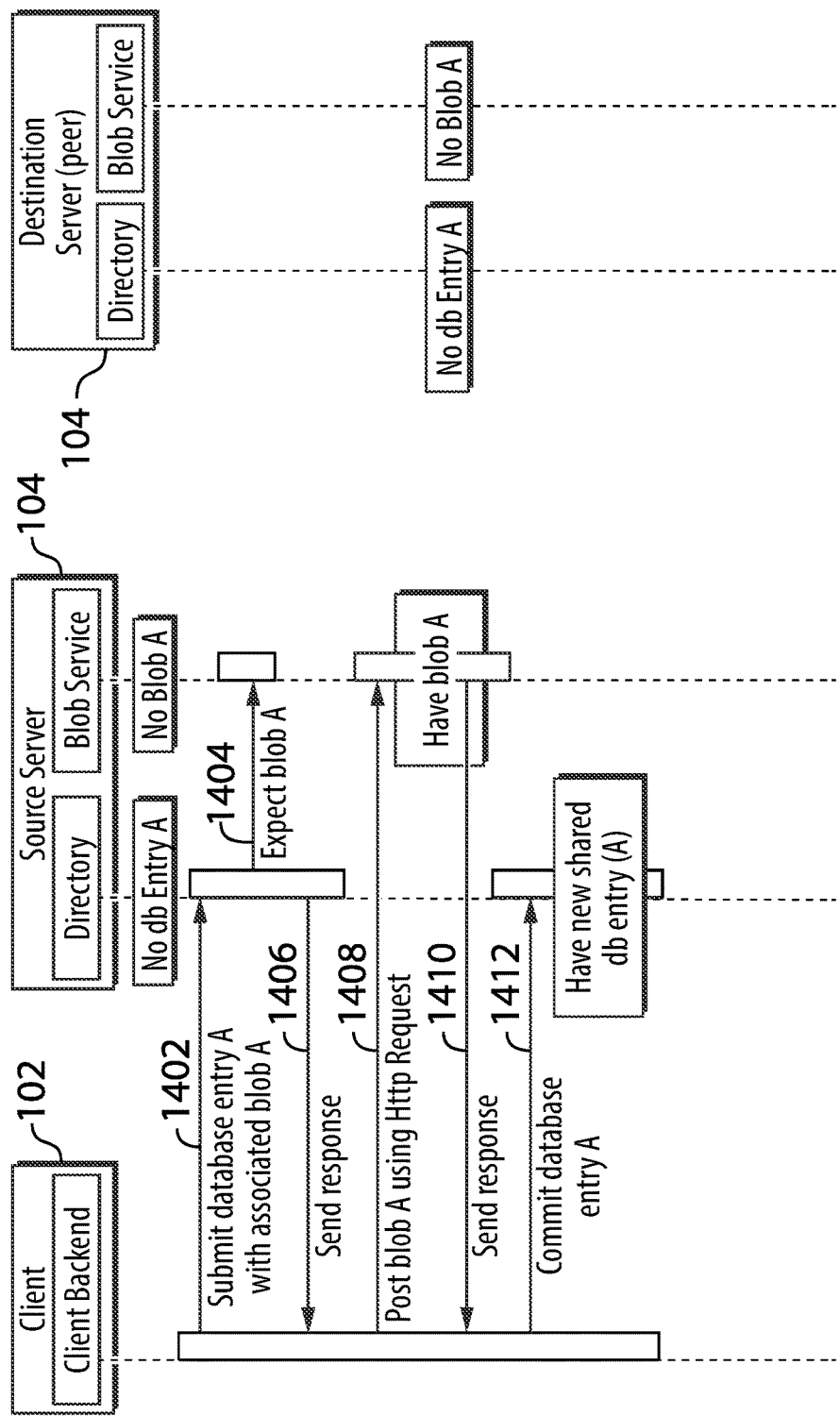
FIGS. 14A and 14B collectively represent a UML sequence diagram showing how the system of FIGS. 13A-13Q receives and propagates a blob between any two of the servers comprising the system.
Figure 14B:
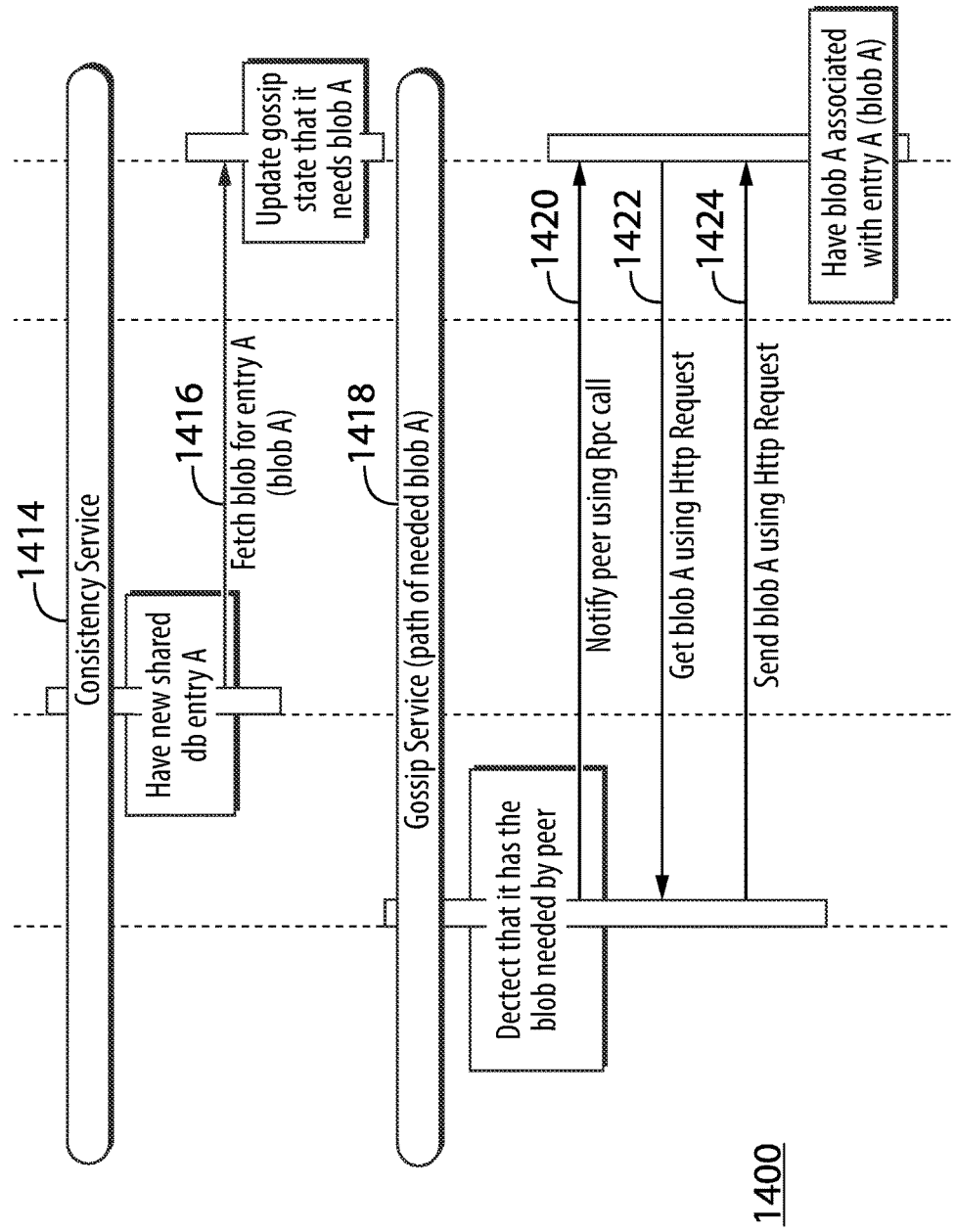

Referring now to FIGS. 14A and 14B, there is shown a UML sequence diagram 1400 showing how the system 100 receives a blob from one of the clients 102 and propagates the blob from the source server 104 to the requesting server 104 using the protocol suite 200. While not depicted in FIGS. 14A and 14B, the source server 104 may simultaneously or subsequently also propagate, or may have previously propagated, the blob to other servers 104; analogously, after receiving the blob from the source server 104, the requesting server 104 may propagate the blob to one or more additional servers 104.

The diagram 1400 shows as objects the client 102 and the source and requesting servers 104. Running on the client 102 is a client backend, and running on each of the source and requesting servers 104 is a directory service and a blob service. The blob service implements the blob protocol 219. The directory service is an application layer interface that is layered on top of many of the protocols that comprise the protocol suite 200, such as the Gossip protocol 208 and the Consistency protocol 216, to permit the blob service and the client backend to communicate using the protocol suite 200. The directory service also maintains a blob database of blobs stored on the server 104 on which the directory service is running and, by virtue of the Consistency service and as discussed in more detail below, learns of and includes in the blob database information on blobs stored on other servers 104 in the cluster 108. Prior to the client 102 and the source server 104 communicating, the blob database is empty on the source and requesting servers 104 and no blobs have been transferred to the source or the requesting servers 104. In alternative embodiments (not depicted in FIGS. 14A and 14B), the directory service may be omitted, and applications and other services may directly interface and call on the protocols comprising the protocol suite 200 without using the directory service as an intermediary.

Each of the blobs is associated with a directory key that uniquely identifies it. The client 102 generates the key and sends it to the source server 104, and the key identifies to which entry in the blob database metadata for that blob is written. The blob database entry comprises an attribute map, which includes the identifier of the blob, such as the blob's URI. The key comprises one or more fields that identifies which of the protocols in the protocol suite 200 are to be used for inter-server communication when transmitting data indexed by or otherwise associated with the key. For example, the key may comprise a field that identifies it as identifying installer metadata in the blob database, which the directory service interprets to mean that the blob service is to be used to transfer between the servers 104 the installer blob associated with that installer metadata. As another example, the key may comprise the path, "/shared/packages", with the "shared" portion of the key identifying that the information associated with the key is to be shared using the Consistency protocol 216.

The client 102 begins by submitting a database entry A that is associated with a blob A to the directory service on the source server 104 (message 1402). The database entry A comprises metadata (such as the installer metadata discussed in more detail below in respect of FIGS. 15A and 15B) and the URI of the associated blob A. A packages service on the source server 104 verifies the database entry A and calls Expect on the blob service (message 1404), which prepares the blob service to receive the blob A; an example of validation is provided in respect of FIGS. 15A and 15B and the packages service, below. After calling Expect, the directory service sends a response to the client 102 (message 1406) informing the client that the blob service is ready to receive the blob A following which the client 102 sends the blob A to the blob service on the source server 104 using an HTTP Post request (message 1408) and response (message 1410). After sending the blob A to the blob service on the source server 104, the client 102 commits the database entry A to the blob database (message 1412), which prevents the transaction from being rolled back. After the database entry A is committed, the directory service shares via the Consistency protocol 216 (frame 1414) to the other servers 104 in the same cluster 108 the fact that the database entry A has been committed, the blob path for the associated blob A, and that the associated blob A is ready for propagation to other servers 104.

The directory service of the requesting server 104 is notified via the consistency service that the database entry A has been committed on the source server 104, and subsequently calls Fetch on the requesting server's 104 blob service (message 1416). The requesting server 104 then checks to see if it has the blob A at the URI transmitted via the Consistency protocol 216; in this example, the requesting server 104 does not, and it consequently adds the blob's URI and the service to notify on completion of fetching the blob A (in this example embodiment, the packages service) to a fetch map that it shares via the Gossip protocol 208 to all of the other servers 104 in the cluster 108 (frame 1416). The blob service on the requesting server 104 also shares via the Gossip protocol 208 at frame 1416 application state data indicating the node identifier of the requesting server 104 as well as associated data such as the blob's URI and filename. All of the other servers 104 in the cluster 108 receive the requesting server's 104 update, store the update in a peer map, and check to see if they have the blob A.

While in the depicted example embodiment it is a request from the requesting server 104 that prompts the other servers 104 to check to see if they have the blob A, in an alternative embodiment (not depicted) this check also happens if a new blob is uploaded to the source server 104 and the source server's 104 peer map is not empty. That is, if there is an outstanding request by the requesting server 104 for the new blob, the source server 104 responds to it as soon as it receives the new blob from the client 102 notwithstanding that the request from the requesting server 104 has been pending for some time.

In this example, only the source server 104 has the blob A. Consequently, the source server 104 determines that it has the blob A requested by the requesting server 104 and calls Notify on the requesting server 104 (message 1420) to inform the blob service on the requesting server 104 that it has the blob A. In response, the requesting server 104 adds the node identifier of the source server 104 and the blob's URI to a "get queue", which the requesting server 104 periodically processes until it is empty. When the entry in the get queue for the blob A is processed, the blob service on the requesting server 104 places an HTTP Get request (message 1422) to the blob service of the source server 104 asking for the blob A, which the source server 104 provides via an HTTP Put request (message 1424). Upon receiving the blob A, the requesting server 104 saves the blob A, removes the corresponding entry from the get queue and the item in the fetch map (after invoking any associated callbacks to notify one or more services that the blob A has been fetched) having the blob URI for the transferred blob A, and updates its application state that it shares via the Gossip protocol 208 to indicate that it no longer is searching for the blob A. The other servers 104 in the cluster 108 upon receiving this update remove the node identifier of the requesting server 104 from the peer map.

In the event the requesting server's 104 HTTP request for the blob A (message 1422) fails, the requesting server 104 moves the source server 104 of the blob A to the end of a source server list for the blob A and moves the corresponding entry in the get queue to the end of the get queue. If the requesting server 104 receives any additional notifications from more than one of the other servers 104 in the cluster that the blob A is available, in this example embodiment those notifications are buffered in a first in, first out ("FIFO") queue and the requesting server 104 processes them accordingly. However, in alternative embodiments the requesting server 104 may process those additional notifications other than in a FIFO manner; for example, the requesting server 104 may process the queued notifications randomly. Additionally or alternatively, instead of moving the corresponding entry in the get queue to the end of the get queue, the requesting server 104 may cycle through the source server list for the current get queue entry if the requesting server's 104 HTTP request for the blob A fails, or alternatively may move the get queue entry to the end of the get queue but not move the source server 104 of the blob A to the end of the source server list.

In the present example embodiment, each of the servers 104 is able to send the blob A to only another one of the servers 104 at any given time. Consequently, during propagation of the blob A among the servers 104, once the requesting server 104 receives the blob A from the source server 104, both the requesting and source servers 104 may deliver the blob A to two additional servers 104. Once those additional servers 104 have received the blobs A, all four of those servers 104 may deliver the blob A to four more of the servers 104, and so on.

HTTP transfers of the blob A (messages 1408 and 1424) are performed using chunked transfer encoding. When an HTTP Post request is made to send the blob A to the source server 104 from the client 102 (message 1408), the client 102 reads fixed portions of the blob A from its beginning to end and sends HTTP posts of each chunk to the source server 104 as it reads the blob A. The Post request accepts an upload progress callback in addition to an upload complete callback. The source server 104 invokes the upload progress callback for every chunk sent, which permits the client 102 to update a progress bar showing upload progress, as shown in FIG. 13I and as discussed below. Transmissions of the blob A between the source and requesting servers 104 are similarly chunked.

Figure 13A:
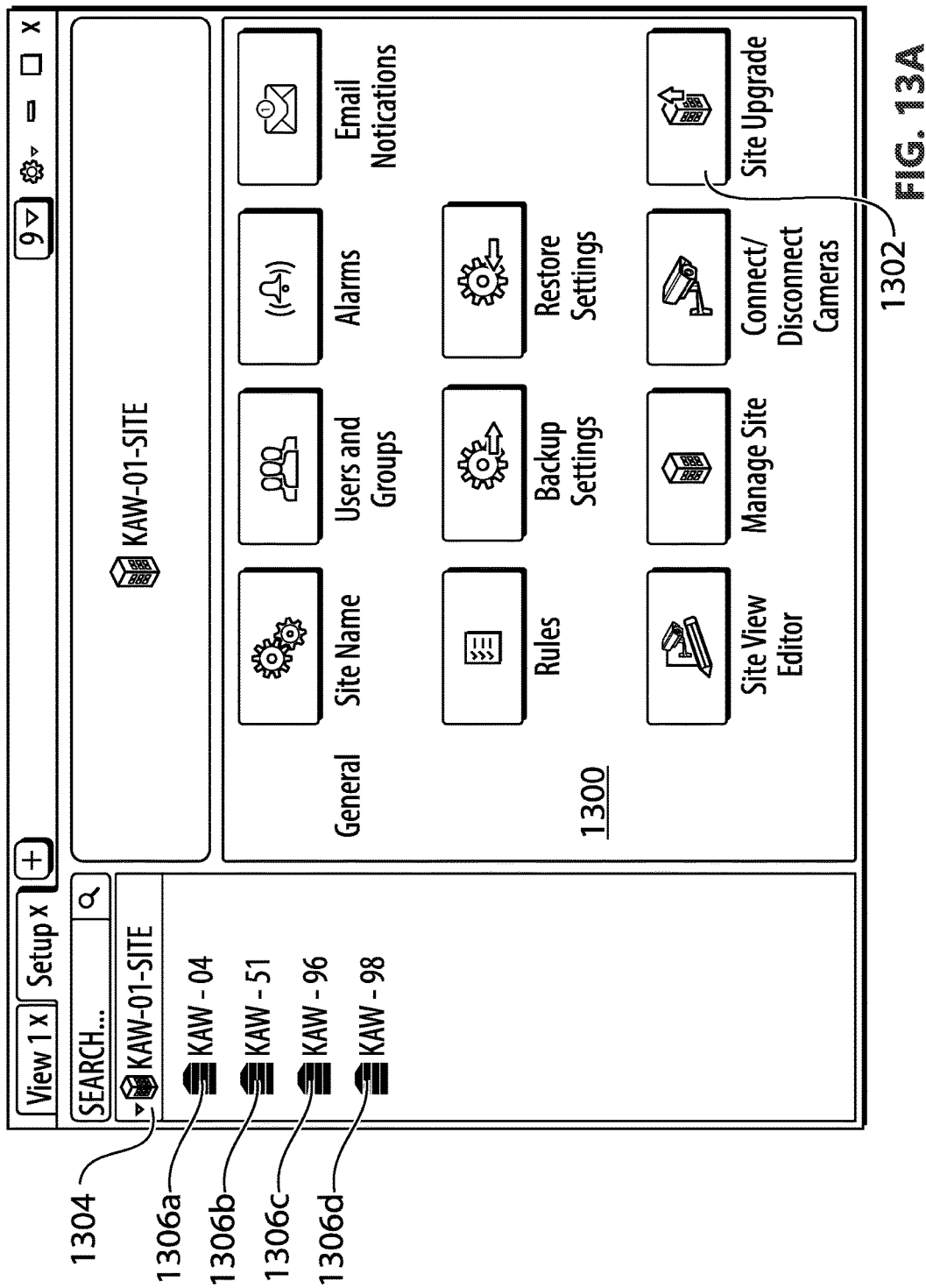
FIGS. 13A-13Q are screenshots taken of a client of a physical security system that comprises a plurality of server nodes while the physical security system is being upgraded, according to another embodiment.
Figure 13B:
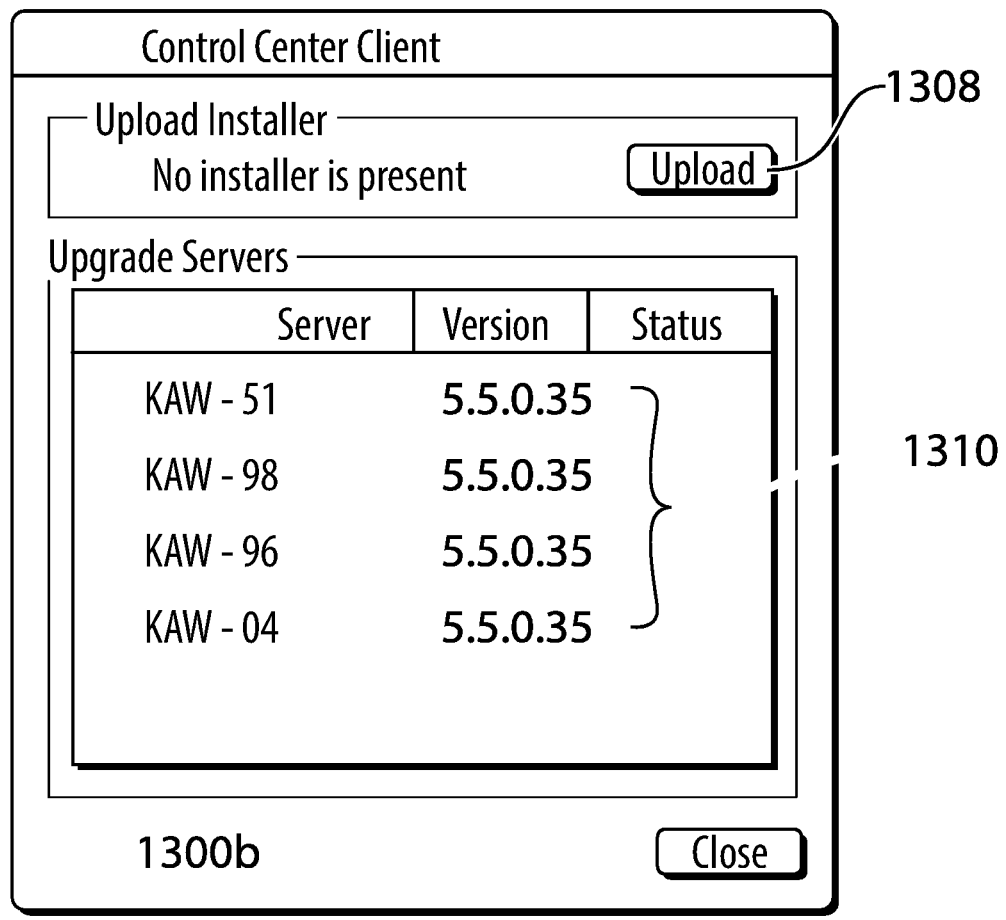
Figure 13C:
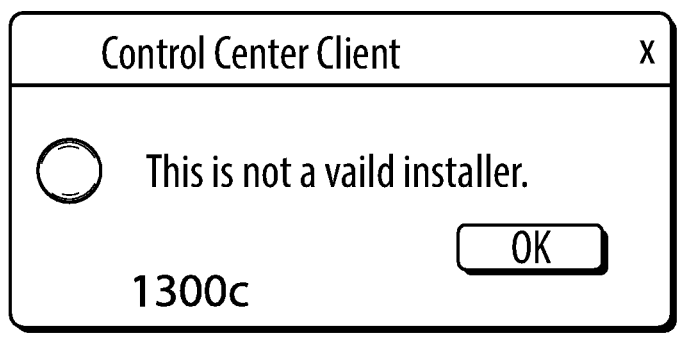
Figure 13D:
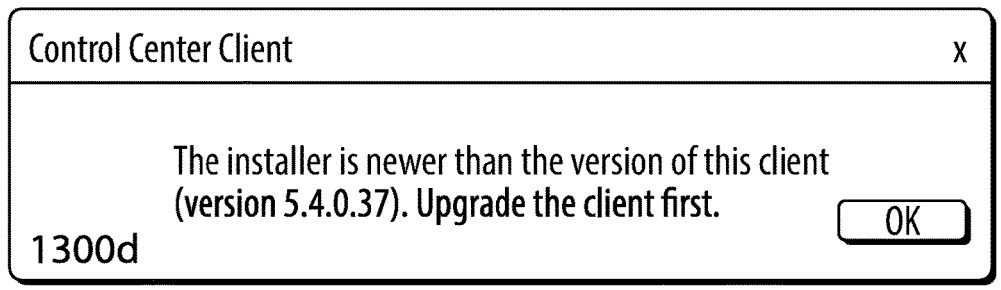
Figure 13E:
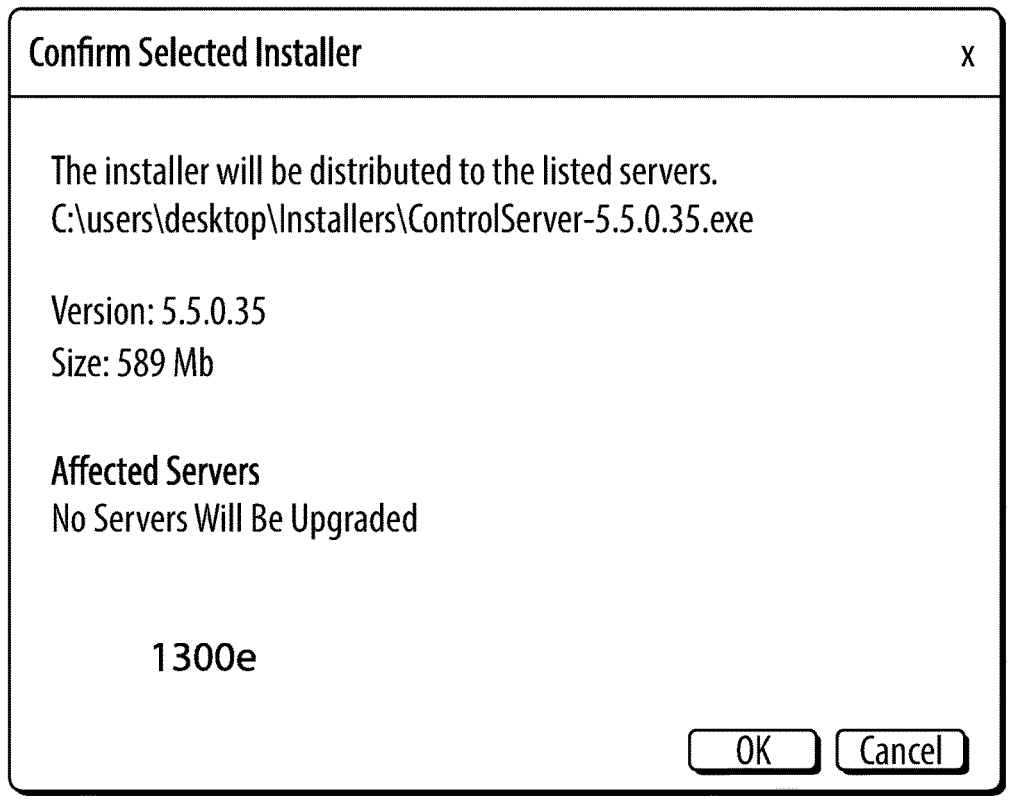
Figure 13F:
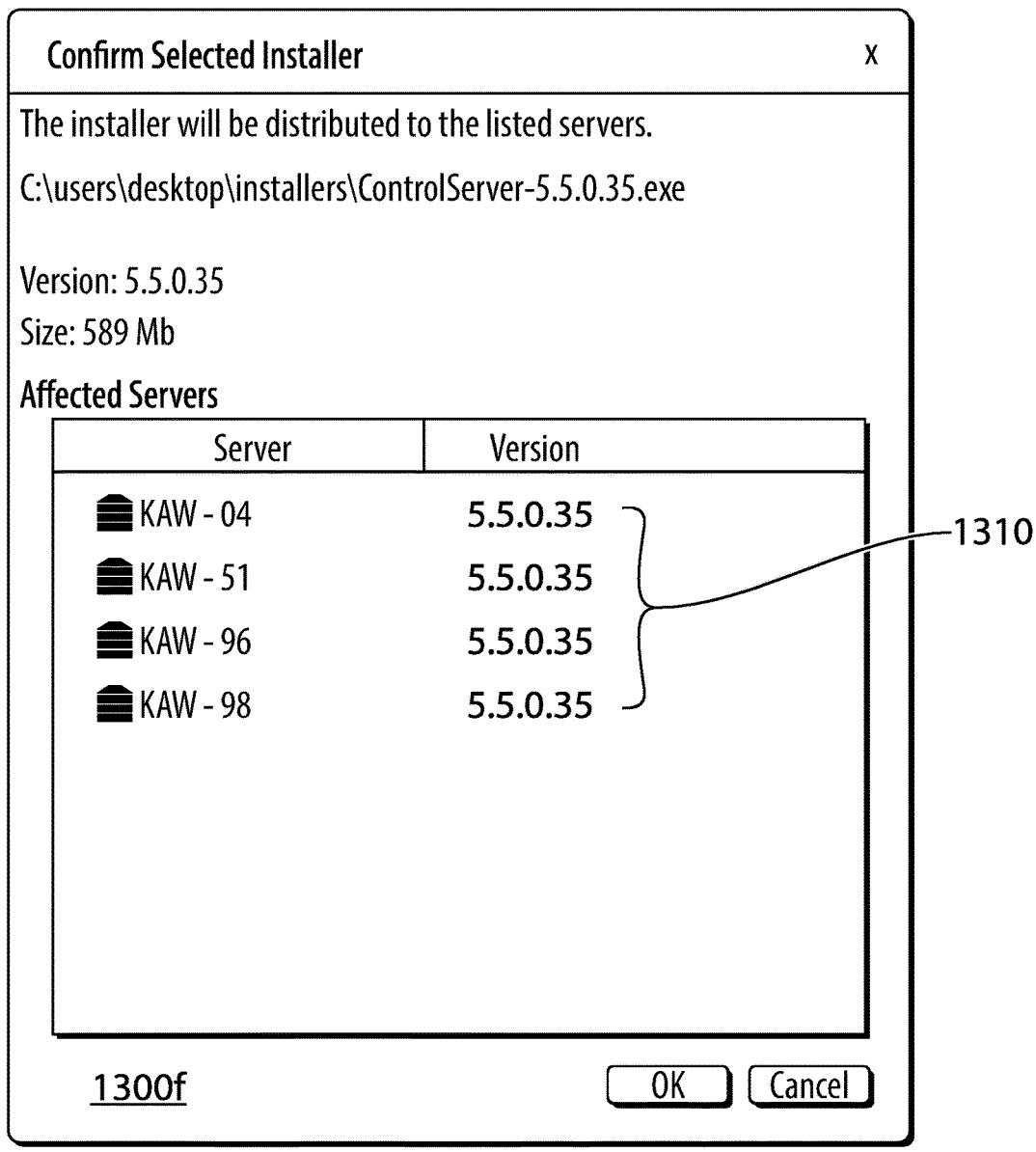
Figure 13G:
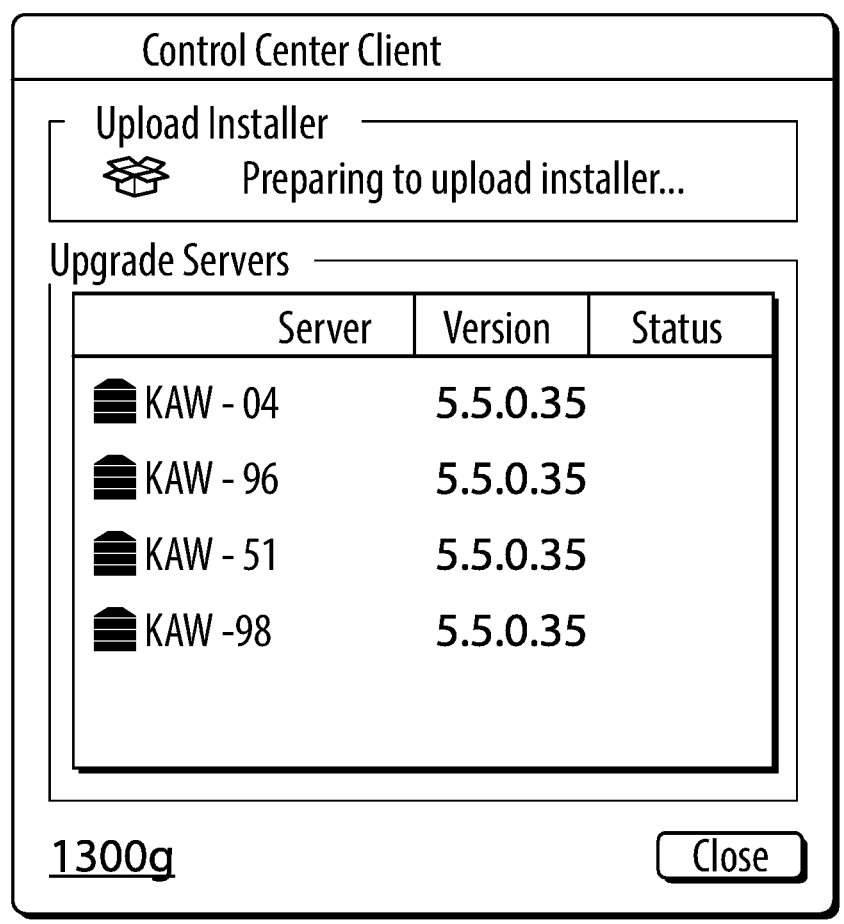
Figure 13H:
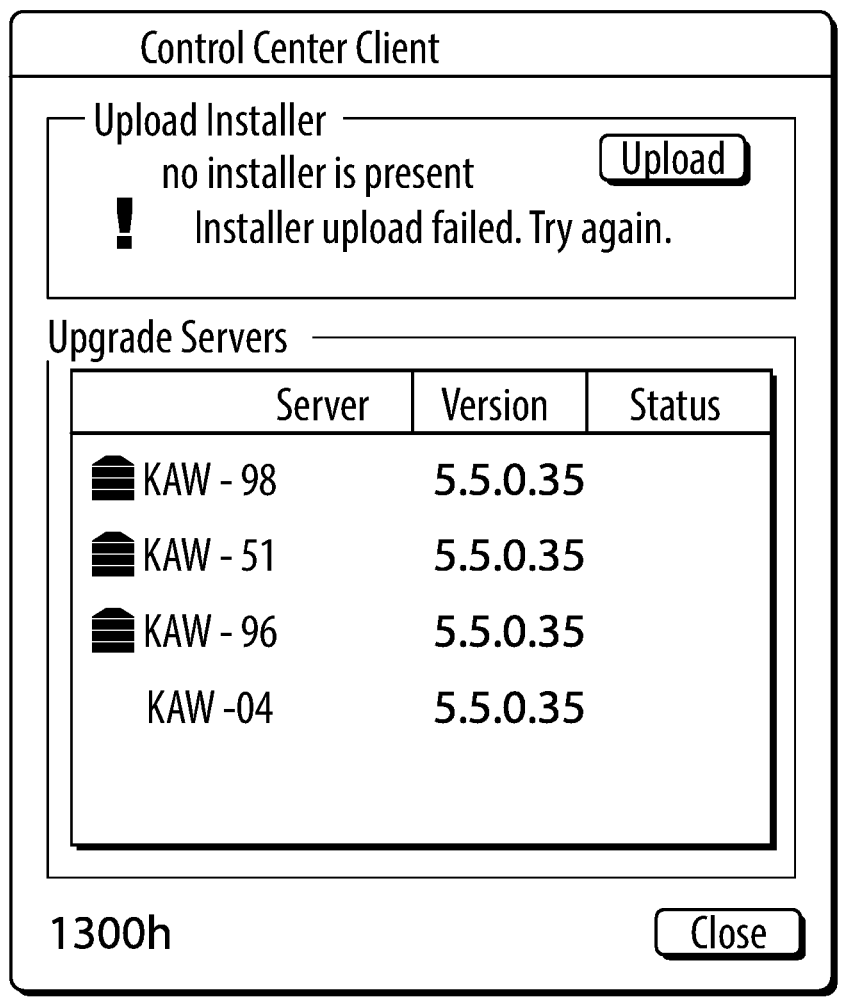
Figure 13I:
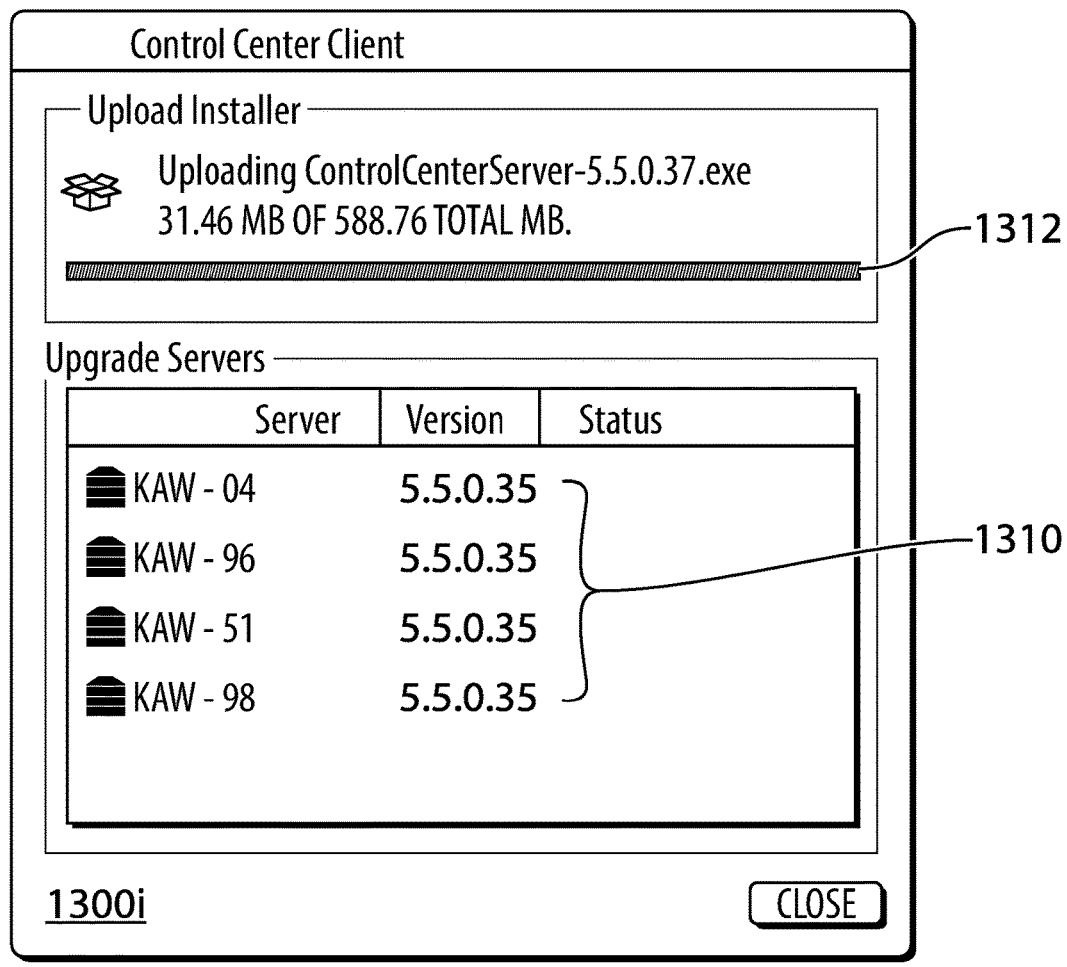
Figure 13J:
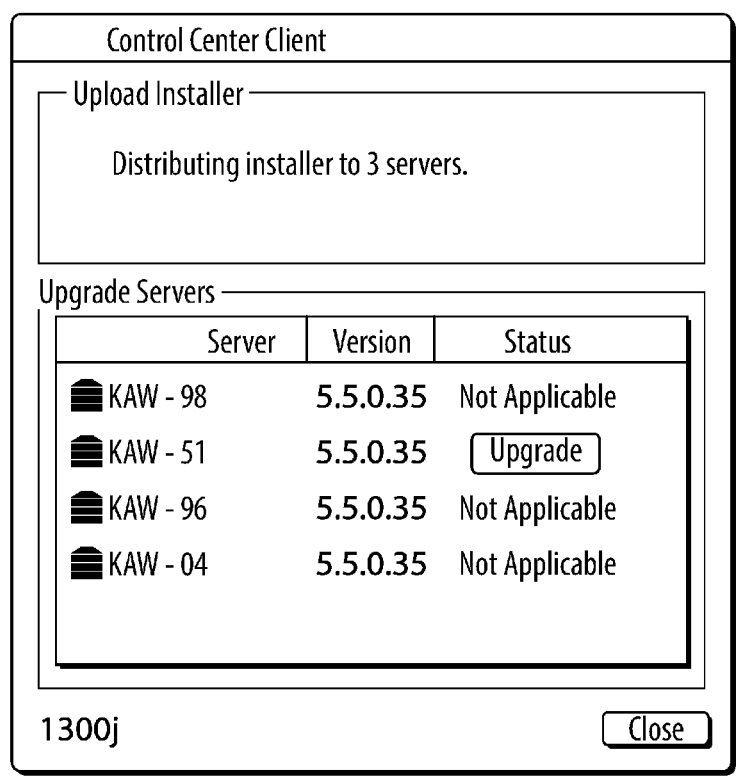
Figure 13K:
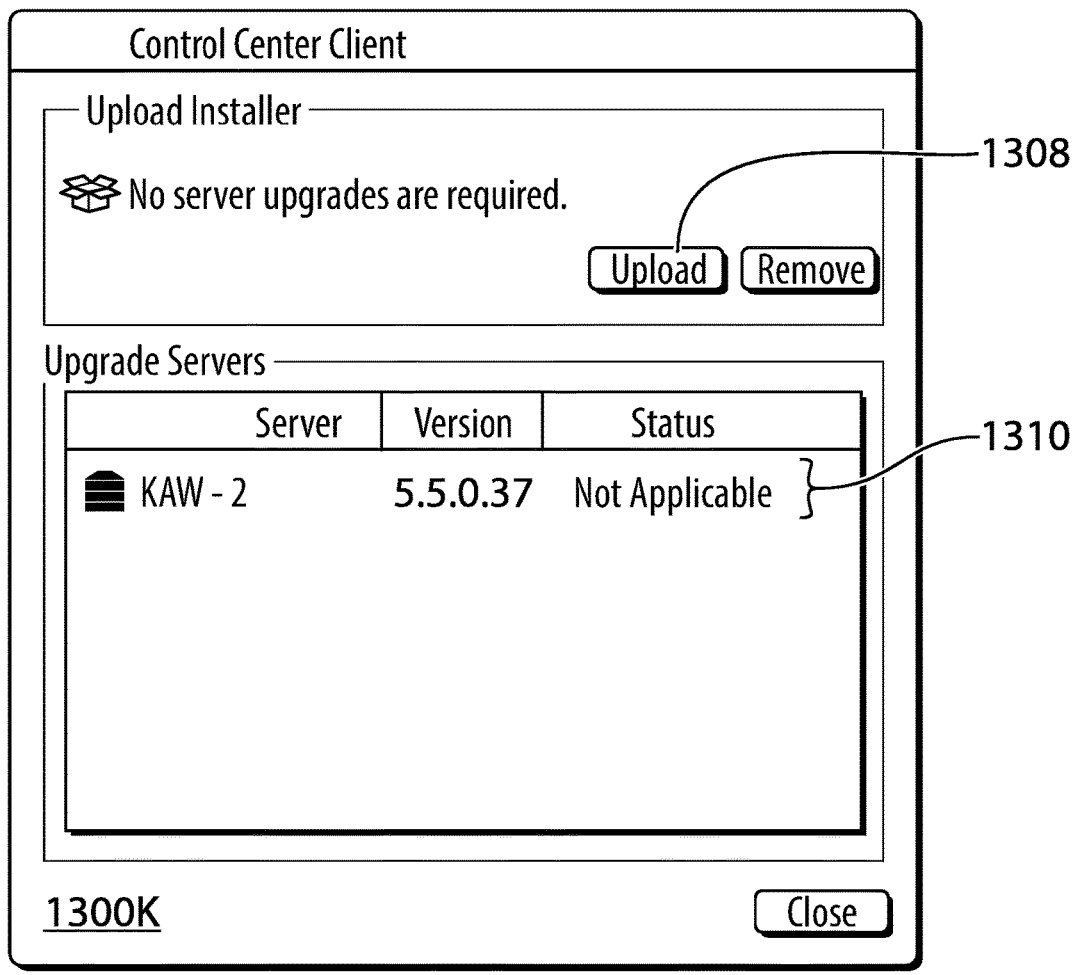
Figure 13L:
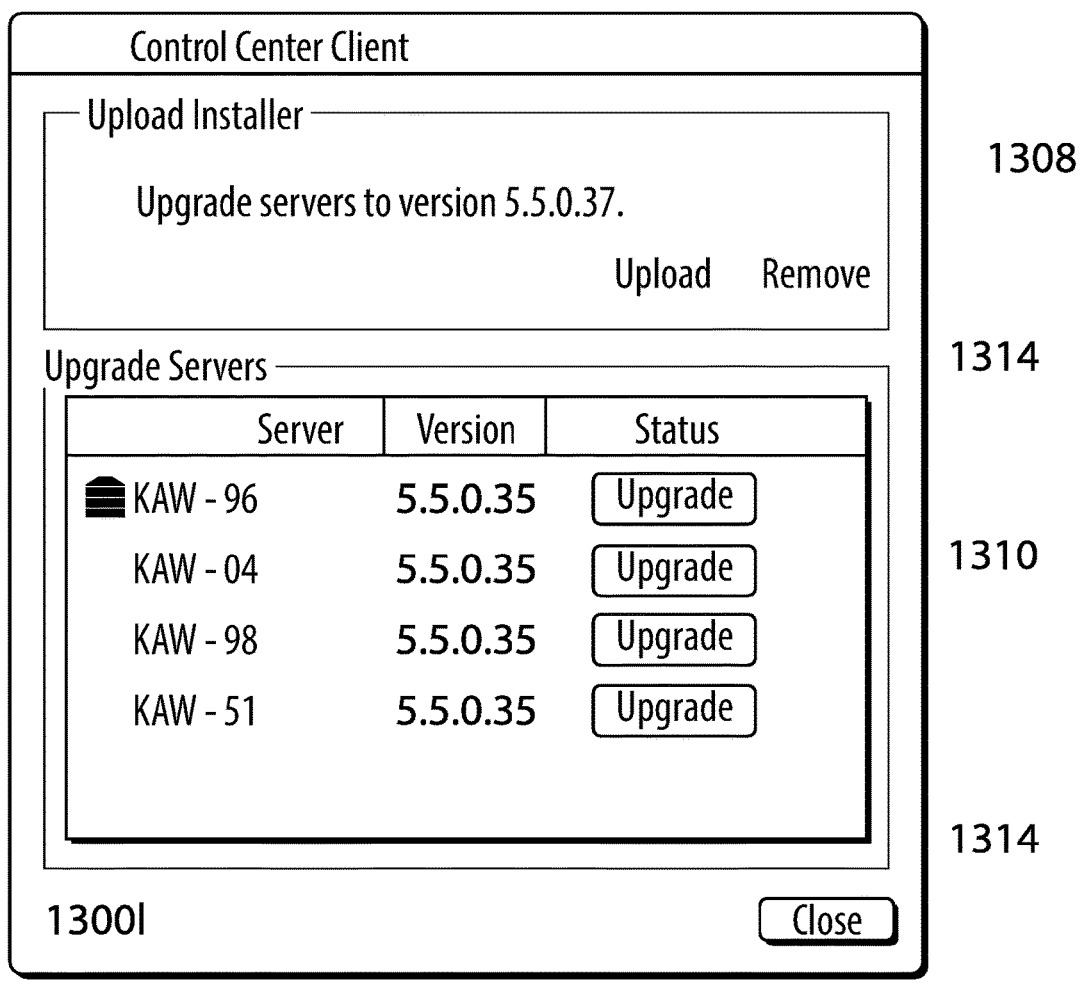
Figure 13M:
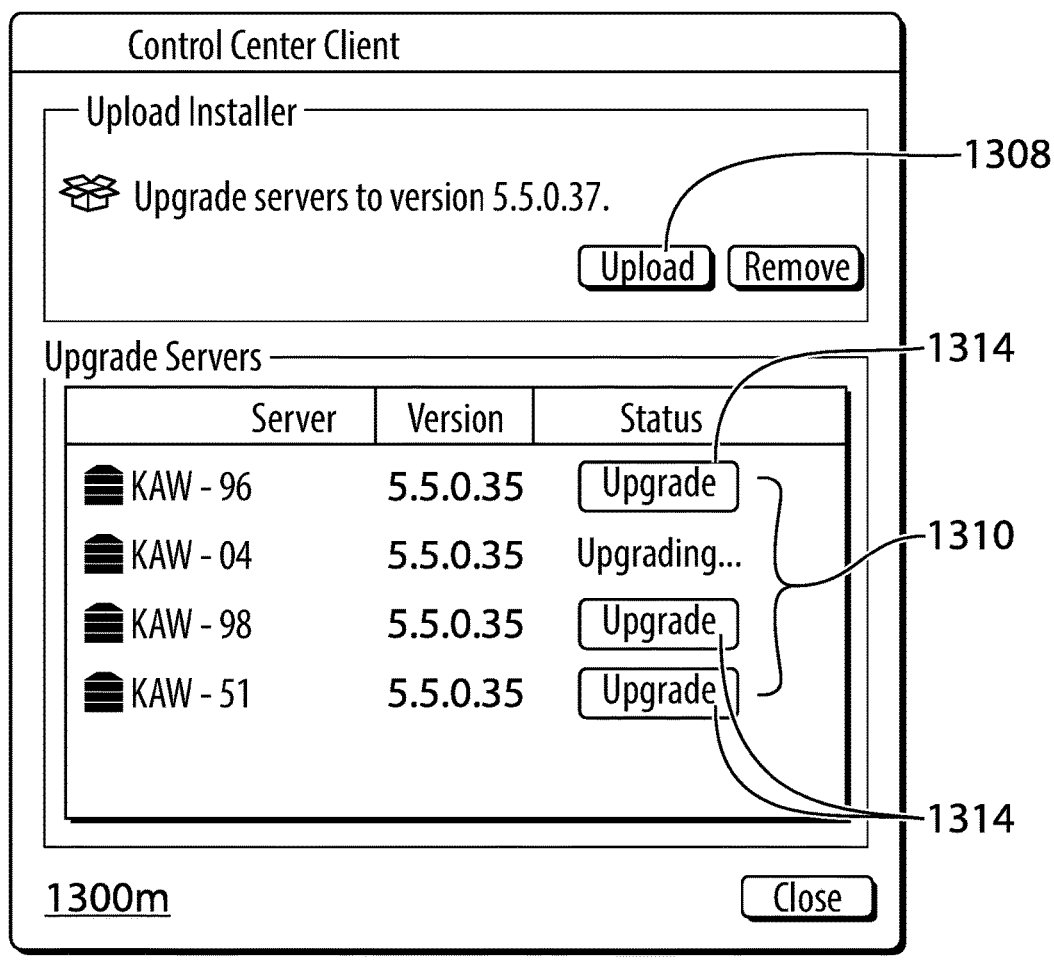
Figure 13N:
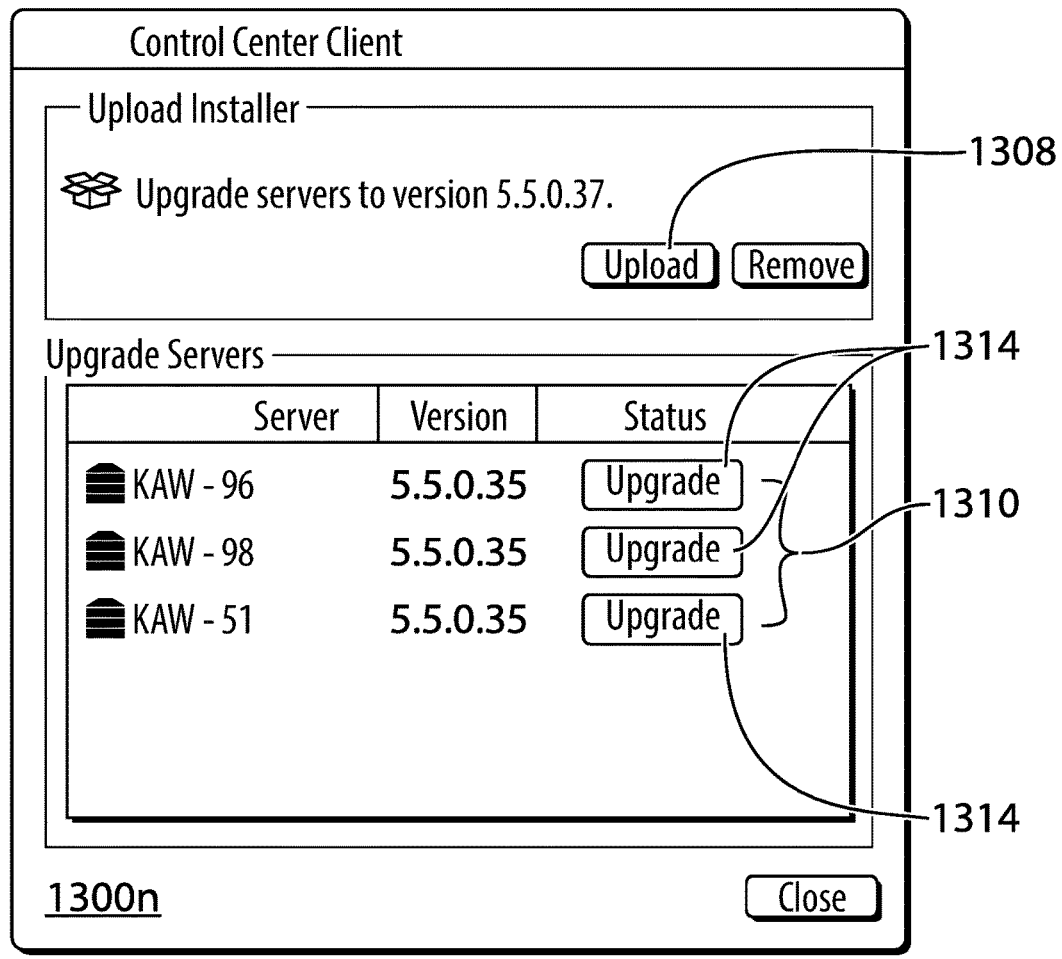
Figure 13O:
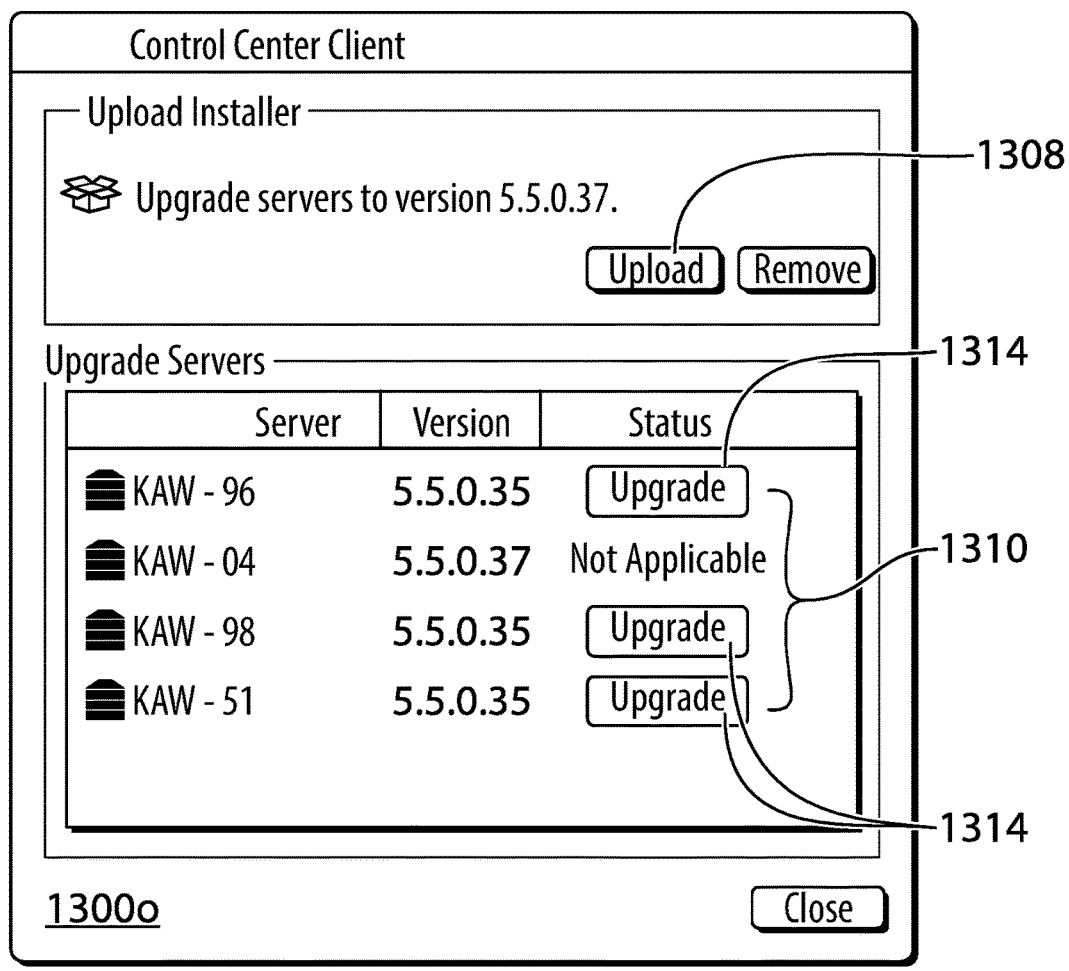
Figure 13P:
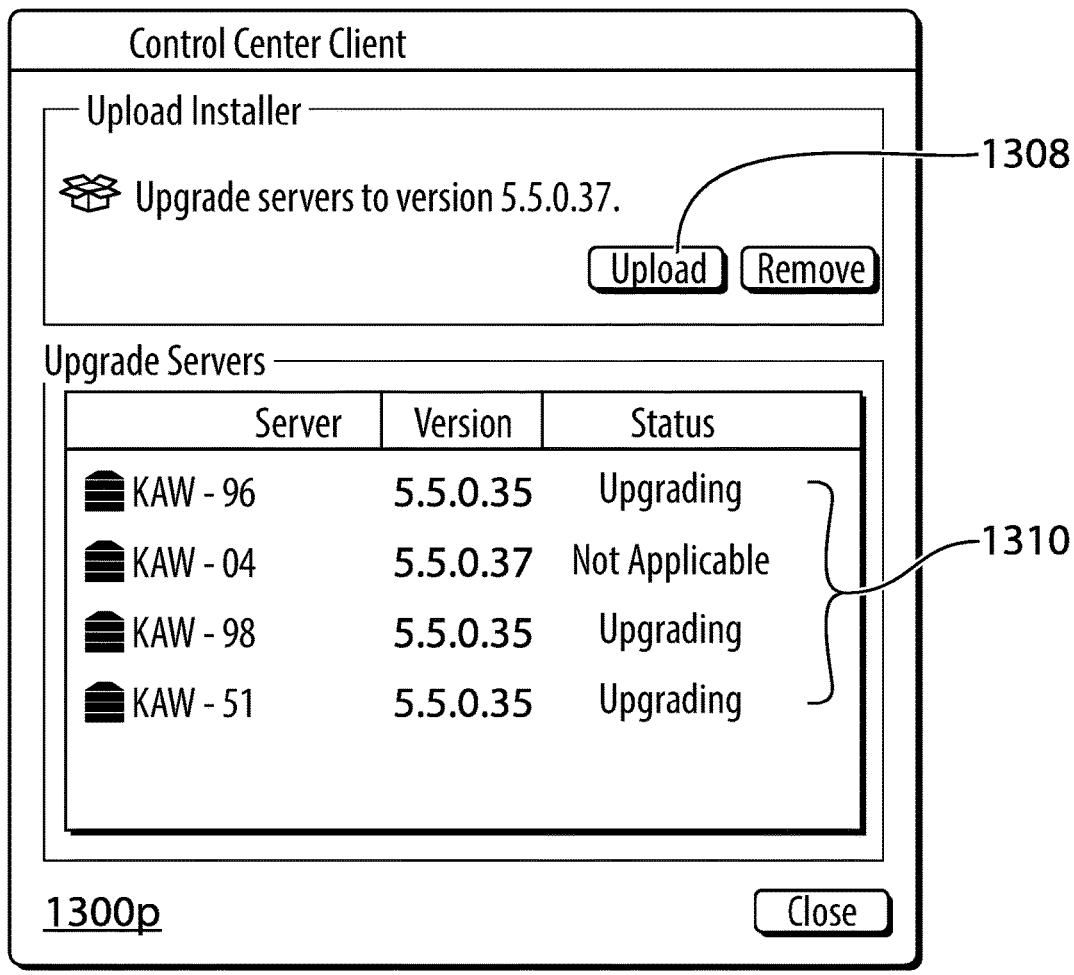
Figure 13Q:
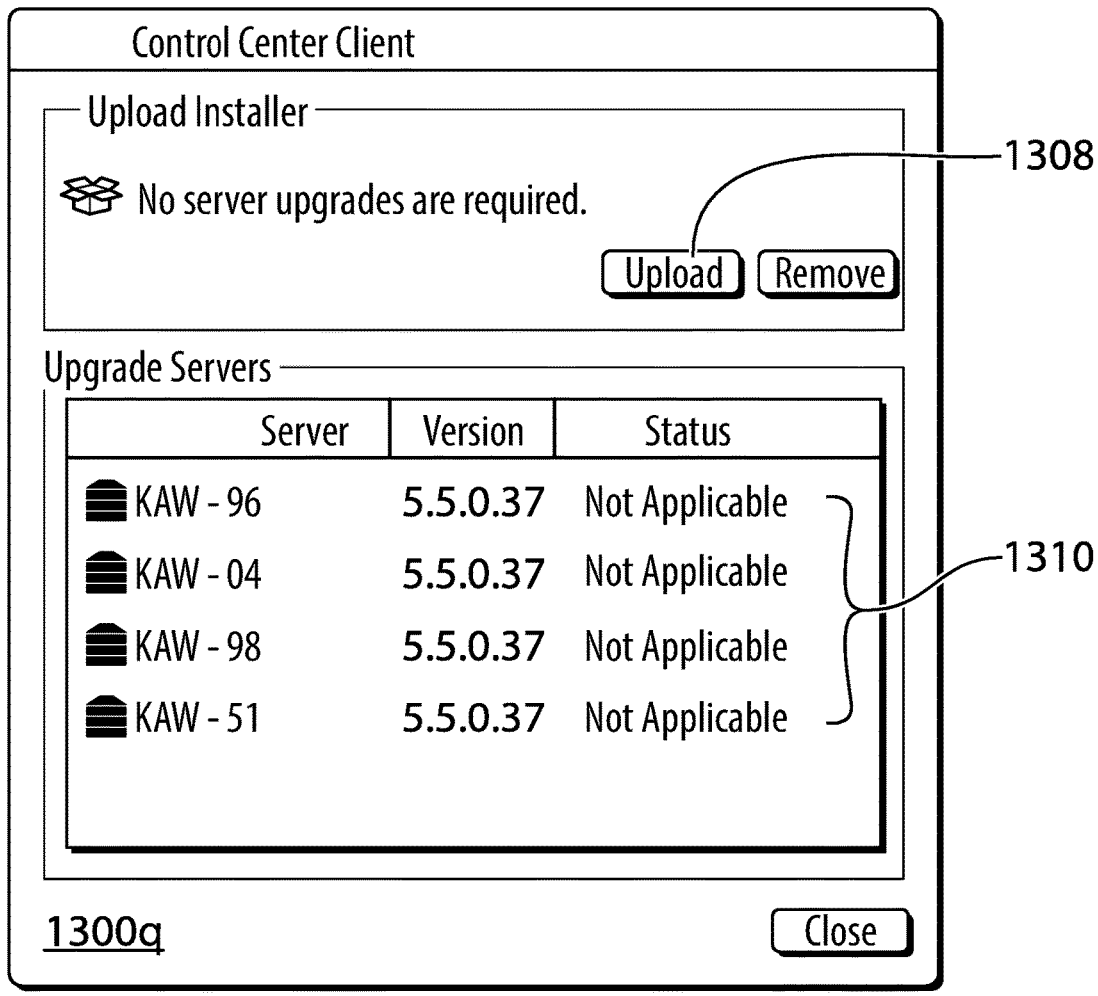
Figure 15A:
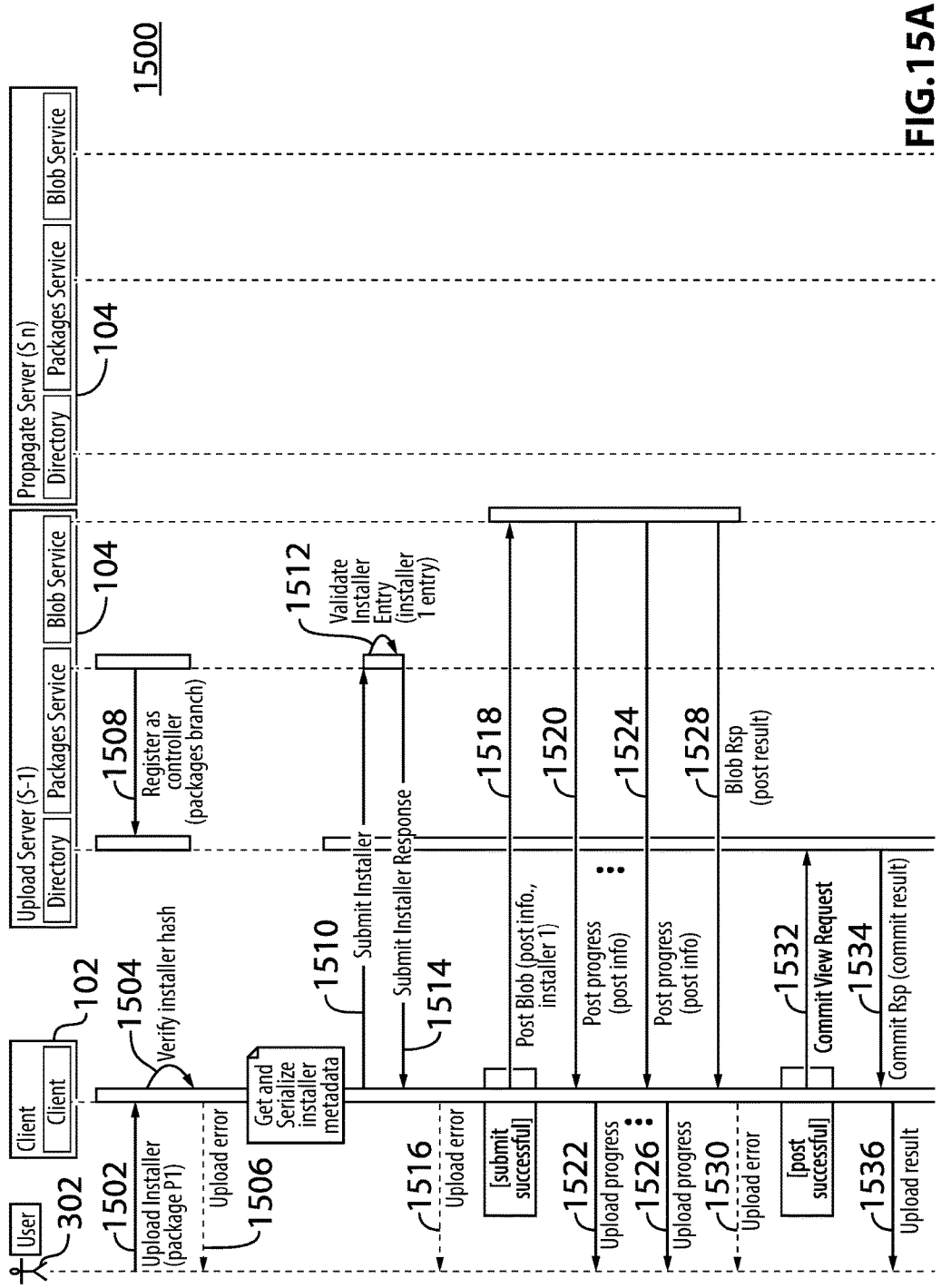
FIGS. 15A and 15B collectively represent a UML sequence diagram showing how the system of FIGS. 13A-13Q receives and propagates an installation package from one of its clients.
Figure 15B:
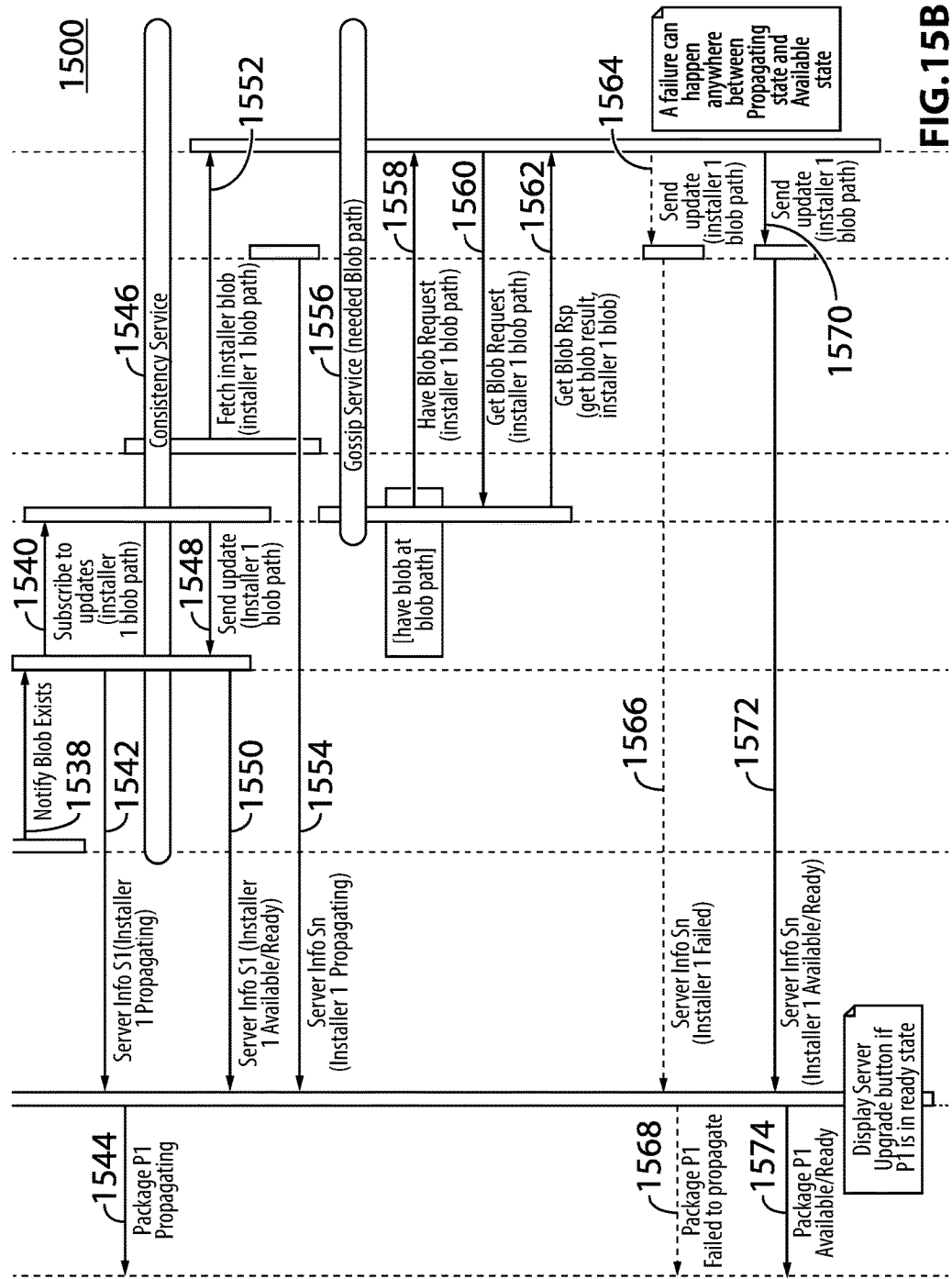

Referring now to FIGS. 13A-13Q, there are shown screenshots 1300*a-q* (collectively, "screenshots 1300") taken of one of the clients 102 at various stages of the upgrade process while the system 100 is being upgraded using the upgrade application 232, according to another embodiment. FIGS. 15A and 15B show a UML sequence diagram 1500 showing how the system 100 receives and propagates an installation package from one of the clients 102, which culminates in the installation package being run and the source and requesting servers 104 being upgraded. The installation package comprises a particular type of blob. The UML sequence diagram 1500 is described in more detail, below, with reference being made to the screenshots 1300.

The diagram 1500 comprises four objects: the user 302, the client 102, the source server 104, and the requesting server 104. As in the diagram 1400 of FIGS. 14A and 14B, the client backend is running on the client 102 and the directory and blob services are running on each of the source and requesting servers 104. In FIGS. 15A and 15B, however, each of the source and requesting servers 104 is also running a packages service used to validate metadata associated with the installation package. Validation comprises retrieving the digital certificate associated with the installation package and confirming that the certificate has the correct serial number and issuer, and that the digital certificate is trusted. Validation also comprises verifying the digital signature of the installer binary to ensure that it has not been tampered with. The packages service also comprises an RPC named "Upgrade" used to upgrade the server 104 running the service by executing the installer blob resident on that server 104, as discussed in more detail below.

To begin, the packages service on the source server 102 registers with the directory service (message 1508) so the directory service knows to subsequently communicate with the packages service following receipt of the installation package, as discussed below. The user 302 uploads the installation package to the client 102 (message 1502). The client 102 performs a hash-based validation on metadata signatures of the installation package (message 1504); while in this embodiment this is a less robust validation than that performed by the packages service on the source and requesting servers 104 described above, in alternative embodiments (not depicted) the validation performed by the client 102 and the servers 104 may be identical and redundant in order to enhance security. Any validation errors detected by the client 102 are reported to the user 302 (message 1506); the screenshot 1300*c* of FIG. 13C is an example screenshot of the client 102 reporting a validation error to the user 302. The client 102 then gets and serializes metadata and the key for the blob database associated with the installation package. This metadata comprises the following:

1. A global identifier ("Gid"), which comprises a class object used to uniquely identify the installation package (the installer binary executed by the servers 104 to perform an upgrade) and metadata portion ("installer metadata") that collectively comprise the installer blob across the servers 104 of any one of the clusters 108 and, optionally, across more than one of the clusters 108. The Gid comprises the node and cluster identifier of the source server 104 and a unique identifier that identifies the installation package that the client 102 generates upon receiving the installation package. In some alternative embodiments (not depicted), the Gid may omit the cluster identifier; this may be done, for example, when the system 100 comprises only one of the clusters 108.

2. Version information, which comprises a class object that identifies the version of the software to be installed by the installation package. As discussed in further detail below, the client 102 and the servers 104 check the version of the software to be installed by the installation package against the version of the software they are currently running to enable or disable the abilities to upload an installation package or to trigger an upgrade of any one or more of the servers 104, and to customize information the client 102 displays to the user 302.

3. The string representing the name of the installation package when uploaded. The string is used to display customized information to the user 302 via the client 102 and to restore the name of the installer blob after the user 302 has instructed the installation package to run on and upgrade a particular one of the servers 104.

The path information comprises the following:

1. The directory key for the installer metadata, such as /Packages/Installers/<unique-identifier>, where <unique-identifier> comprises the Gid for the installer metadata.

2. An identifier, such as the URI, for the installer blob in the source server 104, such as <Configuration path>/Blobs/Installers/<unique-identifier>, where <unique-identifier> comprises the Gid for the installer blob.

3. A file system path for storing program specific data to which the installer blob is copied after the user 302 instructs one of the servers 104 to commence upgrading by running the installer blob, but prior to the installer blob being run, such as <Program Data path>/Installers/<original-file-name>, where <original-file-name> is the name of the installer blob when uploaded to the client 102.

The client 102 logs into the source server 104 prior to sending the installation package to the source server 104. When the client 102 logs into the source server 104, an HTTP notification channel is established between them. The client 102 subscribes to changes in the source server 104, the destination server 104, and the other servers 104 in the cluster 108 by monitoring server information objects that are transmitted between the servers 104 using the Status protocol 218 and transmitted from the source server 104 to the client 102 using the notification channel. The client 102 may accordingly react to changes in the states of those servers 104 that are transmitted throughout the cluster 108. An additional member in the server information object may be added to represent the status of installers in the source server 104, as discussed in further detail below.

FIG. 13A shows a screenshot 1300a of the client 102 after it has received the installation package from the user 302. The screenshot 1300a shows a site upgrade button 1302 that the user 302 can select through an input device, such as a mouse, to begin the upgrade process. As shown in the screenshots 1300, the term "site" refers to a physical site at which the system 100 is installed and which the system 100 is monitoring. In the depicted example embodiment, the system 100 comprises a single cluster 108, which is used only to monitor the site. The screenshot 1300a comprises a window on its left side that shows a site label 1304 (in the depicted embodiment, the site is "KAW-01-SITE") and server labels 1306a-d (collectively, "server labels 1306") (in the depicted embodiment, the servers 104 are labeled as KAW-04, KAW-51, KAW-96, and KAW-98) that identify the servers 104 that comprise the system 100 used to monitor the labeled site. In alternative embodiments, however, the system 100 may comprise more than one of the clusters 108, with those clusters 108 used to monitor more than one site (including parts of multiple sites) or part of one site; in additional alternative embodiments, the system 100 may comprise a single cluster 108, but that cluster 108 may be used to monitor only part of one site or parts of many sites.

In the screenshot 1300a of FIG. 13A, no installation packages have been uploaded to any of the servers 104 that have not been installed. After logging into the source server 104, the user 302 is presented with the screenshot 1300a and selects the site upgrade button 1302, which causes the client 102 to display the screenshot 1300b of FIG. 13B; this screenshot 1300b informs the user 302 that no installation packages are ready for installation in the system 100 and gives the user 302 the option to upload a new installer by selecting the upload button 1308. The screenshot 1300b also comprises a status list of each of the servers 104, showing the name of each of the servers 104, the version of software that server 104 is running, and the upgrade status of that server 104. After selecting the upload button 1308, the user 302 selects the installation package from the client's 102 local file system (not shown) and the client 102 sends the directory key, installer metadata, and URI to the directory service on the source server 104 so that the directory service can create a database entry for the installer blob; the directory service passes the installer metadata to the packages service (message 1510), which validates the installer metadata (message 1512). The result of the validation by the packages service is returned to the directory service, which in turn relays this information to the client 102 (message 1514); failure to pass validation results in the installer blob being rejected. The client reports any errors or success in metadata validation to the user 302 (message 1516). Examples of errors displayed as a result of the packages service encountering problems during metadata validation are shown in FIGS. 13C and 13D. As noted above, the screenshot 1300c of FIG. 13C is displayed when the client 102 encounters a validation error; the same screenshot is shown when the source server 104 encounters a validation error. Validation is performed independently by the client 102 and source server 104 for security purposes. FIG. 13D shows a screenshot 1300d of when the installation package comprises an upgrade that would result in the server software being newer than the corresponding version of the client software (FIG. 13D). If there are no errors, the client 102 shows to the user 302 one of the screenshots 1300e,f of FIGS. 13E and 13F. The screenshot 1300e of FIG. 13E is shown if all of the servers 104 for the site are running a higher software version than the version to be installed by the installation package and therefore none of the servers 104 would benefit from an upgrade, while the screenshot 1300f of FIG. 13F is shown if any of the servers 104 for the site are running a lower software version than the version to be installed by the installation package. In FIG. 13F, the status list 1310 in the screenshot 1300f indicates that servers KAW-04, KAW-51, KAW-96, and KAW-98 are currently running older versions of the software (version 5.5.0.35), so installing the installation package would update the software on those servers 104 to a newer version (version 5.5.0.37). If in response to the screenshots 1300e,f the user 302 confirms to the client 102 that the upload should continue, the client 102 displays the screenshot 1300g of FIG. 13G to the user 302, which indicates to the user 302 that the client 102 is preparing to upload the installation package to the source server 104. If the installer blob is not corrupt, the client 102 then displays the screenshot 1300i of FIG. 13I to the user 302 and uploads the installer blob to the blob service on the source server 104 as described above for FIGS. 14A and 14B in respect of messages 1402 to 1412 (messages 1518 and 1528). The source server 102 periodically reports progress of the upload to the client 102 while the upload is occurring via a callback (messages 1520, 1522, 1524, and 1526), as indicated on the screenshot 1300*i* by a progress bar 1312. Once the installer blob is uploaded, the client 102 commits the database entry using the directory service of the source server 104 (messages 1532 and 1534) and displays the screenshot 1300*j* of FIG. 13J to the user 302 (message 1536). The screenshot 1300*j* states that the installer blob is being "distribut[ed]" from KAW-51 to KAW-98, KAW-96, and KAW-04. By virtue of showing a server upgrade button 1314 for KAW-51, the status list 1310 indicates that the installer blob has been successfully uploaded to KAW-51. However, because the installer blob is being propagated to the other three servers 104 and upgrading is not permitted until propagation to all of the servers 104 is complete, the entire status list 1310 is greyed out indicating that the user 102 may not select it. In alternative embodiments (not depicted), upgrading may be permitted during propagation, and the upgrade button 1314 may accordingly be selectable by the user 302. The directory service subsequently notifies the packages service that the blob exists (message 1538), and the packages service subscribes to updates from the blob service (message 1540).

In the event the installer blob is corrupt, the client 102 displays to the user 302 the screenshot 1300*h* of FIG. 13H (message 1522), which permits the user 302 again to upload another installation package via the upload button 1308 but also indicates that the previous upload to the source server 104 failed.

In order to report progress of the upload as mentioned above in respect of messages 1520, 1522, 1524, and 1526, the client 102 tracks upload progress of the installer blob to the source server 104 using an upload information object, which comprises the installer metadata and number of uploaded bytes of the installer blob. By default the upload information object does not exist; the upload status is accordingly set to idle and the corresponding screenshots 1300*a,b* are those shown in FIGS. 13A and 13B. When the client 102 begins to upload the installation package to the source server 104, the client 102 instantiates the upload information object but does not set any of its member fields, and the client 102 displays to the user 302 the screenshot 1300*g* of FIG. 13G, which informs the user 302 that the upload of the installation package is preparing. After the client 102 validates the installation package (e.g., after the client 102 receives valid installer information from a validation thread and validation has finished in a manner analogous to how the packages service on the source server 104 performs validation), it sets the upload information object using the received installer information and sets initial bytes uploaded from the client 102 to the source server 104 to zero, and displays upload progress to the user 302 (see, e.g., the screenshot 1300*i* of FIG. 13I). The client 102 and the server 104 each independently and similarly validate the installation package using the validation techniques discussed above.

After the installer blob is uploaded from the client 102 to the source server 104, the source server 104 sends to the client 102 (message 1542) and the client 102 sends to the user 302 (message 1544) an indication that the installer blob is being propagated between the servers 104 (and, in FIG. 15B, to the requesting server 104 from the source server 104). The progress of the propagation of the installer blob between the servers 104 is tracked using the server information object in a manner analogous to how the progress of the upload from the client 102 to the source server 104 is tracked, as described above. Propagation comprises the directory service on the source server 102 notifying via the Consistency protocol 216 (frame 1546) the directory service on the requesting server 104 that the installer blob has been committed to the source server 104 in a manner analogous to frame 1414 of FIG. 14B. The source server 104 also sends to the client (message 1548) and the client 102 sends to the user (message 1550) an indication that the upload of the installer blob has completed.

After the directory service on the requesting server 104 receives a notification via the Consistency protocol 216 that the source server 104 has the installer blob, the directory service on the requesting server 104 calls Fetch on the requesting server's 104 blob service (message 1552), following which the packages service notifies the client 102 that the installer blob is propagating from the source server 104 to the requesting server 104 (message 1554), the blob service subsequently communicates via the Gossip protocol 208 that it is looking for the installer blob (frame 1556), and the source server's 104 blob service sends the installer blob to the requesting server's 104 blob service at messages 1558, 1560, and 1562 in a manner analogous to messages 1420, 1422, and 1424 of FIG. 14B. Message 1544 notifies the user 302 of the installer blob's propagation between the servers 104.

In the event propagation fails (not shown in FIGS. 15A and 15B), the requesting server's 104 blob service notifies its packages service of the failure (message 1564), which relays the message to the client 102 (message 1566) and the client 102 relays the failure to the user 302 (message 1568).

In contrast, if propagation is successful, the requesting server's 104 blob service notifies its packages service of the success (message 1570), which relays the message to the client 102 (message 1572) and the client 102 relays the success to the user 302 (message 1572); the client consequently displays screenshots 1300*k* (FIG. 13K) or 1300*l* (FIG. 13L). The screenshot 1300*k* of FIG. 13K is displayed if none of the servers 104 to which the installer blob has been propagated is running a lower or identical software version than that of the installation package; in this case, the status list 1310 shows that no upgrade is possible and the client 102 presents the upload button 1308 to the user 302 to permit the user 302 to upload another installer blob. In contrast, a screenshot of the type shown in FIG. 13L is displayed if one or more of the servers 104 in the cluster 108 are running software having a version lower than that of the installation package. In FIG. 13L, all of KAW-96, KAW-04, KAW-98, and KAW-51 are running version 5.5.0.35 of their software, and consequently the status list 1310 provides the option to individually upgrade any one or more of those servers 104 by associating with each of those servers 104 the server upgrade button 1314. The client 102 also presents the upload button 1308 to permit the user 302 to upload another installer blob.

The user 302 can then upgrade one of the servers 104 by selecting the corresponding one of the server upgrade buttons 1314, following which the user 302 is presented with the screenshot 1300*m* of FIG. 13M. In FIG. 13M, the status list 1310 has changed relative to that of FIG. 13L to show that KAW-04 is in the process of executing the installation package and is being upgraded. During the upgrade process, KAW-04 reboots and temporarily disappears from the status list 1310; this is shown in the screenshot 1300*n* of FIG. 13N. Once KAW-04 has rebooted, it reappears in the status list 1310 but without its corresponding server upgrade button 1314, since it has already been upgraded using the currently available version of the installation package; this is shown in the screenshot 1300o of FIG. 13O. The user 302 is able to select each of the servers 104 in the system 100 via the server upgrade buttons 1314 and upgrade each of the servers 104 that has an installation package ready for execution; this has been done in FIG. 13P, with the screenshot 1300p of FIG. 13P showing each of KAW-96, KAW-98, and KAW-51 being upgraded. In an alternative embodiment (not depicted), the system 100 may upgrade each of the servers 104 automatically upon receiving a single command from the user 302 as opposed to requesting that the user 302 select the server upgrade button 1314 for each of the servers 104. After all of the servers 104 have been upgraded, the screenshot 1300q of FIG. 13Q is shown, which is analogous to the screenshot 1300k of FIG. 13K in that the status list 1310 shows that none of the servers 104 can be upgraded using the installation package currently available.

Each of the servers 104 in the cluster 108 report the propagation status of the installer blobs via a push based notification of the server information object to all of the clients 102 that are logged into the system 100; as mentioned above, the server information object is shared between the servers using the Status protocol 218, and the source server 102 sends the server information object to the client 102 via an HTTP notification channel. The propagation status for any one of the servers 104 is represented by a propagation flag comprising part of the server information object with the following states: "propagating", which indicates that the installer blob is currently being transferred to that server 104 using the blob service (see, e.g., FIG. 13K); "available", which indicates that the installer blob has been successfully transferred to that server 104 using the blob service; and "failed", which indicates that the installer blob has failed to be transferred to that server 104 before the HTTP request times out (see, e.g., FIG. 13M). Additionally, the server information object further comprises a "ready" Boolean flag that indicates whether the installer blob is ready to be executed on that server 104 to upgrade that server 104. In the depicted example embodiment, the "ready" flag is only true for a particular one of the servers 104 if the propagation flag for that server 104 is "available", the version of the installer blob is higher than the software currently running on that server 104, and the type of installer blob is appropriate for that server 104 (e.g., the installer blob is for the Windows™ operating system if that server runs the Windows™ operating system). However, in alternative embodiments (not depicted) different, more, or fewer criteria may be used, and any criteria used in those alternative embodiments may be more or less restrictive than the example criteria listed above. FIG. 13N shows an example screenshot of when the propagation status is "available" and the ready flag is true, while FIGS. 13N and 13O are example screenshots when the propagation status is "available" and the ready flag is false. For each of the servers 104, the client 102 determines whether to show the site upgrade button 1302 by determining whether the server information object for that server 104 shows the "ready" flag to be true, and by confirming that the user 302 has server management permission; i.e., the required permission level to upgrade the server 104. In alternative embodiments (not depicted), the client 102 may determine whether to permit an upgrade by assessing the "ready" flag alone (e.g., whether the user 302 has specific permission to upgrade the server 104 may be irrelevant, or whether the user 302 has that permission may be incorporated into determining how to set the "ready" flag).

Figure 16:
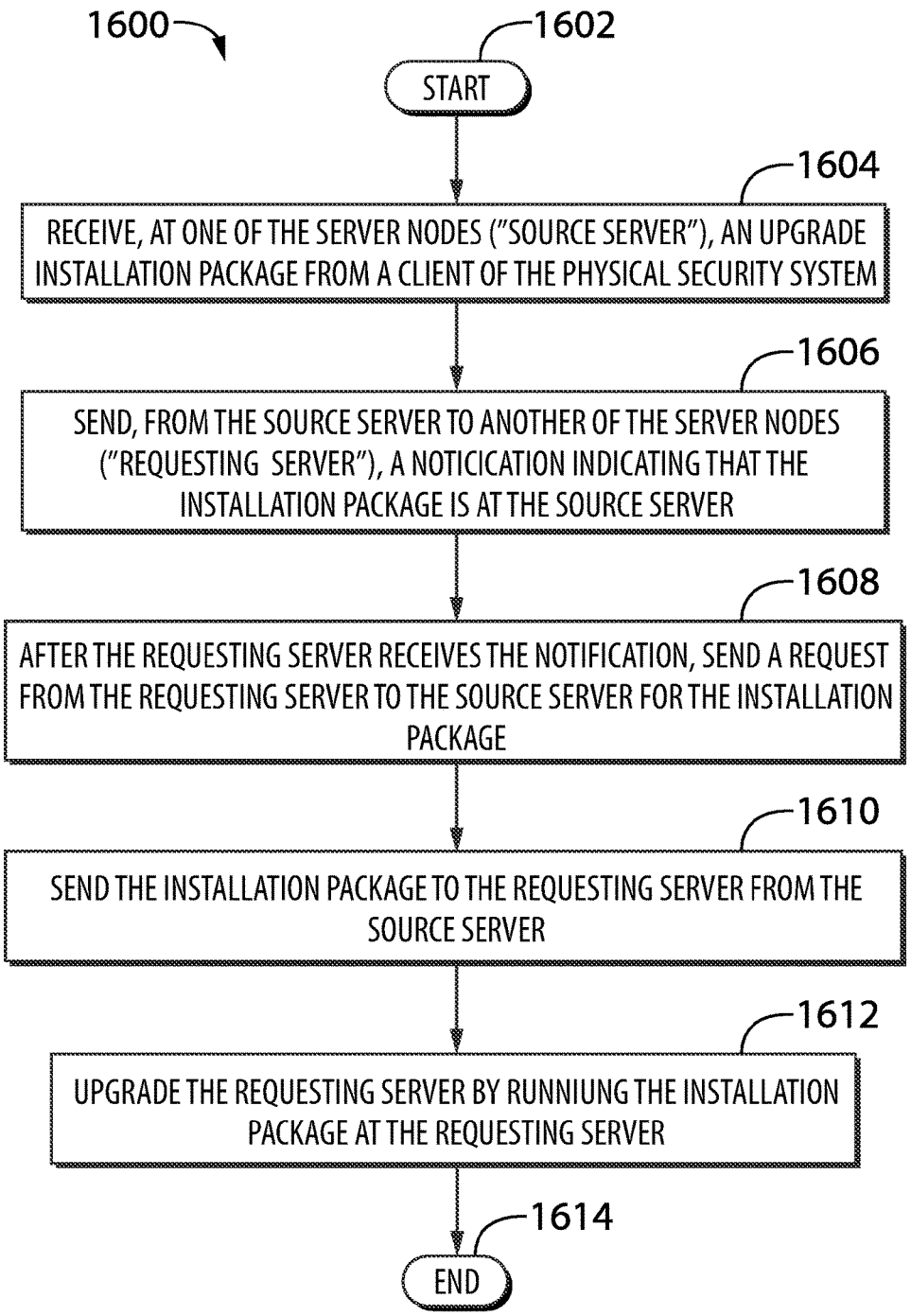
FIG. 16 is a method for upgrading a physical security system that comprises a plurality of server nodes, according to another embodiment.

Referring now to FIG. 16, there is shown a method 1600 for upgrading a physical security system that comprises a plurality of server nodes, according to another embodiment. The method may be performed by the source and requesting servers 104. The method 1600 begins at block 1602 and proceeds to block 1604 where the source server 104 receives the installation package, which comprises part of the installer blob, from the client 102 (see, e.g., message 1502). At block 1604 the source server sends to requesting server 104 a notification indicating that the installation package is at the source server 104 (see, e.g., frame 1546). At block 1608, after the requesting server 104 receives that notification, it sends a request to the source server 104 for the installation package (see, e.g., frame 1556). At block 1610, the source server 104 subsequently sends the installation package to the requesting server (see, e.g., messages 1558, 1560, and 1562) and at block 1612 the requesting server 104 is upgraded by running the installation package. At block 1614 the method 1600 ends.

The upgrade process shown in FIGS. 13A-13Q is an example of a manually-triggered upgrade; that is, the user 302 directly triggers the upgrade by selecting the upgrade button 1302. However, according to one alternative embodiment (not depicted), the system 100 may perform event-triggered upgrades that occur automatically (i.e., without requiring input from the user 302 immediately prior to the installation package running). For example, in one embodiment in which upgrades are scheduled to occur periodically, any one or more of the servers 104 may be configured to periodically determine whether the ready flag is "true" and, if so, to automatically run the installation package present at that server 104. Each of the servers 104, or certain groups comprising subsets of the servers 104, may, for example, be configured to perform this type of event-based upgrade at a different time so that not all of the servers 104 are upgraded simultaneously, which could compromise the ability of the system 100 to monitor the site. Additionally or alternatively, different types events may trigger an event-based upgrade; for example, an upgrade may automatically be triggered as a result of the ready flag transitioning from "false" to "true" independent of any upgrade schedule.

Rebooting

In the present embodiment, the cluster membership information is persistently stored locally on each of the nodes. When one of the nodes reboots, it automatically rejoins the cluster 108 of which it was a member prior to rebooting. This is depicted in the example method 900 shown in FIG. 9. After performing block 806, one of the nodes in the cluster 108 reboots (block 902). Upon rebooting, this node accesses the persistently stored cluster membership information that identifies the cluster 108 of which it was a member prior to rebooting (block 904), and subsequently rejoins this cluster 108 (block 906) before returning to block 808. Having the nodes automatically rejoin a cluster 108 following rebooting is beneficial in that it helps the system 100 recover following restarting of any one or more of its servers. As each of the nodes persistently stores the Consistency information, upon rejoining the cluster 108 only that Consistency information that has changed since the node last left the cluster 108 is synchronized again, thereby saving bandwidth.

While certain example embodiments are depicted, alternative embodiments, which are not depicted, are possible. For example, while in the depicted embodiment the node cameras 106 and non-node cameras 114 are distinct from each other, in alternative embodiments (not depicted) a single camera may be simultaneously a node camera and a non-node camera. For example, in FIG. 1 the first camera 106a is a node that is a member of the third cluster 108c; however, if the first camera 106a were also directly coupled to the fifth server 104e but retained only its cluster membership information for the third cluster 108c, the first camera 106a would remain a member of the third cluster 108c while simultaneously acting as a non-node camera 114 from the perspective of the fifth server 104e.

The processor used in the foregoing embodiments may be, for example, a microprocessor, microcontroller, programmable logic controller, field programmable gate array, or an application-specific integrated circuit. Examples of computer readable media are non-transitory and include disc-based media such as CD-ROMs and DVDs, magnetic media such as hard drives and other forms of magnetic disk storage, semiconductor based media such as flash media, random access memory, and read only memory.

FIGS. 8, 9, 11, 12, 16 are flowcharts of example embodiment methods. Some of the blocks illustrated in those flowcharts may be performed in an order other than that which is described. Also, it should be appreciated that not all of the blocks described in those flowcharts are required to be performed, that additional blocks may be added, and that some of the illustrated blocks may be substituted with other blocks.

It is contemplated that any part of any aspect or embodiment discussed in this specification can be implemented or combined with any part of any other aspect or embodiment discussed in this specification.

For the sake of convenience, the example embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method comprising:
    receiving, at a first server running a first operating system, an installation package from a client of a physical security system;
    sending, from the first server to a computer appliance running a second operating system different than the first operating system, a notification indicating that the installation package is at the first server;
    after the computer appliance receives the notification, sending a request from the computer appliance to the first server for the installation package;
    sending the installation package to the computer appliance from the first server in response to the request; and
    upgrading a second server on the computer appliance by running the installation package at the computer appliance.

2. The method of claim 1 wherein the notification includes sending an identifier for the installation package from the first server to the second server.

3. The method of claim 2 wherein the second server uses the identifier to determine whether the second server already has the installation package, and wherein the second server sends the request when the second server determines it does not already have the installation package.

4. The method of claim 1 wherein the installation package includes part of an installer blob that is received at the first server, the installer blob further including installer metadata associated with the installation package.

5. The method of claim 4 wherein the installation package received from the client includes the installer metadata, and the method further comprising:
    generating, at the source server and after receiving the installer metadata, a database entry including the installer metadata.

6. The method of claim 5 wherein the notification includes the database entry.

7. A method comprising:
    receiving, at a first server on a computer appliance running a first operating system, an installation package from a client of a physical security system;
    sending, from the first server to a second server running a second operating system different than the first operating system, a notification indicating that the installation package is at the first server;
    after the second server receives the notification, sending a request from the second server to the first server for the installation package;
    sending the installation package to the second server from the first server in response to the request; and
    upgrading the second server by running the installation package at the second server.

8. The method of claim 7 wherein the notification includes sending an identifier for the installation package from the first server to the second server.

9. The method of claim 8 wherein the second server uses the identifier to determine whether the second server already has the installation package, and wherein the second server sends the request when the second server determines it does not already have the installation package.

10. The method of claim 7 wherein the installation package includes part of an installer blob that is received at the first server, the installer blob further including installer metadata associated with the installation package.

11. The method of claim 10 wherein the installation package received from the client includes the installer metadata, and the method further comprising:
    generating, at the source server and after receiving the installer metadata, a database entry including the installer metadata.

12. The method of claim 11 wherein the notification includes the database entry.

* * * * *